United States Patent [19]
Galis et al.

[11] Patent Number: 5,175,800
[45] Date of Patent: Dec. 29, 1992

[54] EXPERT AND DATA BASE SYSTEM AND METHOD FOR COMMUNICATIONS NETWORK

[75] Inventors: Alexandru Galis, London; Malcolm Richardson; Stuart Page, both of Herts; Shailen Devani, Middlesex, all of United Kingdom

[73] Assignee: Case Group PLC, Watford, United Kingdom

[21] Appl. No.: 742,577

[22] Filed: Aug. 7, 1991

Related U.S. Application Data

[63] Continuation of Ser. No. 598,805, Oct. 17, 1990, abandoned, which is a continuation of Ser. No. 374,625, Jun. 30, 1989, abandoned, which is a continuation of Ser. No. 29,504, Mar. 23, 1987, abandoned.

[51] Int. Cl.⁵ ............................................. G05B 13/00
[52] U.S. Cl. ................................. 395/51; 340/825.3; 395/908; 395/909
[58] Field of Search ............... 364/513, 200, 900, 402, 364/407; 340/825.3; 395/50, 909, 908, 51

[56] References Cited

U.S. PATENT DOCUMENTS

| | | | |
|---|---|---|---|
| 3,550,093 | 12/1970 | Watling et al. | 364/200 |
| 3,703,006 | 11/1972 | Sharma | 444/1 |
| 4,591,983 | 5/1986 | Bennett. | |

FOREIGN PATENT DOCUMENTS

| | | |
|---|---|---|
| 0201308A2 | 11/1986 | European Pat. Off. . |
| 00199 | 10/1987 | European Pat. Off. . |
| 0260579A2 | 2/1988 | European Pat. Off. . |

OTHER PUBLICATIONS

McDermott, J., "R1: An Expert in the Computer System Domain," *Proceedings of the AAAI*, (1980).
Roman, E., "Expert System Software for Telecommunications Applications," *Polytechnic Inst. of New York, Brooklyn, N.Y.; Conference on Software Tools*, IEEE Computer Society, Computer Society Press, Apr. 15, 1985, 179-183.
Liebowitz, J., "Expert Systems and Telecommunications," *Telematics and Informatics*, Pergamon Press Ltd., vol. 2, No. 3, 195-206 (1985).
Klahr, C., "An Expert System Can Greatly Reduce Expenditures for Telecommunications," *Data Communications*, Jul. 1985, pp. 155-167.
Cynar, L., et al., "Computers Design Networks by Imitating the Experts," *Data Communications*, Apr. 1986, pp. 137-145 (Part 1).
Cynar, L., et al., "Export Systems Solve Network Problems and Share the Information," *Data Communications*, May 1986, pp. 187-192 (Part 2).

*Primary Examiner*—Allen R. MacDonald
*Attorney, Agent, or Firm*—Sterne, Kessler, Goldstein & Fox

[57] ABSTRACT

A configuration expert system and a configuration database system which provides the means for a complete (re) configuration task for communications networks. The present invention allows a human user to define and maintain a communications network requirements database for (re)configuration of a communications network. Further, the present invention allows a human user to define and maintain a network configuration database for the physical and logical layers of a network. The present invention generates a communications network configuration database and produces network loadable configuration data for the communications network. Upload communications network configuration data means are provided between the network and for transferring communications network (re) configuration information to the present invention. The expert system of the present invention validates the human user's requirements or changes to requirements for the communications network and produces an expert configuration data set of options for the full and partial configuration tasks of a communications network.

32 Claims, 49 Drawing Sheets

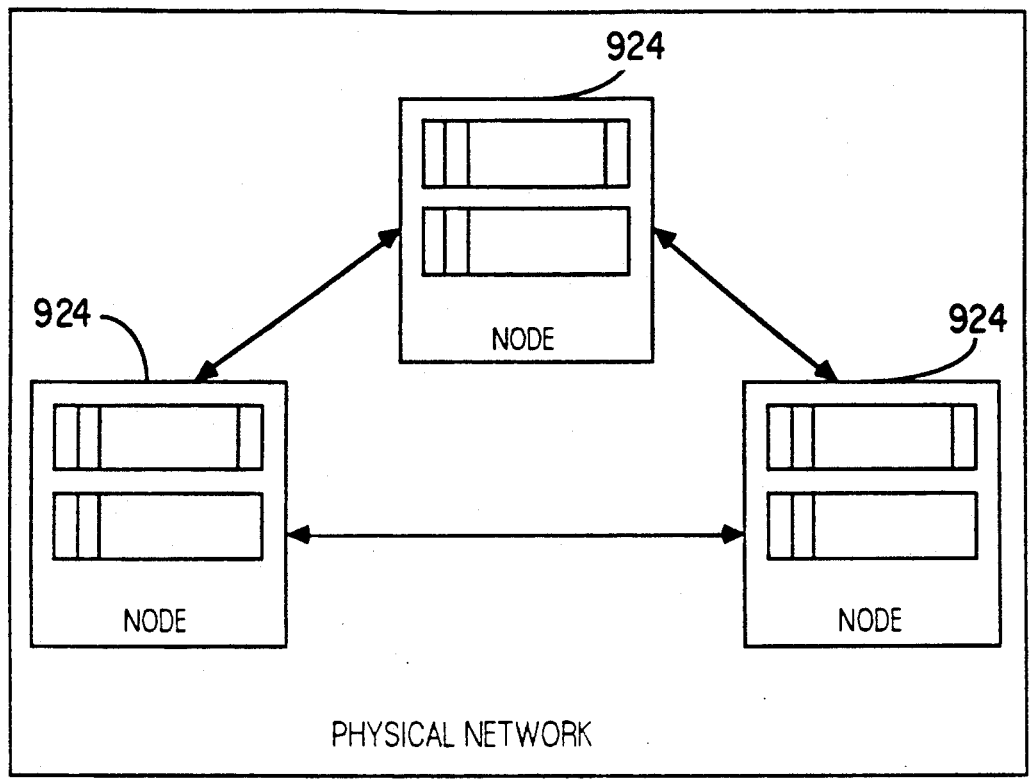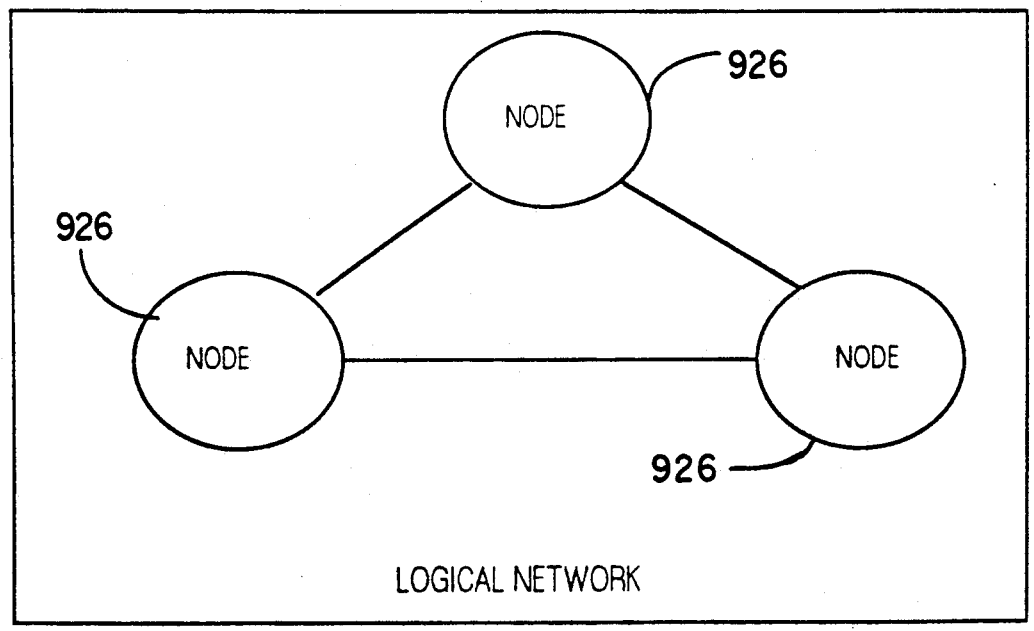
FIG. 9D

NETWORK DATA

1. NODES

| NODE NAME | NODE NO | SITE (OPTIONAL) | NODE TYPE | COUNTRY | NOTES (OPTIONAL) |
|---|---|---|---|---|---|
| | | | | | |

2. FEEDERS

| FEEDER NAME | SITE (OPTIONAL) | FEEDER TYPE | NUMBER OF CHANNELS | NOTES (OPTIONAL) |
|---|---|---|---|---|
| | | | | |

3. LINKS

| ORIGIN NODE | DESTINATION NODE/FEEDER | LINK SPEED | NUMBER OF LINKS | LINK SIZE (OPTIONAL) |
|---|---|---|---|---|
| | | | | |

| NETWORK DATA (CONT) |
|---|

| 4. END CONNECTIONS | | | | | | |
|---|---|---|---|---|---|---|
| TYPE OF TRAFFIC | SPEED | PORT TYPE | COMPUTER PORTS? | NUMBER OF ENDS | MUX NAME | ENDS NAME |
|  |  |  |  |  |  |  |

| NOTES (OPTIONAL) | FLOW CONTROL (LSC ONLY) | CARD VERSION | CARD TYPE | PROTOCOL (LSC ONLY) |
|---|---|---|---|---|
|  |  |  |  |  |

| NETWORK DATA (CONT) |||||
|---|---|---|---|---|
| 5. FIXED MAPPING |||||
| ORIGIN END | ORIGIN MUX | DESTINATION END | DESTINATION MUX | SWITCHING NODE |
|  |  |  |  |  |

| 6. LOGICAL DEVICE ALLOCATION ||||
|---|---|---|---|
| NODE NAME | END NAME | LOGICAL NAME FOR DEVICE | START CHANNEL NUMBER |
|  |  |  |  |

| NETWORK DATA (CONT) ||||
|---|---|---|---|
| 7. CARD DATA ||||
| NODE NAME | CARD TYPE | CARD VERSION | QUANTITY |
|  |  |  |  |

1316

| 8. LINK ALLOCATION ||||
|---|---|---|---|
| NODE NAME | LINK DEVICE NUMBER | LINK DEST. NODE NAME | LINK SPEED |
|  |  |  |  |

| 9. END ALLOCATION ||||
|---|---|---|---|
| NODE NAME | ALLOCATE TO DEVICE NUMBER | END NAME | NUMBER OF ENDS ALLOCATION |
|  |  |  |  |

NETWORK DATA (CONT)

10. SWITCHED NODE PORT CONFIGURATION

| NODE NAME | PORT NUMBER | PORT QUANTITY | PORT CHANNEL | PORT TYPE | PORT DEVICE | PORT PARITY | PORT SPEED | ECHO |
|---|---|---|---|---|---|---|---|---|
|  |  |  |  |  |  |  |  |  |

| SYSTEM MESSAGES | IMP DEST NODE | IMP DEST PORT | AMP DEST GROUP | CNX | DCNX | ACCESS LEVEL |
|---|---|---|---|---|---|---|
|  |  |  |  |  |  |  |

| V.24 | TEST DTR | PORT OPEN: | |
|---|---|---|---|
|  |  |  |  |

FIG.13E

11. PIPE-LINK INDEX

NODE NAME:
PIPE NUMBER:

| | |
|---|---|
| LINK NO 1: | LINK NO 2: |
| LINK NO 3: | LINK NO 4: |
| LINK NO 5: | LINK NO 6: |
| LINK NO 7: | LINK NO 8: |
| LINK NO 9: | LINK NO 10: |
| LINK NO 11: | LINK NO 12: |
| LINK NO 13: | LINK NO 14: |

1322

12. SHORT FORM ADDRESS

NODE NAME:
SHORT FORM ADDRESS:
SHORT FORM NAME:

PORTS

[ Format mm.ppp-ppp or mm.ppp ]

| | | |
|---|---|---|
| 1: | 2: | 3: |
| 4: | 5: | 6: |
| 7: | 8: | 9: |
| 10: | 11: | 12: |
| 13: | 14: | 15: |
| 16: | 17: | 18: |
| 19: | 20: | 21: |
| 22: | 23: | 24: |
| 25: | 26: | 27: |
| 28: | 29: | 30: |
| 31: | 32: | 33: |

13. DUPLICATE SHORT FORM ADDRESS

Enter information of a node and a short form address
associated with it, which you wish to be copied:

NODE:
SHORT FORM ADDRESS:
NODE TO WHICH THE SHORT FORM IS TO BE COPIED:
NODE:

---

14. CONNECTION TEXTS

NODE NAME:

SERVICE READY TEXT:

INVITATION TEXT:

COM TEXT:

DER TEXT:

DISC TEXT:

ERR TEXT:

INV TEXT:

MON TEXT:

NA TEXT:

NC TEXT:

NP TEXT:

OCC TEXT:

```
CASE CONFIGURATION EXPERT SYSTEM   TIME-DATE
                  MAIN MENU

1.   EXPERT SYSTEM ADMINISTRATION
              2.   NETWORK UTILITIES
              3.   MANUAL CONFIGURATION
              4.   CONFIGURATION EXPERT SYSTEM
              5.   CONFIGURATION REPORTS
              6.   CONFIGURATION LOAD MAPS

SELECTION:

RE-select UP_ARROW-up DOWN_ARROW-down ^G-home ^L-previous ^Z-clear/-more
```

FIG. 15    1502

```
          CASE CONFIGURATION EXPERT SYSTEM  DATE-TIME
                  MODIFY SYSTEM PARAMETERS & SECURITY
SUPER USER ID        : BROOKLYN
PASSWORD             : alex
ENTRY POINT          : topmenu
SYSTEM HEADING       : CASE CONFIGURATION EXPERT SYSTEM
MONTH MNEMONICS      : JANFEBMARAPRMAYJUNJULAUGSEPOCTNOVDEC
LOGINFLAG (T/F)      : T
```

FIG. 16    1602

```
          CASE CONFIGURATION EXPERT SYSTEM    DATE-TIME
              ADD OR MODIFY INDIVIDUAL PRIVILEDGES

LOGIN ID        : user      NAME:USER
    GROUP ID        : NU
    PASSWORD        : pass (I)NQUIRE, (A)DD, (M)ODIFY, (D)ELETE
     searched: 10 selected: 10 current: 1
```

```
          CASE CONFIGURATION EXPERT SYSTEM    DATE-TIME
                      NETWORK UTILITIES

1.   LIST NETWORKS
                  2.   SELECT NETWORK
                  3.   CREATE NETWORK
                  4.   RENAME NETWORK
                  5    COPY NETWORK
                  6.   DELETE NETWORK
                  7.   PRINT NETWORK
                  8.   RECOVER NETWORK

SELECTION:
    RE-select UP_ARROW-up DOWN_ARROW-down^G-home^L-previous^Z-clear/-more
```

FIG. 18

```
                CASE CONFIGURATION EXPERT SYSTEM    DATE-TIME
                EDIT NETWORK REQUIREMENTS DATABASE

1   NODES
                    2.  FEEDERS
                    3.  LINKS
                    4   END CONNECTIONS
                    5.  LOGICAL DEVICE ALLOCATION
                    6.  FIXED MAPPINGS
                    7.  VOLUNTARY INFORMATION MENU

SELECTION :
    RE-select UP_ARROW-up DOWN_ARROW-down^G-home^L-previous^Z-clear/-more
```

```
                CASE CONFIGURATION EXPERT SYSTEM     DATE-TIME
(I)NQUIRE                    Nodes
Node Information
Name          : ATLANTA
Number        : 3
Site          : PEACHTREE
Type          : 850
Country       : USA
Notes
(N)EXT, (P)REVIOUS, (S)TOP
searched: 4 selected: 4 current: 1
```
(2002)

FIG. 20

```
                CASE CONFIGURATION EXPERT SYSTEM     DATE-TIME
(I)NQUIRE                    Feeders
Feeder Information
Feeder Name        : BROOKLYN
Site               : 149th Street
Type               : 825
Number of Channels : 8
Notes              : CUSTOMER SERVICES
(N)EXT,(P)REVIOUS, (S)TOP
searched: 1 selected: 1 current: 1
```
(2102)

FIG. 21

```
          CASE CONFIGURATION EXPERT SYSTEM  DATE-TIME
(I)NQUIRE                    Links Link information Origin Node    : WASHINGTON Destination    : DALLAS
(Node/Feeder)
Link Feeder    : 58000

Number of Links: 1

Link Size      : 30

Notes
(N)EXT,(P)REVIOUS,(S)TOP
searched: 5 selected: 5 current: 2
```

```
          CASE CONFIGURATION EXPERT SYSTEM    DATE-TIME
(I)NQUIRE              End Connections Network Ends Information Ends name          : USERS Multiplexor name   : ATLANTA Number of Ends     : 15
Port Type          : UMP
Speed              : 1200

Type of Traffic    : CONV
Protocol (LSC)     : ASYNC

Card Type          : LSC
Card Version       : 4
Flow Control (LSC) : NONE

Notes
(N)EXT, (P)REVIOUS,(S)TOP
searched: 20 selected: 20 current: 6
```

FIG. 23

```
          CASE CONFIGURATION EXPERT SYSTEM    DATE-TIME
(I)NQUIRE              Fixed Mappings Fixed Map Information Origin End         : USERS
Origin Multiplexor : ATLANTA Destination End       : N/A
Destination Multiplexor: N/A Switching Node     : WASHINGTON (N)EXT, (P)REVIOUS, (S)TOP
searched: 2 selected: 2 current: 1
```

FIG. 24                              2402

```
                                    2502
          CASE CONFIGURATION EXPERT SYSTEM    DATE-TIME (I)NQUIRE              Logical Device Allocation Information for Allocation of Ends to Logical Device:

Node Name              : BROOKLYN

End Name               : 149th Street

Logical Name for Device : 825

Start Channel Number   : 8

(N)EXT, (P)REVIOUS, (S)TOP
searched: 13 selected: 13 current: 6
```

FIG. 25

| Node name | Node number | Type |
|---|---|---|
| London | 23 | 840 |
| New York | 10 | 850 |
| Paris | 23 | 850 |
| Enter Node name to choose node,<CR> for more display,'Q' to quit | | |

FIG. 26

| ITEM | FILENAME | DATE | TIME |
|---|---|---|---|
| 1 | HEADSTC | 87/03/23 | 23:59 |
| 2 | NODE45STC | 87/03/22 | 10:21 |
| 3 | TEST1 | 87/03/21 | 16:34 |
| Enter item number to choose map, <CR>for more display, "Q" to quit | | | |

| ERROR MESSAGE: | CAUSE/RESULT: |
|---|---|
| Process aborted, unable to open file for read! | An error returned when trying to open a file in the read_only mode. Fatal, the whole download or upload operation aborted. |
| Disk full, cannot open a new file in the NMC database. Process aborted! | This error occurs when a search for a new filename for a new map has failed after 1000 attempts. The system is assumed to be full under this condition. Fatal, the download operation aborted. |
| Unable to open file for read, STC map upload aborted! | An error is returned when trying to open a file in read-only mode. The upload operation on the STC map aborted. |
| Unable to open file for read, USO map upload aborted! | An error is returned when trying to open a file in read-only mode. The upload operation on the USO map aborted. |
| File read error, STC map upload aborted! | An error returned when reading data from an already opened file. The upload operation on the STC map aborted. |
| File read error, USO map upload aborted! | An error returned when reading data from an already opened file. The upload operation on the USO map aborted. |
| The network is empty, download aborted! | There were no nodes configured in the chosen network in the system. Fatal, the whole download or upload operation aborted. |

FIG. 28 A

| ERROR MESSAGE: | CAUSE/RESULT: |
|---|---|
| Bad configuration - more than 4 addressing buffers. Process aborted! | There were more than 4 BUFs and BEMs found in the master bay. Fatal, the download operation aborted. |
| No STC maps in the database, cannot upload STC maps! | There were no STC maps found. The upload operation on the STC map aborted. |
| No USO maps in the database, cannot upload USO maps! | There were no USO maps found. The upload operation on the USO map aborted. |
| No such STC map, re-enter please. | The STC map the user has chosen does not exist. The user is asked to enter his/her choice again. |
| No such USO map, re-enter please. | The USO map the user has chosen does not exist. The user is asked to enter his/her choice again. |
| Filename not defined, re-enter please. | The user has not given a filename for the new configuration map. The user is invited to enter the filename. |
| Filename length too long, re-enter please. | The filename given by the user has more than 12 characters in it. The user is invited to enter the filename. |

| ERROR MESSAGE: | CAUSE/RESULT: |
|---|---|
| Invalid filename, must be one word alpha-numeric, re-enter please. | The filename given by the user contains some non-alphanumeric characters. The user is invited to enter the filename. |
| A file of this name already exists. Try another name please. | The filename given by the user exists already. The user is invited to enter the filename. |
| No node with this name, re-enter please. | The node that the user has chosen does not exist. The user is requested to choose a node again. |
| Invalid interface type, must be 0 to 2 inclusive. Re-enter please. | The interface type must be one of the members in the constraint set. The user is asked to define the interface type again. |
| Invalid device number in the system device map. Process aborted! | A device number outside 0 to 15 in the device map given by the system is detected. Both STC and USO download are aborted. |
| Invalid base in the system device map. Process aborted. | An invalid base in the system device map has been detected. Both STC and USO download are aborted. |
| Invalid size in the system device map. Process aborted! | An invalid device size in the system device map has been detected. Both STC and USO download are aborted. |

| ERROR MESSAGE: | CAUSE/RESULT: |
|---|---|
| Bad configuration, empty device map. Process aborted. | The device map is empty. Both STC and USO download are aborted. |
| Bad configuration, no addressing buffer. Process aborted! | No BUF or BEM cards are found in the master bay. Both STC and USO download are aborted. |
| Invalid channel in channel map, create STC map aborted! | Invalid channel number in the system channel map has been detected. The STC download is aborted. |
| Map corruption detected, USO map upload aborted! | Erroneous contents encountered when reading from a USO configuration map. The USO upload is aborted. |
| Process aborted, unknown USO version given by system! | USO version given by system is not one of: 2, 20, 3, or 398. The USO down is aborted. |
| Process aborted, USO node number is less than 1! | The node number given by system is less 1. The USO down is aborted. |
| Process aborted, node number for USO2 and 20 must be 1 to 63 inclusive. | The node number given by the system is out of range. The USO down is aborted. |
| Process aborted, node number for USO3 and 3.98 must be 1 to 255 inclusive! | The node number given by the system is out of range. The USO down is aborted. |

| ERROR MESSAGE: | CAUSE/RESULT: |
|---|---|
| Invalid port in short form address table. Process aborted! | The port number is out of range. The USO down is aborted. |
| Invalid range in short form address table. Process aborted! | The range of port in the short form address table is too large. The USO down is aborted. |
| Invalid route number in the routing table. Process aborted. | Route number in the routing out of range. The USO is aborted. |
| Invalid pipe number in the routing table. Process aborted! | Pipe number configured for a route is invalid. The USO down is aborted. |
| Invalid pipe number in the pipe - link index table. Process aborted! | Pipe number in the pipe - link index table is invalid. The USO down is aborted. |
| Invalid link number in the pipe - link index table. Process aborted! | Link number in the pipe - link index table is invalid. The USO down is aborted. |
| Link number repeated in the pipe - link index table. Process aborted! | The link has already been configured in this pipe. The USO down is aborted. |

FIG. 28E    2802

| ERROR MESSAGE: | CAUSE/RESULT: |
|---|---|
| Invalid port in short form address table. Process aborted! | The port number is out of range. The USO down is aborted. |
| Invalid range in short form address table. Process aborted! | The range of ports in the short form address table is too large. The USO down is aborted. |
| Invalid pipe number in the routing table. Process aborted. | Pipe number configured for a route is invalid. The USO down is aborted. |
| Invalid pipe number in the pipe-link index table. Process aborted! | Pipe number in the pipe-link index table is invalid. The USO down is aborted. |
| Invalid link number in the pipe-link index table. Process aborted! | Link number in the pipe-link index table is invalid. The USO down is aborted. |
| Link number repeated in the pipe-link index table. Process aborted! | The link has already been configured in this pipe. The USO down is aborted. |

```
(SC_REPS) CASE CONFIGURATION EXPERT SYSTEM  DATE-TIME
               REPORTS ON SCREEN

1.   PHYSICAL CONFIGURATION
        2.   DEVICE MAP
        3.   CHANNEL MAP
        4.   SWITCHED NODE ROUTING MAP
        5.   PORT CONFIGURATION INQUIRIES
        6.   PIPE-LINK INDEX INQUIRIES
        7.   SHORT FORM ADDRESSES INQUIRIES
        8.   CONNECTION TEXTS

RET-select UP_ARROW-up DOWN_ARROW-down  ^G-home ^L-previous ^Z-clear/-more
```
                                2902

FIG. 29

```
                                                                    ┌─3002
┌──────────────────────────────────────────────────────────────────┐
│ PLEASE ENTER THE NAME OF THE NODE FOR WHICH YOU WANT THE         │
│ PHYSICAL CONFIGURATION                                           │
│ ATLANTA                                                          │
│ SEARCHING DATA BASE.....                                         │
│                  PHYSICAL CONFIGURATION                          │
│ NODE NAME: ATLANTA  RACK SORT: MEDIUM  NUMBER OF BAYS: 2         │
│  SLOT : 1  2  3  4  5  6  7  8  9  10 11 12 13 14 15 16 17       │
│ CARD :BEM BUF .  .  .  BCH MON NCM BLK USO USO ARQ ARQ ARQ STC   │
│ VERSION:1  2  .  .  .  1   1   1       1  20  20  2   2   1  1   │
│                     EXPANSION BAYS                               │
│ CARD : LSC LSC LSC LSC LSC LSC LSC LSC LSC LSC LSC LSC.....BTM BUF│
│ VERSION:3   3   3   3   3   3   3   3   4   4   4   4      1  2  │
│                                                                  │
│ PRESS RETURN TO CONTINUE                                         │
└──────────────────────────────────────────────────────────────────┘
```

FIG. 30

```
                                                         ┌─3102
┌───────────────────────────────────────────────────────┐
│         DEVICE MAP FOR THE ATLANTA NODE (NODE NUMBER 3)│
│                                                       │
│    DEVICE NR    BASE     SIZE    NOTES                │
│       0           1       48                          │
│       1          49       44                          │
│       2          93       36                          │
│       3         129       38                          │
│       5         165        2                          │
│       9         187        1                          │
│      13         188        3                          │
│      14         171        1                          │
│      15         172       15                          │
│                                                       │
│                                                       │
│  PRESS RETURN TO CONTINUE                             │
└───────────────────────────────────────────────────────┘
```

FIG. 31

| CHANNEL MAP FOR THE ATLANTA NODE (NODE NUMBER 3) ||||| 
|---|---|---|---|---|
| CH1 | ORIG. END | ORIG. MUX | CH2 | TYPE |
| 0.1 | USERS | ATLANTA | 0.1 | UMP |
| 0.2 | USERS | ATLANTA | 0.2 | UMP |
| 0.3 | USERS | ATLANTA | 0.3 | UMP |
| 0.4 | USERS | ATLANTA | 0.4 | UMP |
| 0.5 | USERS | ATLANTA | 0.5 | UMP |
| 0.6 | USERS | ATLANTA | 0.6 | UMP |
| 0.7 | USERS | ATLANTA | 0.7 | UMP |
| 0.8 | USERS | ATLANTA | 0.8 | UMP |
| 0.9 | USERS | ATLANTA | 0.9 | UMP |
| 0.10 | USERS | ATLANTA | 0.10 | UMP |
| 0.11 | USERS | ATLANTA | 0.11 | UMP |
| 0.12 | USERS | ATLANTA | 0.12 | UMP |
| 0.13 | USERS | ATLANTA | 0.13 | UMP |
| 0.14 | USERS | ATLANTA | 0.14 | UMP |
| 0.15 | USERS | ATLANTA | 0.15 | UMP |
| 0.16 | USERS | ATLANTA | 0.16 | UMP |
| 0.17 | USERS | ATLANTA | 0.17 | UMP |

ROUTING MAP FOR THE ATLANTA NODE (NODE NUMBER 3)

DESTINATION DALLAS

PRIMARY ROUTE : 4
SECOND ROUTE : 2
THIRD ROUTE : 0
FOURTH ROUTE : 0

DESTINATION NEW YORK

PRIMARY ROUTE : 2
SECOND ROUTE : 4
THIRD ROUTE : 0
FOURTH ROUTE : 0

DESTINATION WASHINGTON

PRIMARY ROUTE : 4
SECOND ROUTE : 2
-----MORE-----

FIG. 33

EXPERT AND DATA BASE SYSTEM AND METHOD FOR COMMUNICATIONS NETWORK

This application is a continuation of application Ser. No. 07/598,805, filed Oct. 17, 1990, now abandoned, which is a continuation of Ser. No. 07/374,625, filed Jan. 30, 1989, now abandoned, which is a continuation of Ser. No. 07/029,504 filed Mar. 23, 1987, now abandoned.

BACKGROUND OF THE INVENTION

1. Field of the Invention

The present invention is related generally to expert systems utilized with database systems, and more particularly, to expert systems and methods utilized within the data communication industry.

2. Description of Related Art

A communications network is a chain of terminals and computer ports or other facilities organized for simultaneous operation. The number of devices might be anywhere from two up to several hundred or even thousands. In general, communications networks are an extremely efficient way of using and sharing communications resources.

FIG. 1 depicts in block diagram form a typical network where a communications network user 110 communicates with communications network user 112 via a telephone line, utilizing modulator/demodulators (modems) 106 and 108, to convert the digital signals from the computer terminal 102 and 104 to corresponding analog signals suitable for transmission via the telephone line. In order to maximize the utilization of communications resources, more than two communication network users need to utilize a telephone line simultaneously. In order to do this, various communications techniques have evolved. One of the most common communications techniques utilized in a conventional network is to introduce a third entity, multiplexer (MUX) 202 and/or 204, into the communication network 214, as shown in block diagram form in FIG. 2.

The multiplexers 202, 204 are devices utilizing a technique whereby the simultaneous transmission of separate information is realized. As applied to communications networks, the term multiplexer refers to methods for sharing the network path which is usually a single cable of some kind, such as a telephone line.

Time-division multiplexing (TDM) is a common and useful multiplexing method. In time-division multiplexing, there is only one real channel which the users "take turns" using. There are many ways this "turn-taking" can be controlled. Typically in TDM, time is divided, with each segment of time being in effect a private "channel within a channel." As shown in FIG. 3 (where instead of two users we have four users), we can see that time division multiplexing would breakup the turn taking into brief predetermined lengths of time called time slots, (there are four time slots shown). Conventional TDM networks operate in the 1 kilobit per second (kbs) data rate range and up. Representative data rates include the Case DCX multiplexed network which operates, for example, between 1.2 and 64 kbs. Also representative of conventional TDM networks is the so-called T1 network, which operates at approximately 1.54 megabit per second data rate. Other representative examples include T2, T3 and T4 networks which typically operate in the higher megabit per second range. Note that these are representative examples of conventional TDM networks.

Time division multiplexing thus has become a widely used conventional communications network technique that allows the usage of a single resource for many users. However, TDM is physically limited by the amount of sampling or turn taking time into which a channel can be broken.

This limitation was overcome in yet another technique, which is commonly referred to as statistical time division multiplexing or STDM. In STDM, allocation of "turn taking" or sampling by communications network user 404 is based on a statistical sample 406 of the channel 402 in question as shown diagramatically in FIG. 4. The time slots 406 are allocated to communication network users 404 dynamically according to the level of digital data from each user 404. The statistical sampling and allocation of time slots 406 results in a many fold increase in the number of users 404 that can actively utilize any one communications channel 402 by maximising the available multiplexing time. Modern communications networks utilize STDM as part of the communications network topology to increase user 404 utilization and economies of scale.

As shown in block diagram form in FIG. 5, a multiplexer communication network 500 can comprise a number of multiplexers (which are contained in a node 506 and a feeder 508) interconnected by composite links 504. A composite link 504 is capable of carrying a number of communications simultaneously by multiplexing. When the connection between two end points (ends) 502 of the communication network 500 is realized by the communications network 500, the connection passes through a number of multiplexers (feeders 508/nodes 506) and composite links 504. As stated above, multiplexer function may be part of either a node 506 or feeder 508. The function of a node 506 is to switch communications traffic between a number of ends 502, such as computer ends 510 or terminals ends (not shown). The function of a feeder 508 is to concentrate the communications traffic from a number of ends 502 into single composite links 504, which traffic can then be fed into a node 506.

The nodes 506 and links 504 through which a "permanent" connection passes (not explicitly shown), and the channels used on those links 504, are fixed at configuration time of the communications network 500. The nodes 506 and links 504 through which a user-switched, or non-permanent connection, passes, and the channels used for such connection, are determined at connection time of the communications network 500.

From the point of view of a user of the communications network 500, a multiplexer switched data network should be comparable with a black box, which after having been supplied, transfers/transports information without interference from any terminal or computer user. Therefore the resulting connection may be essentially seen as "transparent" which means that the output data from the network is the same as the input data to the network regardless of any transformation of data within the network. In this way, two ends can be matched even though they are different in nature.

An inter-network relationship can be established with other networks, as shown in FIG. 6, where various communications networks have been tied into a multiplexer switcher for communication purposes. The objective of an inter-network relationship is to maintain network independence while at the same time providing a communications path for cooperation between end users located in different networks. Therefore, networks may provide the source, destination or part of the route for a route involving a multiplexer switch.

Composition of a network in a conventional multiplexer switch system is as follows. Referring again to FIG. 5, a communications network has a number of nodes 506 at which traffic is switched between end points 502 of the communications network. Each node 506 contains a number of devices which perform data input and output. A device is a printed circuit board (card or a group of cards) which provides the interface to a number of ends 502 or to a composite link 504. Within a node 506, each device is identified by a unique device number. Each device has one or more channels, each of which can carry data from one end connection across the communications network. A device providing the interface to a number of end points 502 has a channel for each end point 502. When a device provides an interface to a composite link 504, it has a channel for each channel on the composite link 504. The size of a device is the number of channels it contains.

Within a device each channel is identified by a unique number, called its channel number. For each device, the relative channel number starts at one and continues upward, the highest channel number being equal to the size of the device. Each channel is also identified by another number, which is an absolute number that is unique to the node 506. A nodes device map (not shown) consists of a list of all of the devices in the node 506, together with their sizes and the absolute channel numbers of their channels. When a connection between two end points 502 of the communications network passes through a node 506, the two channels by which it enters and leaves the node 506 are connected to each other.

The path connections taking place over the communications network 500 are defined by the routing map (not shown). There is a routing map in each node 506, which routing map shows which devices may be used to carry user switch connections to other entities in the communications network 500. A list of pipes is given (a pipe is a set of links 504 that are defined by the user at configuration time). At run time, connections to the destination node are assigned to the devices of the pipes in the routing map, using the first on the list of preferences, and then the second, and so on.

A physical description of a node 506 is shown in FIG. 7 and in FIG. 8. The physical description of a node 506 is the inventory of all its components and their arrangement in relationship to each other. Specifically, a node 506 comprises a master bay 802, and one or more expansion bays 804 (if present) as extensions. For any one node 506, there is a minimum set of cards required inserted into slots 702 of the master bay 802 and the expansion bays 804 (if present). Other cards can be added or deleted according to the functionality of the node 506, depending on the user requirements.

Cards are inserted into the slots 702 of either the master bay 802 or the expansion bays 804 depending on the type of card. The range of components of a node 506 is: a rack, a master bay 802, expansion bays 804 and a set of cards.

Representative card types are defined as follows:

1) Node infrastructure cards—such as user switching options, timing and control, bus extension module, bus termination module, system test and configuration, or buffer cards.

2) Node link cards—such as automatic repeat request (ARQ) or composite links cards.

3) Gateway cards—such as a gateway to foreign networks-X.25, or SNA cards.

4) User requirement cards—such as low speed channel (LSC), or protocol conversions cards.

5) Management cards—such as network control and access module, select and monitor a data channel, or event log and information service cards.

A gateway, a link, or a management card is a device, as is any user card. The whole set of channel cards in a node 506 is one device.

Network configuration is the process by which a user's functional description of the communications network 500 in terms of end points 502 and their connectivity potential (user requirements) is mapped into a logical network; a physical network is obtained from the logical network. The initial network configuration task is the process by which an unconfigured communications network is configured from the user's requirements.

The partial network configuration task is a configuration process by which additional functionality requirements are mapped into the communications network with physical and/or logical network constraints. This partial configuration involves adding or modifying the logical network entities currently in use, but may or may not involve adding or modifying the physical network.

Further, as shown in FIG. 5, when nodes 506 proliferate on the communications network 500, it can be readily appreciated that total configuration of a network beginning with the initial engineering stages requires many man hours of planning and deployment. Various engineering economies are involved, including channel costs, channel speed, bandwidth, and the availability, reliability, and number of links. If a communications network is configured inadequately at the beginning, and/or installed based on erroneous information, expenditures required to alleviate the design criteria or deployment errors may be enormous. Further complicating the communications network configuration problem is the inevitable growth of the number of users accessing the communications network.

Network reconfiguration therefore can require tremendous outlays of manpower and resources.

Research shows that the main reasons for (re)configuration are: addition of terminals and/or computer ports (that is, addition of ends 502), addition of nodes 506, changes in user connection requirements, addition of feeders 508, or changes in composite links 504. Every time a reconfiguration occurs, research shows that the first reconfiguration attempt introduces errors which necessitate re-working of the configuration. Without taking into account major network re-configurations, an average of 140 small reconfigurations per year in a network with 20 nodes or more, requires 1.5 man-days per reconfiguration to be implemented on average. Therefore one can readily appreciate the enormous capital outlay required do manage the configuration process for a communications network.

Articles and publications relating to the subject matter of the present invention included the following (which are incorporated herein by reference):

1. Programming Expert Systems in OPS 5—An Introduction to Rule-Based Programming—Lee Brownston, Robert Farrell, Elaine Dant, Nancy Martin—Addison —Wesley Publishing Company Ltd—1985.

2. Principles of Rule-Based Expert Systems—Bruce G. Buchanen, Richard O'Dude—Heunistic Programming Project—Report No HPP-82-14—Stanford University, 1982.

3. Frame-Base Computer Network Monitoring—Lawrence A. Stotile—Proc. AAAI, 1982.

4. Compass: An Expert System For Telephone Switch Maintenance—S K Gayal, D S Preven, A V Lemenon, A Gundesson, R E Reinke—Expert Systems, July 1985, Vol 1, No 3.

5. YES/MVS—A Continuous Monitoring Expert System For Computer Operations—R L Ennis, J H Griesen, S J Hong, M Karnaugh, J K Kastner, D A Klein, D R Milliken, M I Schol, H M Van Woerkom—IBM Jnl. Research & Development, Vol 30, No 1, January 1986.

6. R1: An Expert in the Computer Systems Domain—J McDermouth—Proc. AAAI, 1980.

7. The OPS 5 User's Manual—C L Forgy—Technical Report—Carnegie-Mellon University—Department of Computer Science, 1980.

8. The OPS-83 TM User's Manual—C L Forgy—Production Systems Technologies Inc, 1985.

9. Artificial Intelligence Prepares For 2001—N J Nilsson—The AI Magazine—Winter 1983.

10. ACE—An Expert System For Telephone Cable Maintenance—G T Vesonder, S J Stofo, J E Zielinster, F D Miller—Proceedings of IJCAI—1983.

11. UNIFY TM —Relational Data Base Management System—Reference Manual Release 3.2—Unify Corporation, Inc—1985.

12. DCX—User Guide—Case Communications Ltd., London, England—1985.

SUMMARY OF THE INVENTION

The present invention comprises a communications network configuration expert system and method and a communications network configuration database system and method. The expert system of the present invention, operating either jointly or separately from the database system of the present invention, provides the means for a total communications network configuration. The present invention enables a human user to define and maintain a communications network configuration database with means to transfer the communications network configuration data to a communications network. Means are also provided in the present invention to transfer configuration information from a communications network to the present invention for purposes of (re)configuration of the communications network. The present invention also validates the communications network user requirements and generates user options for the full or partial (re)configuration tasks of a communications network.

The expert system of the present invention produces more consistent, reliable, and reproducible communications network (re)configuration results than a human expert.

The present invention has the further capability of performing communications network (re)configuration within a variety of communications methodology, including various time division multiplexing (TDM) schemes, and statistical time division multiplexer schemes (STDM), such as Case Communications PLC multiplexer networks.

BRIEF DESCRIPTION OF THE DRAWINGS

The present invention is better understood with reference to the specification and the following drawings, in which:

FIG. 9D comprises a simplified view of the physical and logical layers of a communications network 500.

FIGS. 13A to 13G are typical tables of user input requirements data utilized by the present invention to configure/reconfigure a communciations network.

FIG. 15 is a typical main menu screen of the present invention.

FIG. 16 is a typical screen illustrating the security aspect of the present invention.

FIG. 17 is a typical screen illustrating a typical format of the specification of individual privileges of the user of the present invention.

FIG. 18 is a typical screen illustrating a typical network utilities menu of the present invention.

FIG. 19 is a typical screen illustrating a typical menu of the network requirements database 908.

FIG. 20 is a typical screen illustrating a typical format used to update the nodes table 1302.

FIG. 21 is a typical screen illustrating a typical format used to update the feeders table 1304.

FIG. 22 is a typical screen illustrating a typical format used to update the links table 1306.

FIG. 23 is a typical screen illustrating a typical format used to update the end connections table 1308.

FIG. 24 is a typical screen illustrating a typical format used to update the fixed mapping table 1310.

FIG. 25 is a typical screen illustrating a typical format used to update the logical device allocation table 1312.

FIG. 26 is a typical screen illustrating the configuration maps 1404, 1406, 1408, 1322 that can be downloaded into a communications network by the present invention.

FIG. 27 is a typical screen illustrating the configuration maps 1404, 1406, 1408, 1322 that can be uploaded from a communications network by the present invention.

FIG. 28A to 28F show typical screens illustrating the download and upload task error messages produced by the present invention.

FIG. 29 illustrates a typical screen of the reports menu of the present invention.

FIG. 30 illustrates a screen of a typical physical configuration 1402 of a node by the present invention.

FIG. 31 illustrates a screen of a typical device map 1404 of a node produced by the present invention.

FIG. 32 illustrates a screen of a typical channel map 1406 of a node produced by the present invention.

FIG. 33 illustrates a screen of a typical routing map 1408 for a node produced by the present invention.

DETAILED DESCRIPTION OF THE PREFERRED EMBODIMENTS

| TABLE OF CONTENTS |
|---|
| I. BRIEF OVERVIEW OF THE PRESENT INVENTION |
| II. SYSTEM ARCHITECTURE |
| III. MAIN BUILDING BLOCKS |
|    A. NETWORK DATABASE |
|       1. REQUIREMENTS DATABASE |
|       2. CONFIGURATION DATABASE |
|       3. DATA STRUCTURE OF THE REQUIREMENTS DATABASE AND THE CONFIGURATION DATABASE |
|    B. THE EXPERT SYSTEM |
|       1. RULE (KNOWLEDGE) BASE |
|          a. VALIDATION MODULE |
|          b. NETWORK CHECK MODULE |
|          c. PRE-CONFIGURATION MODULE |
|          d. FIRST LOGICAL END MODULE |
|          e. PARTIAL CONFIGURATION MODULE |
|          f. FULL CONFIGURATION MODULE |
|          g. LINK ALLOCATION MODULE |
|          h. ASSIGN CHANNEL CARDS NUMBERS MODULE |
|          i. LINK SIZING-DEVICE MAP MODULE |
|          j. ROUTING MAP MODULE |
|          k. SECOND (LOGICAL) END ALLOCATION MODULE |
|          l. CHANNEL MAP MODULE |
|       2. INFERENCE ENGINE |
|       3. WORKING DATABASE |
|    C. THE MAN-MACHINE INTERFACE |
|       1. USER MODEL |
|       2. OPERATIONS/MEDIA |
|       3. MENU STRUCTURES OF THE PRESENT INVENTION |
|       4. MENU COMMAND KEYS |
|       5. FORM COMMAND KEYS |
| IV. USER OPERATION |
|    A. SUPPLYING NETWORK DATA |
|       1. CREATING AND SELECTING THE NETWORK |
|    B. OPERATION |
|       1. ACCESSING THE PRESENT INVENTION |
|          a. VALIDATE NETWORK DATA |
|          b. CONFIGURE NETWORK |
|          c. STORE NETWORK DATA AND CONFIGURATION RESULTS |
|       2. NETWORK CONFIGURATION |
|          a. DOWNLOAD CONFIGURATION MAPS INTO NETWORK |

-continued

TABLE OF CONTENTS b. UPLOAD CONFIGURATION MAPS INTO NETWORK
- C. USER REPORTS
- D. LIST OF VALIDATION MESSAGES
  1. NETWORK CONSISTENCY
  2. NETWORK CONSISTENCY
  3. NODES VALIDATION
  4. FEEDERS VALIDATION
  5. LINK VALIDATION
  6. ENDS VALIDATION
  7. CARDS VALIDATION
  8. END ALLOCATION VALIDATION
  9. LOGICAL DEVICE VALIDATION
  10. MASTER BAY VALIDATION
  11. BUFFER CARD VALIDATION
  12. CHANNEL MAPPING
  13. LINK SIZING
  14. PHYSICAL CONFIGURATION
  15. ROUTING
  16. GENERAL SYSTEM

I. BRIEF OVERVIEW OF THE PRESENT INVENTION

Figure 9A:
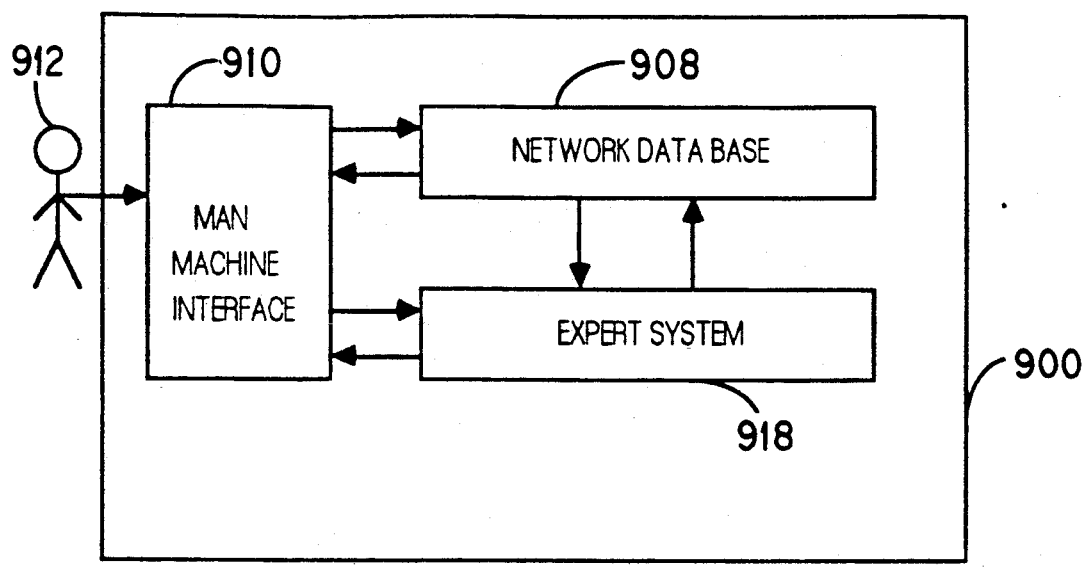
FIG. 9A is a simplified block diagram of the three main building blocks of the present invention architecture.
Figure 9B:
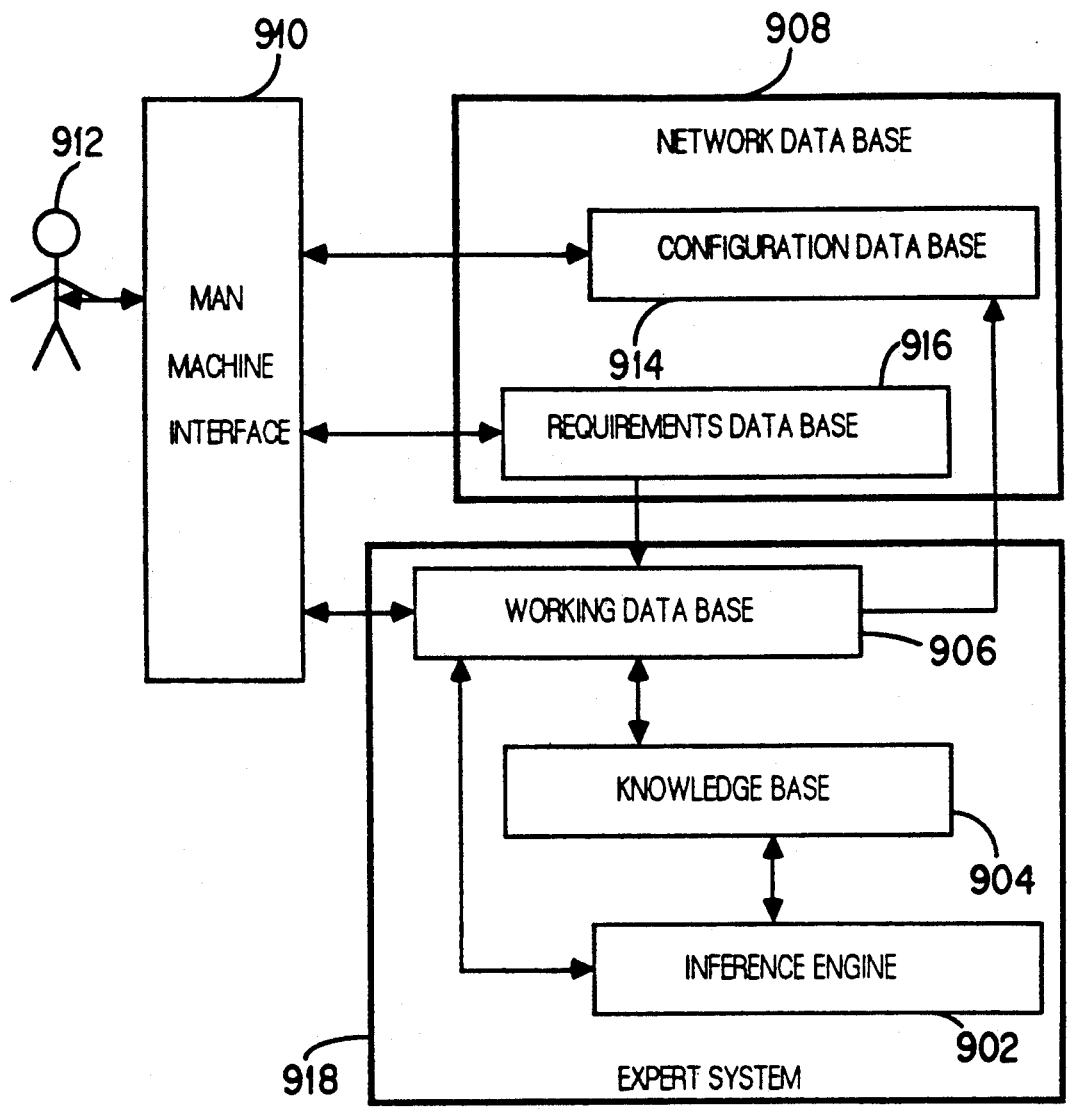
FIG. 9B is a first level decomposition of FIG. 9A.
Figure 9C:
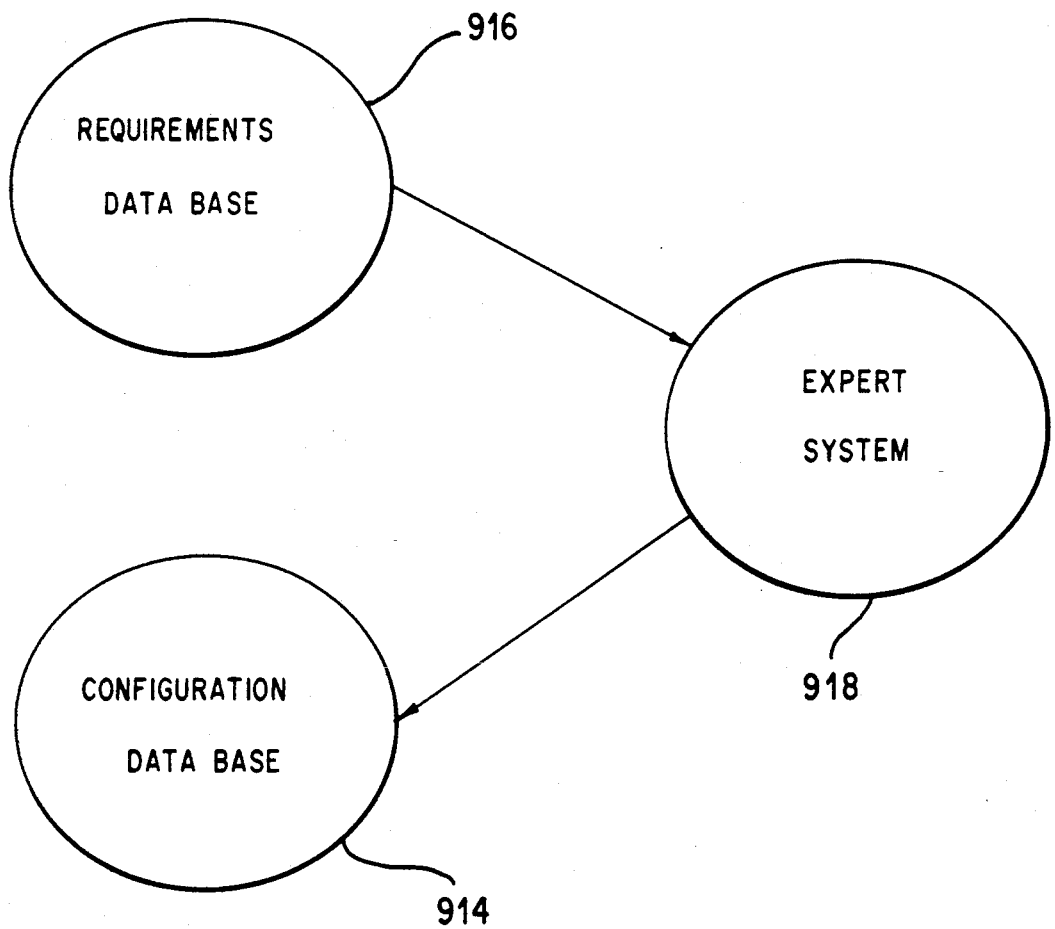
FIG. 9C is a simplified block diagram showing the main steps of operation of the present invention.

The present invention, as shown in FIG. 9C, is related to expert systems 918 and database systems 914 and 916, and in particular for their selectable or integrated use in assisting the human communications network manager in achieving and maintaining the configuration of the communication network.

An expert system is a computer system that contains knowledge about a particular field and emulates the reasoning processes of human experts. Expert systems techniques are beginning to be applied to real problems in industry. The process of building an expert system is often called knowledge engineering. It typically involves a special form of interaction between the expert system builder, called the knowledge engineer, with one or more human experts in the problem area (domain of discourse). The knowledge engineer "extracts" from the human experts their procedures, strategies, and rules of thumb for problem solving, and builds this knowledge into an expert system. The result is a computer system that solves problems in the domain of discourse in much the same manner as an human expert.

The expert system building tool is the programming language used by the knowledge engineer to build the expert system. These tools differ from conventional programming languages in that they provide convenient ways to represent complex, high level concepts and knowledge. The user is the human who uses the expert system once it is developed.

Communications network configuration management is the support of all the management functions required by the human network administrator charged with accurately configuring and reconfiguring a communications network system, such as communications multiplexer networks.

The inventors have determined that there are excellent reasons for using expert system techniques to augment human reasoning in the communications configuration management area. One advantage of an expert system is its permanence. Human expertise can quickly fade, regardless of whether it involves mental or physical activity. When knowledge is encapsulated by an expert system, it is preserved forever.

The inventors have discovered another advantage of an expert system applied to network configuration. This advantage is the ease with which the configuration knowledge can be provided at different locations.

The expert system of the present invention also produces more consistent, reproducible results in network configuration than does human expertise. For example, the human expert may make different decisions in identical situations because of emotional factors. Additionally, the human may forget to use an important rule in a crisis situation involving a network because of time pressures or stress. The expert system of the present invention is not affected by frailities.

Another advantage of the expert system of the present invention is its low cost. Human experts in the communications area are very scarce, and hence very expensive. The expert system of the present invention, by contrast, is relatively inexpensive. While the present invention was costly to invent and develop, it is inexpensive to operate.

The task of creating and recreating communications network ready-to-load communications routing tables, device and channel tables, and checking them for consistency and completeness is very onerous. As can be appreciated from FIG. 5, the complexity of this task rises logarithmically with the growth of the number of nodes on a communications network.

Figure 1:
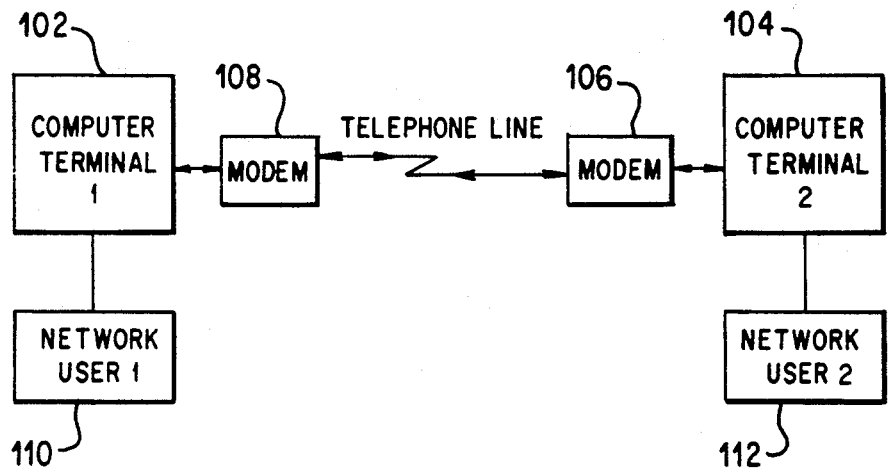
FIG. 1 is a simplified block diagram of a simple modem communications network.
Figure 2:
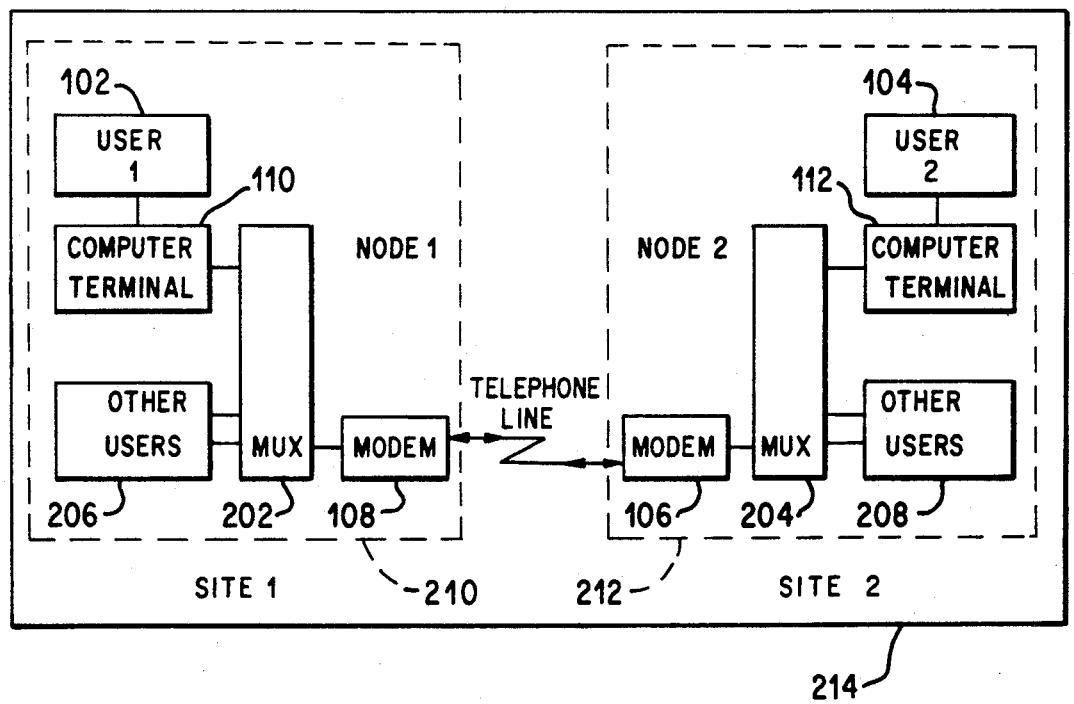
FIG. 2 is a simplified diagram of a simple multiplexer communications network.
Figure 3:
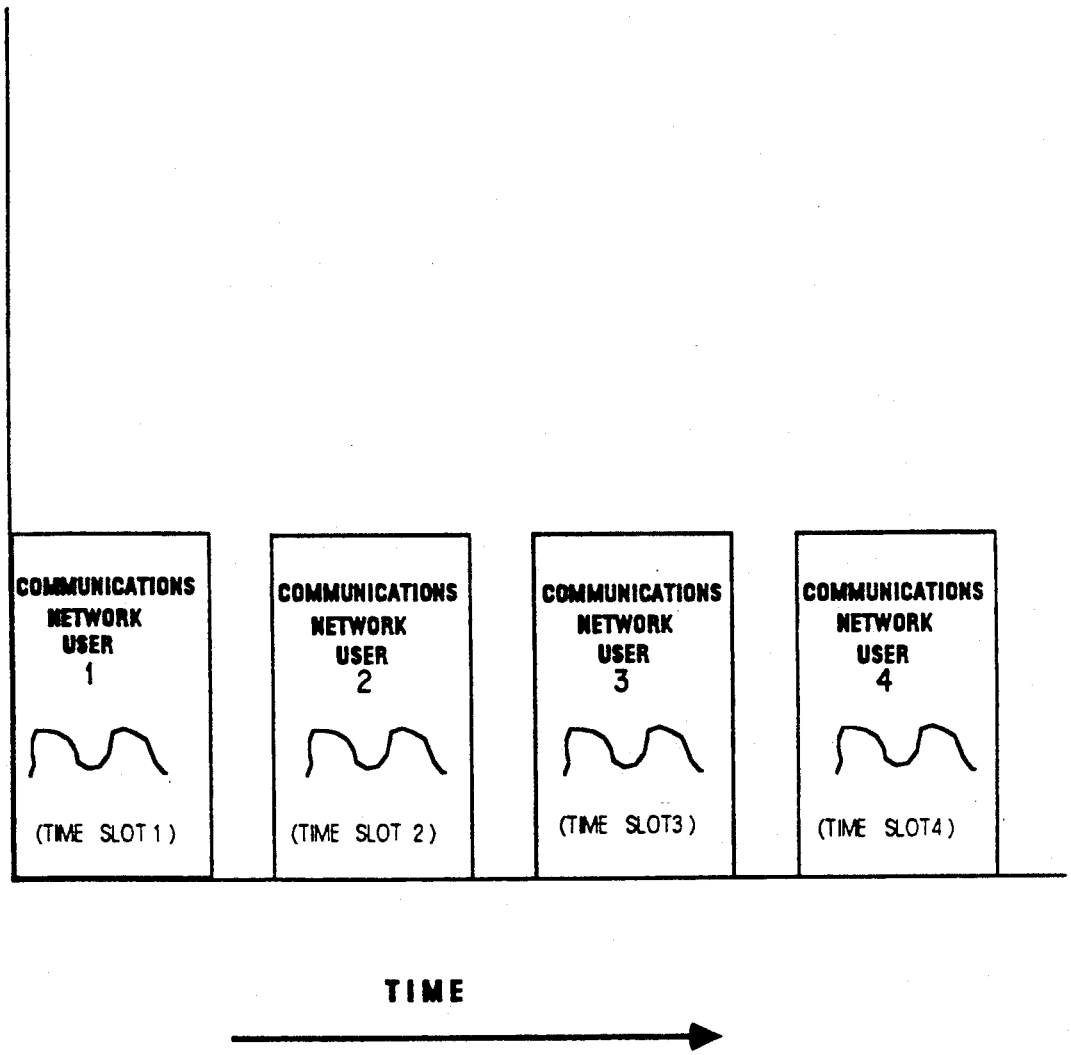
FIG. 3 shows diagramatically the time division multiplexing (TDM) technique.
Figure 4:
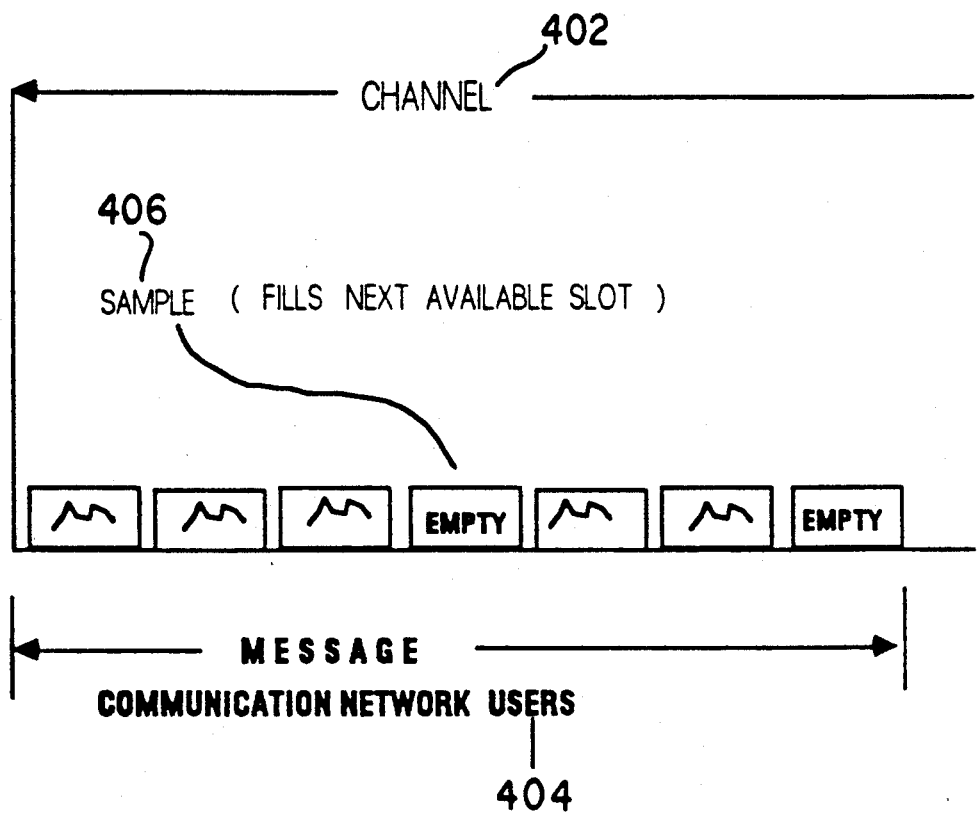
FIG. 4 shows diagramatically the statistical multiplexing technique.
Figure 5:
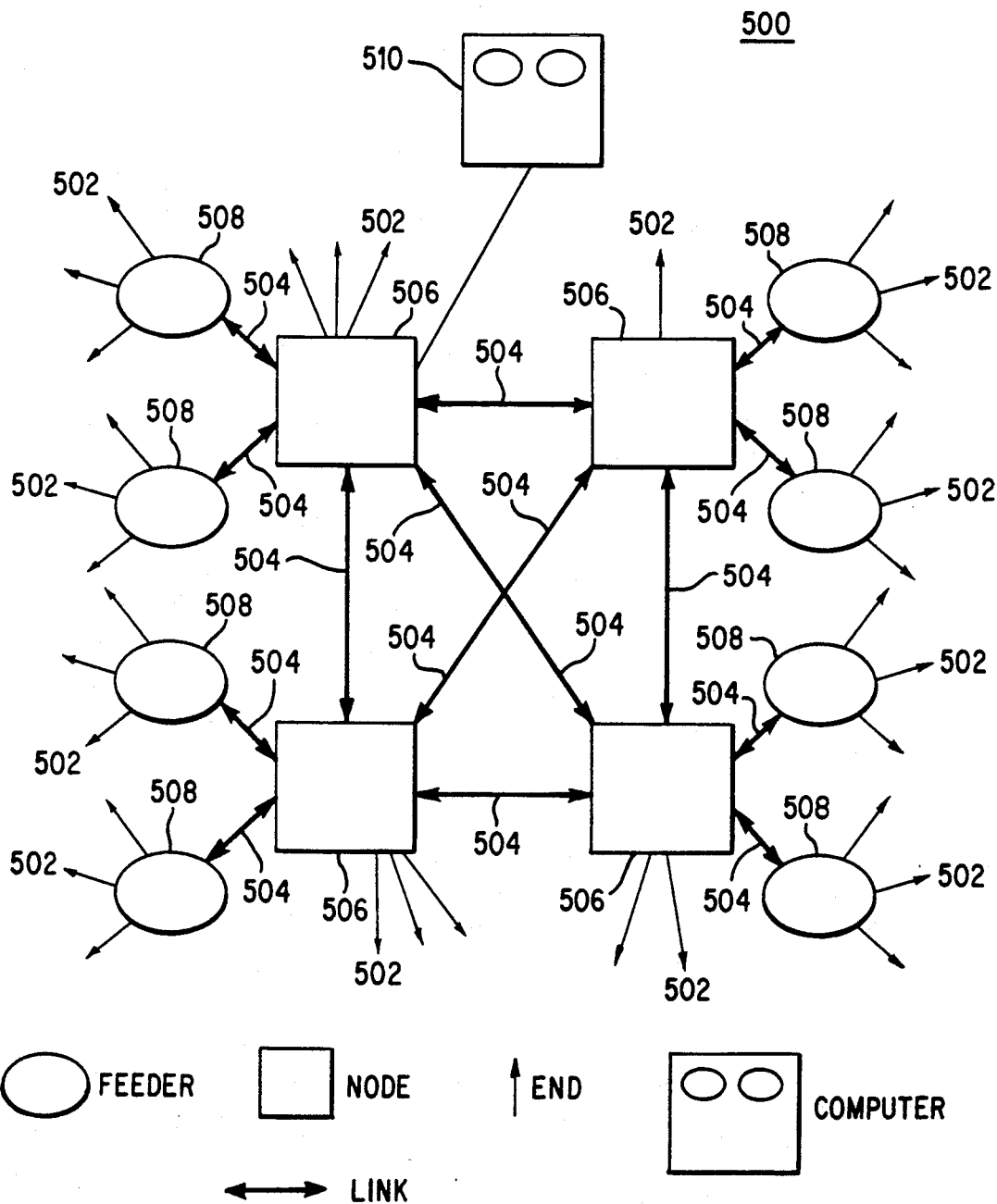
FIG. 5 is a simplified block diagram of a multiplexer communications network having nodes, feeders, ends, links and computer ports.
Figure 6:
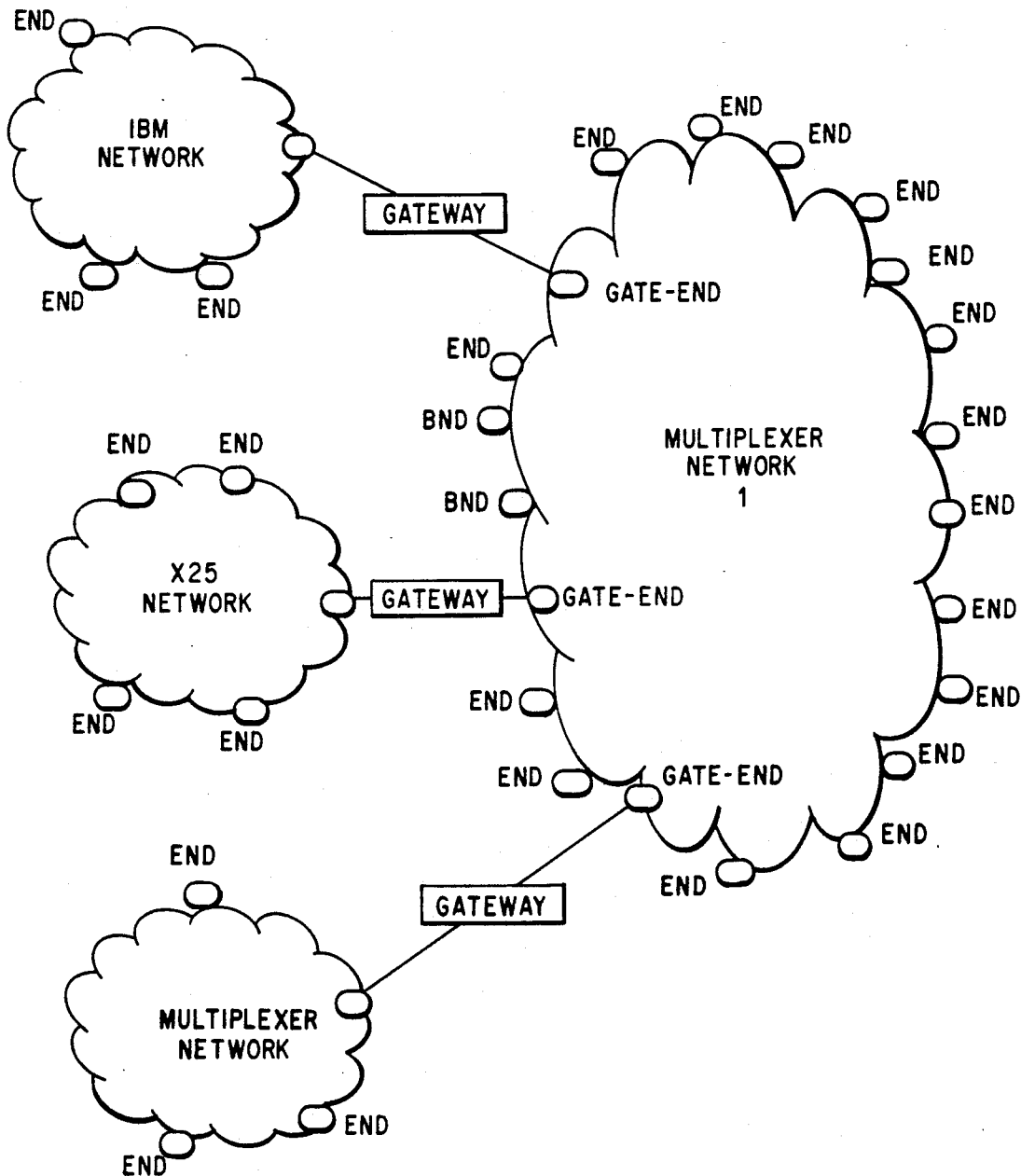
FIG. 6 shows a simplified diagram of a multiplexer communications network as part of or interfaced with other foreign networks and ends.

As shown in FIG. 5, the basic function of a communications network 500 is to connect together any two end-users of the network (ends) 502 on the edge of the communications network 500, such as terminals ends 502 and computer ports 510 ends, so that data (digital and voice) can pass between them without change from end 502 to end 502. The resulting connection is transparent.

Typical communications network usage requirements change significantly over time, and are defined in terms of how many ends 502 and their characteristics a communications network 500 will have at its edges and their connectivity.

The configuration task, as shown in FIG. 9C of a communications network 500 is a process which produces a complete description of the physical and logical communications network (that is, the configuration data base 914) from the network usage requirements (that is, the requirements database 916). Referring now to FIG. 9D, a typical communications network 500 is composed of the physical network 920 with its physical nodes 924 (defined in terms of its hardware subcomponents), and the logical network 922, with its logical nodes 926 (defined in terms of its software logical entities and their interrelationship with the physical network 920).

The task of producing the physical network 920 and the logical network 902 from the user requirements can be done partially or totally by the present invention. Accordingly, two processes can be defined: a full network configuration process, and a partial configuration (configuration with constraints) process. Both processes can be performed many times over in the lifetime of a communications network 500—typically this occurs every time the user requirements change.

Prior to the present invention, this configuration/reconfiguration task was done manually. The complexity of this task rises logarithmically with the growth of the communications network components and the communications network usage requirements.

The present invention is applicable to configuration and reconfiguration of communications networks for data and voice communications utilizing TDM, and/or STDM, such as the DCX STDM network, and the T series TDM networks and the like.

The present invention provides the human network manager (user) the means for a complete (re)configuration task of the communications network 500. It offers him a high level tool in the form of an expert system 918 and a method capable of assisting him in the configuration task, and a lower level tool in the form of a configuration database 914 and a method capable of maintaining configuration data.

In the present invention there are three main entities (building blocks) of interest. Referring again to FIG. 9C, it is shown that the three areas work together by providing an input data store or requirements database 916, operating on the data with an expert system 918, and then sending the data output of the expert system 918 to a new data store, the configuration database 914. Described another way, these main entities involved in the sequence of operation of the present invention specifically are:

(1) a requirements database 916 which is able to maintain complete information of the ends 502 of the communications network 500 and their connectivity requirements;

(2) a configuration database 914, which is able to maintain the physical inventory aspect of the communications network 500, as well as all aspects of the logical network 922 and its relationship with the physical network 920.

(3) an expert system 918 which encapsulates the specific configuration domain knowledge for a communications network 500.

The expert system 918 of the present invention takes as an input the user requirements from the configuration database 914 and outputs expert configuration data for the communications network 500, which is then stored and maintained by the configuration database 914 (and which can be downloaded to the nodes 506 in the communications network 500 for configuration/reconfiguration).

Therefore, the overall operation of the present invention is as follows:

The human user 912 can define, modify, update and maintain the requirements database 916 from which he can activate the expert system 918 in the form of a dialogue session. The expert system 918 then validates these requirements, suggests user corrections for errors, and carries out the task of configuration of the communication network 500. The output of this task is then stored in the configuration database 914. This entire process represents one cycle of the operation of the present invention.

Further, the human user 912 of the present invention can manually define, maintain, and update the configuration database 914 or he can hand tune the output of the expert system 918. He also can reform the configuration data of the communications network 500 from a human readable form into a network loadable configuration form to be loaded into the communications network 500. This entire process represents the second cycle of the operation of the present invention.

Further adding to the ease of use and accessability of the present invention are the features of error message notification and system reporting. FIGS. 28A thru 28F depict typical error status information automatically supplied to the user 912 when the user selects an option impossible to implement on the communications network 500 or beyond network parameters.

Also, as shown in FIG. 29, the present invention can report to the user 510, both on the terminal screen and at remote printer, complete status of the expert system 918. This expert system assisted configuration/reconfiguration saves many man hours of human time, which in turn translates to significant cost savings. Further costs benefits provided by the present invention include the elimination of network "down" time due to configuration/reconfiguration. Still further efficiencies are realized by the present invention through the maximization of hardware/software requirements. Also, network maintenance and service becomes more readily managed due to the constant network status knowledge inherent in the expert system 918 of the present invention. This network status determination ability can potentially eliminate many wasted hours of field service time heretofore required on conventional communications network management systems.

The present invention thus provides powerful assistance to the human network manager 912 by greatly simplifying the tasks of configuring/reconfiguring a communications network, as well as the offering of consistent expert configuration advice.

II. SYSTEM ARCHITECTURE

The system architecture of the present invention is shown in block diagram form in FIG. 9A and FIG. 9B, where FIG. 9B is a decomposition of FIG. 9A. System architecture of the present invention consists of three main building blocks:

(a) An Expert System 918, which takes as input, a set of network usage requirements from the network requirements database 918, and outputs a set of configuration data of the communication network 500 into a configuration database 914. The expert system 918 of the present invention encapsulates the specific configuration domain knowledge for the communications network 500.

The expert system component 918 of the present invention is a production system implemented in commercially available OPS-83 ™ of Production Systems Technologies, Inc., Pittsburgh, Pa., U.S.A. As shown in FIG. 9B, the expert system 918, comprises three main components:

(b) A Data Store called the working memory 906, which is local to the expert system. Working Memory 906 is a database of symbols representing both physical and logical objects of the communication network 500.

Working Memory 906 also contains conceptual objects or goals related to the configuration problem solving tactics.

Working database 906 can be updated by a transfer of data from network requirements database 912 into its working memory equivalent. Working database 906 can also be modified by any fired rule from knowledge base 904. The elements in the working memory 906 are ordered by the amount of time they stay in the working memory 906.

(c) A Knowledge Base 904, which stores a set of rules (production rules) in the production memory. Each rule has a conditional part, which indicates the working database 906 status in terms of working elements for which the rule is applicable, and an action part, which indicates the changes to the working database 906 which can be implemented by the rule.

In the present invention, rules are the main locus of the configuration domain knowledge for the communications network.

Figure 35:
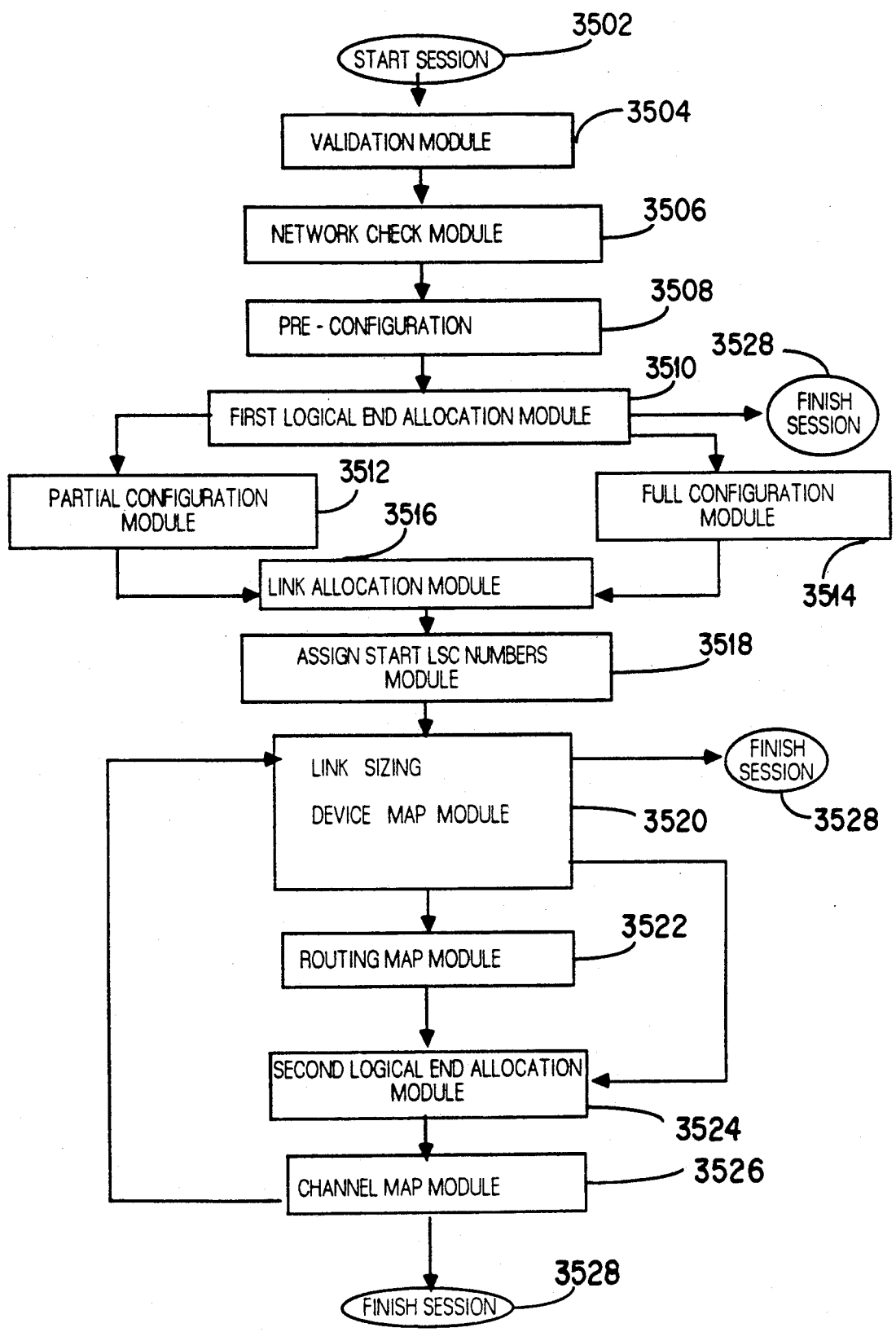
FIG. 35 is a block diagram illustrating the rule (knowledge) base 904 decomposed into coupled and interelated modules.

In the present invention the production rules in the knowledge base 904 are conceptually grouped into 12 coupled and interrelated modules, as shown in FIG. 35, and as described below in Section III.B.1. Each module of knowledge base 904 represents one stage of the configuration process knowledge for the communications network 500.

(c) A Control Mechanism (inference engine) 902, which executes (fires) the rules. Control mechanism 902 determines which rules are relevant to a given working data base state. After short listing the relevant rules, control mechanism 902 selects one from the short list and applies it (fires it).

An instantiation is an ordered pair of a rule name and a list of working memory 906 elements that satisfy the conditional part of the rule. All the instantiations at any given time during the execution of the production system constitute the conflict set of the present invention. Every time working memory 906 is changed through the execution of a rule, the conflict set is changed.

The inference engine in the present invention is an implementation of the selection criteria for a rule to be fired.

3. The Man-Machine Interface 910 is the last main building block of the architecture of the present invention.

Man-machine interface 910 provides all the means to a human network operator 912 for controlling the network database 908, the expert system 918 and their interrelationships.

Man-Machine Interface 910 provides facilities in terms of user forms to fill-in, insert, modify, and delete data into any tables of the requirements database 916 and configuration database 917. FIG. 20, thru 25 are representations of typical fill-in forms utilized in the present invention.

Man-machine Interface 910 provides facilities for navigation between different data entry activities in the network database 908 in terms of menus from which one can choose. A complete list of nested menus structure for the present invention is defined in FIG. 34. From the human user 912 point of view menus are the navigational means used for the passing control between the network database 908 and the expert system 918.

Man-Machine Interface 910 provides facilities for controlling the run of the expert system 918 in a form of a question and answer session. The answers given by the human user 912 are taken by the expert system 918 and implemented as changes to the working database 906. In this way, the human user 912 controls the expert system 918. He can "undo" stages of the configuration process, restart a session, quit the question and answer session, or ask the expert system 918 to run without any interruption of the human user 912. At the end of a session, the human user 912 has a choice of inserting the output data from the expert system into the Configuration Database 916, restart the session, or quit.

III. MAIN BUILDING BLOCKS

A. Network Database

The Network Database 908 is capable of maintaining the configuration data of communications network 500 with which the present invention is used. The relational model of the data is used for this database; this means that data is seen as a two dimensional tables with operation on data as operations on such tables.

The network configuration database 908 is made up of the network requirements database 916 and the configuration database 904, as shown in FIG. 9B. The network requirements database maintains complete information on all ends 502 of the communications network 500 and their connectivity potential.

The configuration database 914 maintains complete information concerning the physical inventory of the communications network subcomponents, as well as complete information concerning the logical network 922 and its corresponding relationship with the physical network 920. The network configuration database 908 of the present invention is implemented in UNIFY TM relational database management system from Unify Corporation, Inc. of Calif., U.S.A. Release 3.2.

1. Requirements Database

Figure 14:
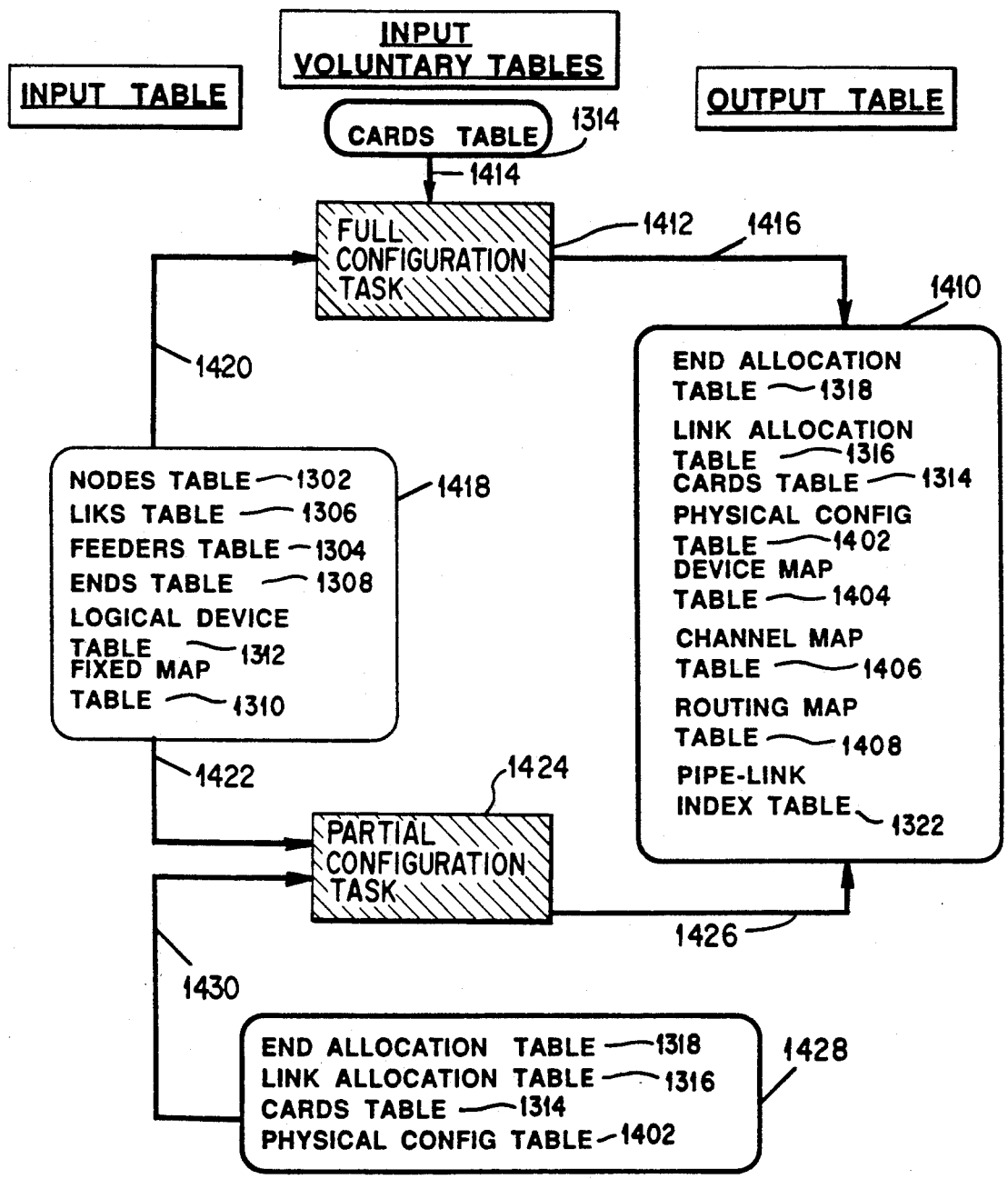
FIG. 14 is a block diagram of the input and output tables of the full/partial configuration process 1202 of the present invention.

The information required to define the network requirements, in form of two dimensional tables, comprises the requirements database 916. Requirements Database 916 comprises all input tables for the configuration tasks as shown in FIG. 14. The network information necessary for the requirements database 916 is supplied by the human user 912. FIG. 20 thru FIG. 25 illustrates the tables which become the Requirements Database 916.

The following is an explanation concerning each entry in the requirements database 916: (Further explanations are given in User Operation at Section IV below):

The Nodes Table 1302 contains information on node names, type, and site name for the node multiplexer in the communications network 500.

The Feeder Table 1304 contains information on feeder names, and types of feeder multiplexers in the communications network 500.

The Link Table 1306 contains information on each composite link in the communications network 500, such as origin, destination, speed and size.

The End Table 1308 contains information on all the ends 502 at the edges of the communications network 502 and their corresponding characteristics, such as: ends name; multiplexer name to which they situated to; ends types; computer end; terminal end; permanented connected end; switchable end; speed; the expected data traffic to/from the end; communication protocol; expected flow control; and optionally, the card type required for the end to be connected to.

The end table 1308 of information comprises the core of the requirement database 916.

The Fixed Mapping Table 1310 contains information on all non-switched ends and information for switched ends which are switched at another node: origin end name, destination end name, destination switching node.

The Logical Device Allocation 1312 contains information on logical names for device-card in a node to which the ends 502 are to be connected.

The Nodes Table 1302, Feeder Table 1304, Link Table 1306, End-Table 1308, Fixed Mapping Table 1310 and the Logical Device Allocation Table 1312 contain the minimum input necessary for the configuration task. Additional information (voluntary user information) can be supplied by the human user 912 for the full and partial configuration table. This voluntary information is grouped in the following tables:

The card Data Table 1314 contains information on card type and quantity suggested by the human user 912 for some or all nodes in the communications network 500.

The Link Allocation Table 1316 contains information or device numbers allocation to link cards.

The End Allocation Table 1318 contains information on ends allocation to devices and channels for some or all nodes in the communications network 500.

The Port configuration Table 1320 contains parameters for the switchable ends in the communications network 500.

The Pipe-Link Index Table 1322 contains the preferred allocation of links to pipes.

The Short Form Addresses Table 1324 contains the short form address name and the switchable ends which will become a member of the short form address.

The Duplicate Short Form Address Table 1326 contains the information of a node and a short form address associated with it, which the human user 912 wishes to be copied.

The Connection Texts Table 1328 contains information for different texts which used by the communication network, 912 in order to service its users.

The requirements database schema listed below shows the fields and their characteristics for each of the tables listed above.

THE REQUIREMENTS DATABASE SCHEMA

| RECORD/ FIELD | REF | TYPE | LEN | LONG NAME |
|---|---|---|---|---|
| nodes | 20 | | -- | Nodes_Table |
| *n_name | | STRING | 16 | name |
| n_site | | STRING | 16 | site |
| country | | STRING | 16 | country |
| n_num | | NUMERIC | 3 | number |
| n_notes | | STRING | 32 | notes |
| n_type | | STRING | 3 | type |
| feeders | 60 | | -- | Feeder_Table |
| *f_name | | STRING | 16 | name |
| f_site | | STRING | 16 | site |
| f_type | | STRING | 16 | type |
| channels | | NUMERIC | 3 | channels |
| f_notes | | STRING | 32 | notes |
| links | 80 | | -- | Links_Table |
| *link_key | | COMB | | key_field |
| origin | n_name | STRING | 16 | origin |
| dest | | STRING | 16 | destination |
| l_speed | | NUMERIC | 6 | link_speed |
| l_quant | | NUMERIC | 2 | quantity |
| l_notes | | STRING | 32 | notes |
| l_max | | NUMERIC | 3 | max_link_size |
| log_dev | 80 | | -- | Logical_Device |
| *lg_key | | COMB | | logical_dev_key |
| lg_node | n_name | STRING | 16 | node |
| lg_ends | | STRING | 16 | ends_name |
| lg_ch_nr | | NUMERIC | 3 | channel_number |
| lg_dev | | STRING | 16 | logical_device |
| lnkalloc | 140 | | -- | Link_Allocation |
| *l_key | | COMB | | link_alloc_key |
| l_node | pc_node | STRING | 16 | node |
| l_dev_nr | | NUMERIC | 2 | link_dev_number |
| l_dest | | STRING | 16 | link_destination |
| lk_speed | | NUMERIC | 6 | speed |
| end_all | 588 | | -- | End_Alloc_n |
| *el_key | | COMB | | el_key |
| el_node | pc_node | STRING | 16 | node |
| el_dev | | NUMERIC | 2 | device_number |
| el_chan | | NUMERIC | 3 | channel_number |
| el_name | | STRING | 16 | end_name |
| el_quant | | NUMERIC | 3 | end_quantity |
| el_flow | | STRING | 11 | flow_control |
| fix_map | 69 | | -- | Fixed_map_Table |
| *key_map | | COMB | | fixed_map_key |
| org_end | | STRING | 16 | origin_end |
| org_mux | | STRING | 16 | origin_mux |
| dest_end | | STRING | 16 | destination_end |
| dest_mux | | STRING | 16 | destination_mux |
| switch | | STRING | 16 | switching_node |
| ports | 260 | | -- | Ports_Table |
| po_node | n_name | STRING | 16 | Node_name |
| po_num | | NUMERIC | 3 | port_number |
| po_quant | | NUMERIC | 3 | port_quantity |
| po_dev | | NUMERIC | 2 | port_device |
| po_chan | | NUMERIC | 3 | port_channel |
| po_par | | STRING | 1 | port_parity |
| po_type | | STRING | 1 | port_type |
| po_speed | | STRING | 1 | port_speed |
| po_msg | | STRING | 1 | system_message |
| po_echo | | STRING | 1 | echo |
| po_imp_d | | NUMERIC | 3 | IMP_dest_node |
| po_amp_g | | NUMERIC | 3 | AMP_dest_group |
| po_imp_p | | NUMERIC | 3 | IMP_dest_port |
| po_cnx | | NUMERIC | 1 | CNX |
| po_dcnx | | NUMERIC | 1 | DCNX |
| po_acc_l | | NUMERIC | 1 | access_level |
| po_v24 | | NUMERIC | 1 | v24_state |
| po_dtr | | NUMERIC | 1 | po_dtr |
| po_open | | NUMERIC | 1 | port_open |
| po_20_3 | | NUMERIC | 1 | USO_20_3 |
| ends | 392 | | -- | Ends_Table |
| *ends_key | | COMB | | ends_key |
| e_name | | STRING | 16 | name |
| mux_name | | STRING | 16 | mux_name |
| e_quant | | NUMERIC | 3 | quantity |
| port_typ | | STRING | 3 | port_type |
| e_speed | | NUMERIC | 5 | speed |
| traffic | | STRING | 16 | traffic |
| e_protcl | | STRING | 16 | end_protocol |
| card_typ | | STRING | 16 | card_type |
| e_vers | | STRING | 16 | card_version |
| e_notes | | STRING | 32 | notes |
| po_host | | STRING | 1 | port_host |
| e_flow | | STRING | 11 | flow_control |
| pipe_lnk | 80 | | -- | Pipe_link_Table |
| *pl_key | | COMB | | pipe_link_key |
| pl_name | n_name | STRING | 16 | node_name |
| pipe_no | | NUMERIC | 3 | pipe_number |
| pl_lnk1 | | NUMERIC | 2 | link_no_1 |
| pl_lnk2 | | NUMERIC | 2 | link_no_2 |
| pl_lnk3 | | NUMERIC | 2 | link_no_3 |
| pl_lnk4 | | NUMERIC | 2 | link_no_4 |
| pl_lnk5 | | NUMERIC | 2 | link_no_5 |
| pl_lnk6 | | NUMERIC | 2 | link_no_6 |
| pl_lnk7 | | NUMERIC | 2 | link_no_7 |
| pl_lnk8 | | NUMERIC | 2 | link_no_8 |
| pl_lnk9 | | NUMERIC | 2 | link_no_9 |
| pl_lnk10 | | NUMERIC | 2 | link_no_10 |
| pl_lnk11 | | NUMERIC | 2 | link_no_11 |
| pl_lnk12 | | NUMERIC | 2 | link_no_12 |
| pl_lnk13 | | NUMERIC | 2 | link_no_13 |

-continued

THE REQUIREMENTS DATABASE SCHEMA

| RECORD/ FIELD | REF | TYPE | LEN | LONG NAME |
|---|---|---|---|---|
| pl_lnk14 | | NUMERIC | 2 | link_no_14 |
| sht_form | 390 | | -- | sht_form_addr Table |
| *s_fm_key | | COMB | | sht_fm_key |
| s_name | n_name | STRING | 16 | node_name |
| s_fm_add | | NUMERIC | 3 | short_form_addr |
| s_sfn | | STRING | 16 | short_form_name |
| s_mem1 | | STRING | 11 | member_1 |
| s_mem2 | | STRING | 11 | member_2 |
| s_mem3 | | STRING | 11 | member_3 |
| s_mem4 | | STRING | 11 | member_4 |
| s_mem5 | | STRING | 11 | member_5 |
| s_mem6 | | STRING | 11 | member_6 |
| s_mem7 | | STRING | 11 | member_7 |
| s_mem8 | | STRING | 11 | member_8 |
| s_mem9 | | STRING | 11 | member_9 |
| s_mem10 | | STRING | 11 | member_10 |
| s_mem11 | | STRING | 11 | member_11 |
| s_mem12 | | STRING | 11 | member_12 |
| s_mem13 | | STRING | 11 | member_13 |
| s_mem14 | | STRING | 11 | member_14 |
| s_mem15 | | STRING | 11 | member_15 |
| s_mem16 | | STRING | 11 | member_16 |
| s_mem17 | | STRING | 11 | member_17 |
| s_mem18 | | STRING | 11 | member_18 |
| s_mem19 | | STRING | 11 | member_19 |
| s_mem20 | | STRING | 11 | member_20 |
| s_mem21 | | STRING | 11 | member_21 |
| s_mem22 | | STRING | 11 | member_22 |
| s_mem23 | | STRING | 11 | member_23 |
| s_mem24 | | STRING | 11 | member_24 |
| s_mem25 | | STRING | 11 | member_25 |
| s_mem26 | | STRING | 11 | member_26 |
| s_mem27 | | STRING | 11 | member_27 |
| s_mem28 | | STRING | 11 | member_28 |
| s_mem29 | | STRING | 11 | member_29 |
| s_mem30 | | STRING | 11 | member_30 |
| s_mem31 | | STRING | 11 | member_31 |
| s_mem32 | | STRING | 11 | member_32 |
| s_mem33 | | STRING | 11 | member_33 |
| sht_app | 5 | | -- | SFA_Duplication Table |
| *a_key | | COMB | | a_key |
| a_node1 | n_name | STRING | 16 | given_node |
| a_sfa | | NUMERIC | 3 | given_sfa |
| a_node2 | n_name | STRING | 16 | new_node_sfa |
| con_msg | 20 | | -- | Connection_Texts Table |
| *con_name | n_name | STRING | 16 | node_name |
| con_srt | | STRING | 80 | service_ready |
| con_it | | STRING | 80 | invitation_text |
| con_com | | STRING | 40 | com_text |
| con_der | | STRING | 40 | der_text |
| con_disc | | STRING | 40 | disc_text |
| con_err | | STRING | 40 | err_text |
| con_inv | | STRING | 40 | inv_text |
| con_mom | | STRING | 40 | mom_text |
| con_na | | STRING | 40 | na_text |
| con_nc | | STRING | 40 | nc_text |
| con_np | | STRING | 40 | np_text |
| con_occ | | STRING | 40 | occ_text |

2. Configuration Database

Configuration Database 914 maintains complete information on the physical/hardware inventory of a communication network 500, as well as information on the logical aspects of the communications network 500 and its corresponding relationship with the physical network 920.

The constituents tables of the configuration database 914 are output tables 1410 of the configuration process as shown in FIG. 14.

The following is a description of the tables of the configuration database 914. Further details are presented below in the section entitled User Operation Section IV.

Figure 7:
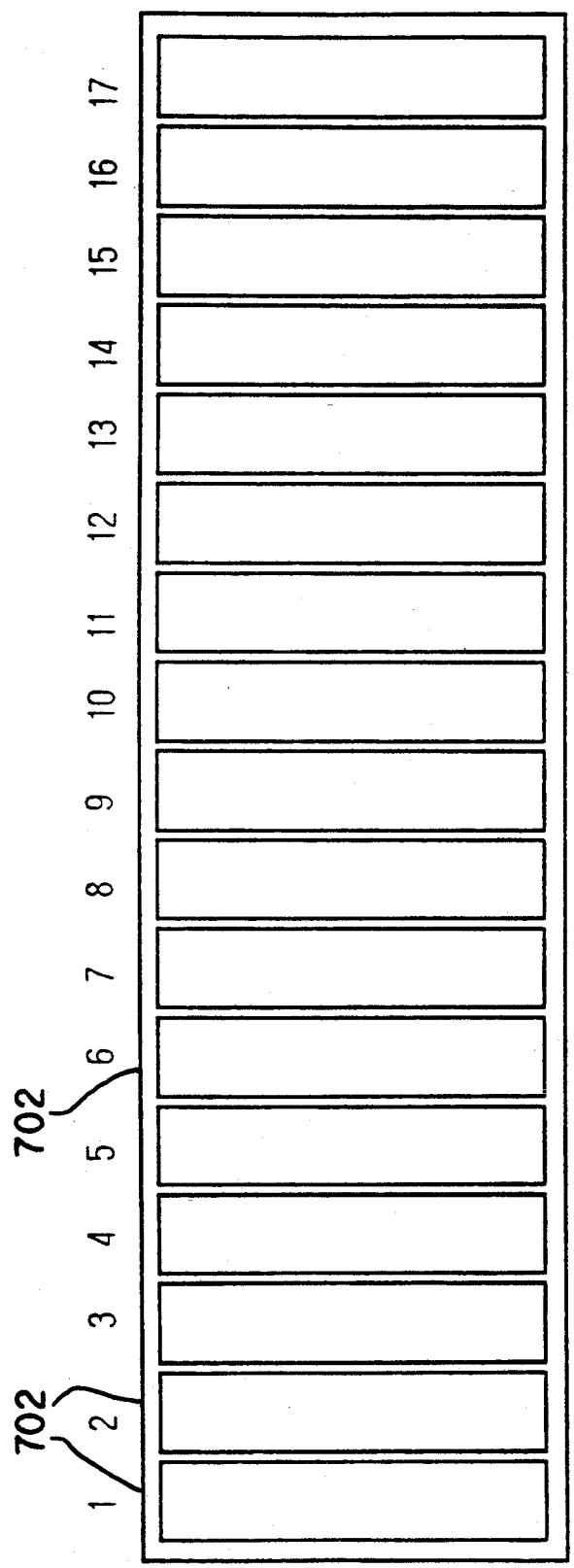
FIG. 7 diagramatically shows a typical card cage for a switched or nonswitched multiplexer which can be used in the multiplexer communications network of FIG. 5.
Figure 8:
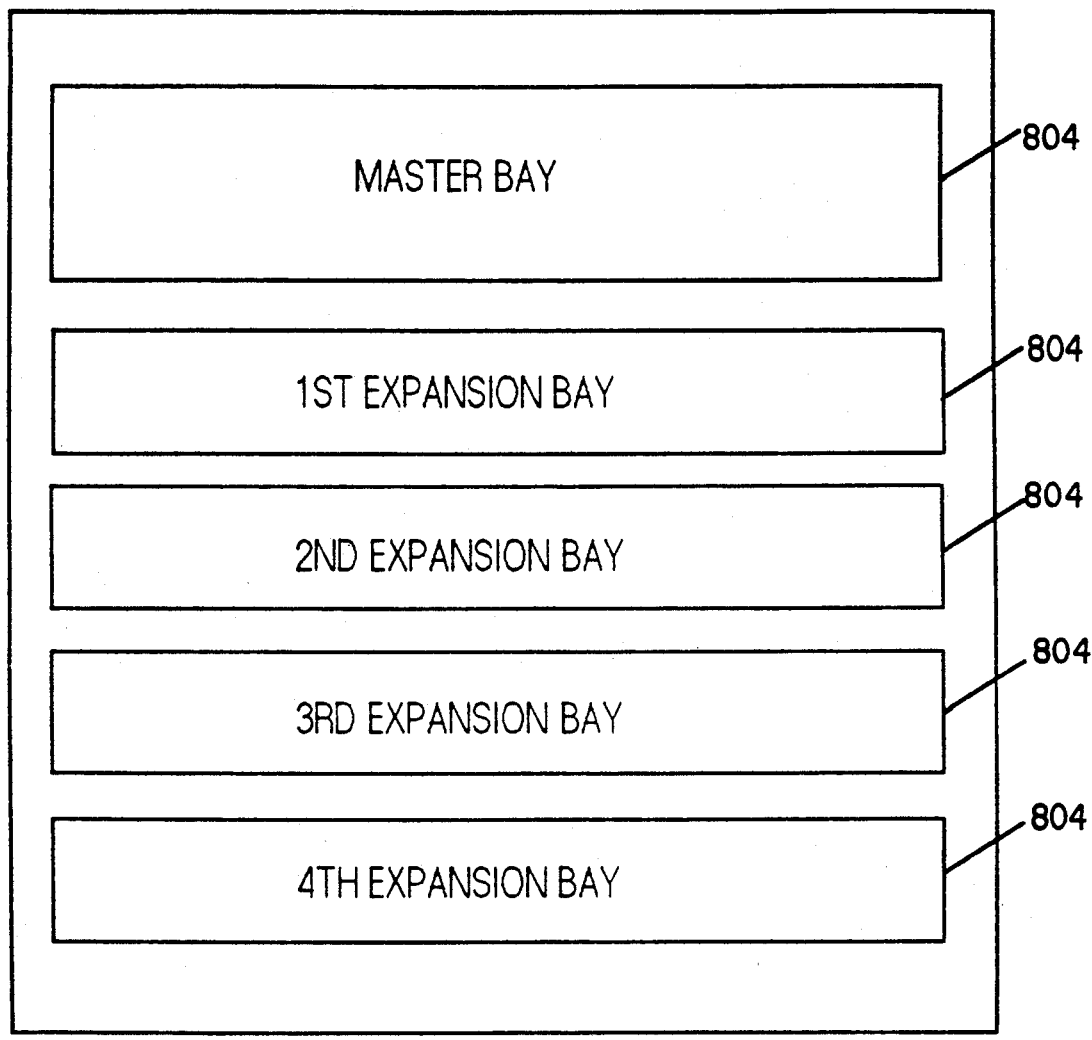
FIG. 8 diagramatically shows the typical node bays of a switched or nonswitched multiplexer.

The physical configuration Tables 1402 contains information on collection of cards and their order in the master bay 802 and each expansion bay 804, shown in FIG. 7 and FIG. 8, for each node in the communication network 500.

The link allocation table 1316 contains information concerning which composite links for a node are served by which ARQ cards for each node in the communications network 500. This table 1316 can also be used as an input table for the configuration process.

The end allocation Table 1318 contains information of which ends 502 in the communications network 500 are served by which channel cards for each node in the communications network 500. The Link and End Allocation Tables can also be used as an input table to the configuration process.

The device map table 1404 contains information on the list of devices (cards) in node and their sizes for each node in the communications network 500.

The channel map table 1406 contains information on the mapping of the channels, internal to a node, which are permanently connected for each node in the communications network. Together all the channel maps in the communications network 500 define the permanent connections through the networks 500 for any two permanently connected ends 502 at the edges of the network 500.

The routing map 1408 contains information concerning a list of ordered pipes to choose from in the case of link failures due to high network traffic between any two nodes in the communications network 500. Each node in the communications network has a routing map (a list of ordered pipes) for all the other nodes in the communications network 500.

The list of main (primary) pipes and alterative pipes are used by a switching node to establish connection at run time of the communications network.

The Pipe-Link Index Table 1322 contains information on which component links originating in a node are part of a pipe, and the list of pipes for each node in the communications network 500.

The configuration data base schema listed below defines the fields and their characteristics of the tables discussed above with the exception of the pipe-link index table 1322 fields which were defined in the requirements database 916 schema.

THE CONFIGURATION DATA BASE SCHEMA

| RECORD/ FIELD | REF | TYPE | LEN | LONG NAME |
|---|---|---|---|---|
| pc_mast | 20 | | -- | Master_Bay |
| *pc_node | n_name | STRING | 16 | node |
| pc_rack | | STRING | 10 | rack sort |
| pc_bays | | NUMERIC | 1 | total_nr_bays |
| pc_1 | | STRING | 3 | slot_1 |
| pc_v1 | | STRING | 3 | version_1 |
| pc_2 | | STRING | 3 | slot_2 |
| pc_v2 | | STRING | 3 | version_2 |
| pc_3 | | STRING | 3 | slot_3 |
| pc_v3 | | STRING | 3 | version_3 |
| pc_4 | | STRING | 3 | slot_4 |
| pc_v4 | | STRING | 3 | version_4 |
| pc_5 | | STRING | 3 | slot_5 |
| pc_v5 | | STRING | 3 | version_5 |
| pc_6 | | STRING | 3 | slot_6 |
| pc_v6 | | STRING | 3 | version_6 |
| pc_7 | | STRING | 3 | slot_7 |
| pc_v7 | | STRING | 3 | version_7 |

-continued

THE CONFIGURATION DATA BASE SCHEMA

| RECORD/FIELD | REF | TYPE | LEN | LONG NAME |
|---|---|---|---|---|
| pc_8 | | STRING | 3 | slot_8 |
| pc_v8 | | STRING | 3 | version_8 |
| pc_9 | | STRING | 3 | slot_9 |
| pc_v9 | | STRING | 3 | version_9 |
| pc_10 | | STRING | 3 | slot_10 |
| pc_v10 | | STRING | 3 | version_10 |
| pc_11 | | STRING | 3 | slot_11 |
| pc_v11 | | STRING | 3 | version_11 |
| pc_12 | | STRING | 3 | slot_12 |
| pc_v12 | | STRING | 3 | version_12 |
| pc_13 | | STRING | 3 | slot_13 |
| pc_v13 | | STRING | 3 | version_13 |
| pc_14 | | STRING | 3 | slot_14 |
| pc_v14 | | STRING | 3 | version_14 |
| pc_15 | | STRING | 3 | slot_15 |
| pc_v15 | | STRING | 3 | version_15 |
| pc_16 | | STRING | 3 | slot_16 |
| pc_v16 | | STRING | 3 | version_16 |
| pc_17 | | STRING | 3 | slot_17 |
| pc_v17 | | STRING | 3 | version_17 |
| pc_exp | 44 | | -- | Expansion_Bays |
| *eb_key | | COMB | | eb_key |
| eb_node | pc_node | STRING | 16 | node |
| bay_nr | | NUMERIC | 1 | bay_number |
| eb_1 | | STRING | 3 | slot_1 |
| eb_v1 | | STRING | 3 | version_1 |
| eb_2 | | STRING | 3 | slot_2 |
| eb_v2 | | STRING | 3 | version_2 |
| eb_3 | | STRING | 3 | slot_3 |
| eb_v3 | | STRING | 3 | version_3 |
| eb_4 | | STRING | 3 | slot_4 |
| eb_v4 | | STRING | 3 | version_4 |
| eb_5 | | STRING | 3 | slot_5 |
| eb_v5 | | STRING | 3 | version_5 |
| eb_6 | | STRING | 3 | slot_6 |
| eb_v6 | | STRING | 3 | version_6 |
| eb_7 | | STRING | 3 | slot_7 |
| eb_v7 | | STRING | 3 | version_7 |
| eb_8 | | STRING | 3 | slot_8 |
| eb_v8 | | STRING | 3 | version_8 |
| eb_9 | | STRING | 3 | slot_9 |
| eb_v9 | | STRING | 3 | version_9 |
| eb_10 | | STRING | 3 | slot_10 |
| eb_v10 | | STRING | 3 | version_10 |
| eb_11 | | STRING | 3 | slot_11 |
| eb_v11 | | STRING | 3 | version_11 |
| eb_12 | | STRING | 3 | slot_12 |
| eb_v12 | | STRING | 3 | version_12 |
| eb_13 | | STRING | 3 | slot_13 |
| eb_v13 | | STRING | 3 | version_13 |
| eb_14 | | STRING | 3 | slot_14 |
| eb_v14 | | STRING | 3 | version_14 |
| eb_15 | | STRING | 3 | slot_15 |
| eb_v15 | | STRING | 3 | version_15 |
| eb_16 | | STRING | 3 | slot_16 |
| eb_v16 | | STRING | 3 | version_16 |
| eb_17 | | STRING | 3 | slot_17 |
| eb_v17 | | STRING | 3 | version_17 |
| ch_map | 2680 | | | Channel_Map Table |
| *ch_key | | COMB | | channel_map_key |
| ch_node | pc_node | STRING | 16 | node |
| dev1_nr | | NUMERIC | 2 | dev1_nr |
| ch1_nr | | NUMERIC | 3 | ch1_nr |
| c_orgend | | STRING | 16 | origin_end |
| c_orgmux | | STRING | 16 | origin_mux |
| dev2_nr | | NUMERIC | 2 | dev2_nr |
| ch2_nr | | NUMERIC | 3 | ch2_nr |
| ch_quant | | NUMERIC | 3 | quantity |
| routing | 400 | | | Routing_map |
| *r_key | | COMB | | routing_key |
| r_origin | n_name | STRING | 16 | origin |
| r_dest | n_name | STRING | 16 | destination |
| pipe1 | | NUMERIC | 3 | pipe1 |
| pipe2 | | NUMERIC | 3 | pipe2 |
| pipe3 | | NUMERIC | 3 | pipe3 |
| pipe4 | | NUMERIC | 3 | pipe4 |
| cards | 180 | | | Cards_Table |

-continued

THE CONFIGURATION DATA BASE SCHEMA

| RECORD/FIELD | REF | TYPE | LEN | LONG NAME |
|---|---|---|---|---|
| *c_key | | COMB | | cards_key |
| c_node | n_name | STRING | 16 | node |
| c_type | | STRING | 3 | card_type |
| c_versn | | STRING | 3 | version |
| c_quant | | NUMERIC | 2 | quantity |
| dev_map | 220 | | | Device_Map |
| *dm_key | | COMB | | device_map_key |
| dm_nod | pc_node | STRING | 16 | node |
| dm_nr | | NUMERIC | 2 | device_number |
| dm_base | | NUMERIC | 3 | base |
| dm_size | | NUMERIC | 3 | size |
| dm_notes | | STRING | 32 | notes |

3. Data Structure of the Requirements Database and the Configuration Database

The database system 908 consists of a Unify relational data base system Release 3.2 of California. Note that any suitable type of relational database management can be used.

| FIELD | NUMBER | RECORD | TYPE | LENGTH |
|---|---|---|---|---|
| a_key | 263 | sht_app | COMB | 18 |
| a_node1 | 261 | sht_app | STRING | 16 |
| a_node2 | 267 | sht_app | STRING | 16 |
| a_sfa | 262 | sht_app | NUMERIC | 3 |
| bay_nr | 81 | pc_exp | NUMERIC | 1 |
| c_key | 174 | cards | COMB | 24 |
| c_node | 175 | cards | STRING | 16 |
| c_orgend | 142 | ch_map | STRING | 16 |
| c_orgmux | 143 | ch_map | STRING | 16 |
| c_quant | 178 | cards | NUMERIC | 2 |
| c_type | 176 | cards | STRING | 3 |
| c_versn | 124 | cards | STRING | 3 |
| card_typ | 26 | ends | STRING | 16 |
| ch1_nr | 141 | ch_map | NUMERIC | 3 |
| ch2_nr | 145 | ch_map | NUMERIC | 3 |
| ch_key | 138 | ch_map | COMB | 20 |
| ch_node | 139 | ch_map | STRING | 16 |
| ch_quant | 10 | ch_map | NUMERIC | 3 |
| channels | 9 | feeders | NUMERIC | 3 |
| con_com | 117 | con_msg | STRING | 40 |
| con_der | 118 | con_msg | STRING | 40 |
| con_disc | 119 | con_msg | STRING | 40 |
| con_err | 121 | con_msg | STRING | 40 |
| con_inv | 122 | con_msg | STRING | 40 |
| con_it | 116 | con_msg | STRING | 80 |
| con_mom | 153 | con_msg | STRING | 40 |
| con_na | 154 | con_msg | STRING | 40 |
| con_name | 39 | con_msg | STRING | 16 |
| con_nc | 156 | con_msg | STRING | 40 |
| con_np | 157 | con_msg | STRING | 40 |
| con_occ | 158 | con_msg | STRING | 40 |
| con_srt | 42 | con_msg | STRING | 80 |
| country | 3 | nodes | STRING | 16 |
| dest | 14 | links | STRING | 16 |
| dest_end | 30 | fix_map | STRING | 16 |
| dest_mux | 31 | fix_map | STRING | 16 |
| dev1_nr | 140 | ch_map | NUMERIC | 2 |
| dev2_nr | 144 | ch_map | NUMERIC | 2 |
| dm_base | 169 | dev_map | NUMERIC | 3 |
| dm_key | 130 | dev_map | COMB | 18 |
| dm_node | 133 | dev_map | STRING | 16 |
| dm_notes | 185 | dev_map | STRING | 32 |
| dm_nr | 168 | dev_map | NUMERIC | 2 |
| dm_size | 184 | dev_map | NUMERIC | 3 |
| e_flow | 258 | ends | STRING | 11 |
| e_name | 19 | ends | STRING | 16 |
| e_notes | 123 | ends | STRING | 32 |
| e_protcl | 25 | ends | STRING | 16 |
| e_quant | 21 | ends | NUMERIC | 3 |
| e_speed | 23 | ends | NUMERIC | 5 |
| e_vers | 35 | ends | STRING | 16 |
| eb_1 | 82 | pc_exp | STRING | 3 |

-continued

| FIELD | NUMBER | RECORD | TYPE | LENGTH |
|---|---|---|---|---|
| eb_10 | 100 | pc_exp | STRING | 3 |
| eb_11 | 102 | pc_exp | STRING | 3 |
| eb_12 | 104 | pc_exp | STRING | 3 |
| eb_13 | 106 | pc_exp | STRING | 3 |
| eb_14 | 108 | pc_exp | STRING | 3 |
| eb_15 | 110 | pc_exp | STRING | 3 |
| eb_16 | 112 | pc_exp | STRING | 3 |
| eb_17 | 114 | pc_exp | STRING | 3 |
| eb_2 | 84 | pc_exp | STRING | 3 |
| eb_3 | 86 | pc_exp | STRING | 3 |
| eb_4 | 88 | pc_exp | STRING | 3 |
| eb_5 | 90 | pc_exp | STRING | 3 |
| eb_6 | 92 | pc_exp | STRING | 3 |
| eb_7 | 94 | pc_exp | STRING | 3 |
| eb_8 | 96 | pc_exp | STRING | 3 |
| eb_9 | 98 | pc_exp | STRING | 3 |
| eb_key | 79 | pc_exp | COMB | 18 |
| eb_node | 80 | pc_exp | STRING | 16 |
| eb_v1 | 83 | pc_exp | STRING | 3 |
| eb_v10 | 101 | pc_exp | STRING | 3 |
| eb_v11 | 103 | pc_exp | STRING | 3 |
| eb_v12 | 105 | pc_exp | STRING | 3 |
| eb_v13 | 107 | pc_exp | STRING | 3 |
| eb_v14 | 109 | pc_exp | STRING | 3 |
| eb_v15 | 111 | pc_exp | STRING | 3 |
| eb_v16 | 113 | pc_exp | STRING | 3 |
| eb_v17 | 115 | pc_exp | STRING | 3 |
| eb_v2 | 85 | pc_exp | STRING | 3 |
| eb_v3 | 87 | pc_exp | STRING | 3 |
| eb_v4 | 89 | pc_exp | STRING | 3 |
| eb_v5 | 91 | pc_exp | STRING | 3 |
| eb_v6 | 93 | pc_exp | STRING | 3 |
| eb_v7 | 95 | pc_exp | STRING | 3 |
| eb_v8 | 97 | pc_exp | STRING | 3 |
| eb_v9 | 99 | pc_exp | STRING | 3 |
| el_chan | 37 | end_all | NUMERIC | 3 |
| el_dev | 36 | end_all | NUMERIC | 2 |
| el_flow | 259 | end_all | STRING | 11 |
| el_key | 33 | end_all | COMB | 20 |
| el_name | 38 | end_all | STRING | 16 |
| el_node | 34 | end_all | STRING | 16 |
| el_quant | 120 | end_all | NUMERIC | 3 |
| ends_key | 18 | ends | COMB | 32 |
| f_name | 6 | feeders | STRING | 16 |
| f_notes | 11 | feeders | STRING | 32 |
| f_site | 7 | feeders | STRING | 16 |
| f_type | 8 | feeders | STRING | 16 |
| key_map | 27 | fix_map | COMB | 32 |
| l_dest | 137 | lnkalloc | STRING | 16 |
| l_dev_nr | 136 | lnkalloc | NUMERIC | 2 |
| l_key | 134 | lnkalloc | COMB | 18 |
| l_max | 257 | links | NUMERIC | 3 |
| l_node | 135 | lnkalloc | STRING | 16 |
| l_notes | 17 | links | STRING | 32 |
| l_quant | 16 | links | NUMERIC | 2 |
| l_speed | 15 | links | NUMERIC | 6 |
| lg_ch_nr | 197 | log_dev | NUMERIC | 3 |
| lg_dev | 198 | log_dev | STRING | 16 |
| lg_ends | 196 | log_dev | STRING | 16 |
| lg_key | 194 | log_dev | COMB | 32 |
| lg_node | 195 | log_dev | STRING | 16 |
| link_key | 12 | links | COMB | 36 |
| lk_speed | 181 | lnkalloc | NUMERIC | 6 |
| mux_name | 20 | ends | STRING | 16 |
| n_name | 1 | nodes | STRING | 16 |
| n_notes | 5 | nodes | STRING | 32 |
| n_num | 4 | nodes | NUMERIC | 3 |
| n_site | 2 | nodes | STRING | 16 |
| n_type | 155 | nodes | STRING | 3 |
| org_end | 28 | fix_map | STRING | 16 |
| org_mux | 29 | fix_map | STRING | 16 |
| origin | 13 | links | STRING | 16 |
| pc_1 | 45 | pc_mast | STRING | 3 |
| pc_10 | 63 | pc_mast | STRING | 3 |
| pc_11 | 65 | pc_mast | STRING | 3 |
| pc_12 | 67 | pc_mast | STRING | 3 |
| pc_13 | 69 | pc_mast | STRING | 3 |
| pc_14 | 71 | pc_mast | STRING | 3 |
| pc_15 | 73 | pc_mast | STRING | 3 |
| pc_16 | 75 | pc_mast | STRING | 3 |
| pc_17 | 77 | pc_mast | STRING | 3 |
| pc_2 | 47 | pc_mast | STRING | 3 |
| pc_3 | 49 | pc_mast | STRING | 3 |
| pc_4 | 51 | pc_mast | STRING | 3 |
| pc_5 | 53 | pc_mast | STRING | 3 |
| pc_6 | 55 | pc_mast | STRING | 3 |
| pc_7 | 57 | pc_mast | STRING | 3 |
| pc_8 | 59 | pc_mast | STRING | 3 |
| pc_9 | 61 | pc_mast | STRING | 3 |
| pc_bays | 44 | pc_mast | NUMERIC | 3 |
| pc_node | 41 | pc_mast | STRING | 16 |
| pc_rack | 43 | pc_mast | STRING | 10 |
| pc_v1 | 46 | pc_mast | STRING | 3 |
| pc_v10 | 64 | pc_mast | STRING | 3 |
| pc_v11 | 66 | pc_mast | STRING | 3 |
| pc_v12 | 68 | pc_mast | STRING | 3 |
| pc_v13 | 70 | pc_mast | STRING | 3 |
| pc_v14 | 72 | pc_mast | STRING | 3 |
| pc_v15 | 74 | pc_mast | STRING | 3 |
| pc_v16 | 76 | pc_mast | STRING | 3 |
| pc_v17 | 78 | pc_mast | STRING | 3 |
| pc_v2 | 48 | pc_mast | STRING | 3 |
| pc_v3 | 50 | pc_mast | STRING | 3 |
| pc_v4 | 52 | pc_mast | STRING | 3 |
| pc_v5 | 54 | pc_mast | STRING | 3 |
| pc_v6 | 56 | pc_mast | STRING | 3 |
| pc_v7 | 58 | pc_mast | STRING | 3 |
| pc_v8 | 60 | pc_mast | STRING | 3 |
| pc_v9 | 62 | pc_mast | STRING | 3 |
| pipe1 | 149 | routing | NUMERIC | 3 |
| pipe2 | 150 | routing | NUMERIC | 3 |
| pipe3 | 151 | routing | NUMERIC | 3 |
| pipe4 | 152 | routing | NUMERIC | 3 |
| pipe_no | 206 | pipe_lnk | NUMERIC | 3 |
| pl_key | 204 | pipe_lnk | COMB | 18 |
| pl_lnk1 | 207 | pipe_lnk | NUMERIC | 2 |
| pl_lnk10 | 216 | pipe_lnk | NUMERIC | 2 |
| pl_lnk11 | 217 | pipe_lnk | NUMERIC | 2 |
| pl_lnk12 | 218 | pipe_lnk | NUMERIC | 2 |
| pl_lnk13 | 219 | pipe_lnk | NUMERIC | 2 |
| pl_lnk14 | 220 | pipe_lnk | NUMERIC | 2 |
| pl_lnk2 | 208 | pipe_lnk | NUMERIC | 2 |
| pl_lnk3 | 209 | pipe_lnk | NUMERIC | 2 |
| pl_lnk4 | 210 | pipe_lnk | NUMERIC | 2 |
| pl_lnk5 | 211 | pipe_lnk | NUMERIC | 2 |
| pl_lnk6 | 212 | pipe_lnk | NUMERIC | 2 |
| pl_lnk7 | 213 | pipe_lnk | NUMERIC | 2 |
| pl_lnk8 | 214 | pipe_lnk | NUMERIC | 2 |
| pl_lnk9 | 215 | pipe_lnk | NUMERIC | 2 |
| pl_name | 205 | pipe_lnk | STRING | 16 |
| po_20_3 | 202 | ports | NUMERIC | 1 |
| po_acc_l | 189 | ports | NUMERIC | 1 |
| po_amp_g | 166 | ports | NUMERIC | 3 |
| po_chan | 129 | ports | NUMERIC | 3 |
| po_cnx | 177 | ports | NUMERIC | 1 |
| po_dcnx | 188 | ports | NUMERIC | 1 |
| po_dev | 128 | ports | NUMERIC | 2 |
| po_dtr | 191 | ports | NUMERIC | 1 |
| po_echo | 164 | ports | STRING | 1 |
| po_host | 203 | ends | STRING | 1 |
| po_imp_d | 165 | ports | NUMERIC | 3 |
| po_imp_p | 167 | ports | NUMERIC | 3 |
| po_msg | 163 | ports | STRING | 1 |
| po_node | 125 | ports | STRING | 16 |
| po_num | 126 | ports | NUMERIC | 3 |
| po_open | 201 | ports | NUMERIC | 1 |
| po_par | 131 | ports | STRING | 1 |
| po_quant | 127 | ports | NUMERIC | 3 |
| po_speed | 162 | ports | STRING | 1 |
| po_type | 132 | ports | STRING | 1 |
| po_v24 | 190 | ports | NUMERIC | 1 |
| port_typ | 22 | ends | STRING | 3 |
| r_dest | 148 | routing | STRING | 16 |
| r_key | 146 | routing | COMB | 32 |
| r_origin | 147 | routing | STRING | 16 |
| s_fm_add | 223 | sht_form | NUMERIC | 3 |
| s_fm_key | 221 | sht_form | COMB | 18 |
| s_mem1 | 224 | sht_form | STRING | 11 |
| s_mem10 | 233 | sht_form | STRING | 11 |
| s_mem11 | 234 | sht_form | STRING | 11 |
| s_mem12 | 235 | sht_form | STRING | 11 |
| s_mem13 | 236 | sht_form | STRING | 11 |

-continued

| FIELD | NUMBER | RECORD | TYPE | LENGTH |
|---|---|---|---|---|
| s_mem14 | 237 | sht_form | STRING | 11 |
| s_mem15 | 238 | sht_form | STRING | 11 |
| s_mem16 | 239 | sht_form | STRING | 11 |
| s_mem17 | 240 | sht_form | STRING | 11 |
| s_mem18 | 241 | sht_form | STRING | 11 |
| s_mem19 | 242 | sht_form | STRING | 11 |
| s_mem2 | 225 | sht_form | STRING | 11 |
| s_mem21 | 244 | sht_form | STRING | 11 |
| s_mem22 | 245 | sht_form | STRING | 11 |
| s_mem23 | 246 | sht_form | STRING | 11 |
| s_mem24 | 247 | sht_form | STRING | 11 |
| s_mem25 | 248 | sht_form | STRING | 11 |
| s_mem26 | 249 | sht_form | STRING | 11 |
| s_mem27 | 250 | sht_form | STRING | 11 |
| s_mem28 | 251 | sht_form | STRING | 11 |
| s_mem29 | 252 | sht_form | STRING | 11 |
| s_mem3 | 226 | sht_form | STRING | 11 |
| s_mem30 | 253 | sht_form | STRING | 11 |
| s_mem31 | 254 | sht_form | STRING | 11 |
| s_mem32 | 255 | sht_form | STRING | 11 |
| s_mem33 | 256 | sht_form | STRING | 11 |
| s_mem4 | 227 | sht_form | STRING | 11 |
| s_mem5 | 228 | sht_form | STRING | 11 |
| s_mem6 | 229 | sht_form | STRING | 11 |
| s_mem7 | 230 | sht_form | STRING | 11 |
| s_mem8 | 231 | sht_form | STRING | 11 |
| s_mem9 | 232 | sht_form | STRING | 11 |
| s_name | 222 | sht_form | STRING | 16 |
| s_sfn | 260 | sht_form | STRING | 16 |
| switch | 32 | fix_map | STRING | 16 |
| traffic | 24 | ends | STRING | 16 |
| sht_form | 18 | | 390 | 446 |

The Database Record Dependency listed below shows the relationship between fields of the tables of the network database 908.

| DATA BASE RECORD DEPENDENCY | | |
|---|---|---|
| RECORD | RECORD | FIELD |
| sht_app | nodes | a_node1 |
| sht_app | nodes | a_node2 |
| cards | nodes | c_node |
| ch_map | pc_mast | ch_node |
| con_msg | nodes | con_name |
| dev_map | pc_mast | dm_node |
| pc_exp | pc_mast | eb_node |
| end_all | pc_mast | el_node |
| lnkalloc | pc_mast | l_node |
| log_dev | nodes | lg_node |
| links | nodes | origin |
| pc_mast | nodes | pc_node |
| pipe_lnk | nodes | pl_name |
| ports | nodes | po_node |
| routing | nodes | r_dest |
| routing | nodes | r_origin |
| sht_form | nodes | s_name |

| SUMMARY OF THE DATABASE TABLES | | | |
|---|---|---|---|
| RECORD | NUMBER | EXPECTED | LENGTH |
| SYS_TAB | 7 | 1 | 170 |
| cards | 13 | 180 | 54 |
| ch_map | 11 | 2680 | 86 |
| con_msg | 20 | 20 | 592 |
| dev_map | 9 | 220 | 74 |
| end_all | 6 | 588 | 156 |
| ends | 4 | 392 | 66 |
| feeders | 2 | 60 | 240 |
| fix_map | 5 | 69 | 84 |
| links | 3 | 80 | 14 |
| lnkalloc | 10 | 140 | 88 |
| log_dev | 16 | 80 | 66 |
| nodes | 1 | 20 | 70 |
| pc_exp | 14 | 44 | 70 |
| pc_mast | 8 | 20 | 68 |
| pipe_lnk | 17 | 80 | 62 |
| ports | 15 | 260 | 42 |
| routing | 12 | 400 | 234 |
| sht_app | 19 | 5 | 62 |

B. The Expert System

1. Rule (Knowledge) Base

The configuration domain knowledge is represented by a set of rules which constitute the knowledge base 904. The rules, which have all been invented by the inventors, are logically grouped in 12 coupled and inter-related modules, discussed below in detail.

Each module of knowledge base 904 is the locus of a stage in the problem-solving knowledge of the configuration process of the communications network 500.

The first rule fired in a module is used to accept control from another module, and the last rule fired from the module is the one which passes control out of the module to another module. The control of rules from module to module as well than within each module is passed via the control-goal element defined in the working memory 906. FIG. 35 shows the 12 different modules of the knowledge base 904 in a representative order, but it should be understood that the human user 912 can override and move in a different order upon command. The significance of each module is that each signifies a significant stage in the configuration/reconfiguration process.

The following is a description of each module (the knowledge locus modules), a. Validation Module

The validation module 3504 performs the validation of data from the network requirement database 916. Checks are made on the values of the fields in each of the data base tables of the network requirement database 916, and inconsistencies are detected between various data base tables. The detection dynamically allows the user to correct the deficiencies. After this validation (and correction) has been successfully completed, the working database 906 now contains a set of complete and consistent requirements of a communications network 500 that may be configured by the expert system 918.

Figure 36:
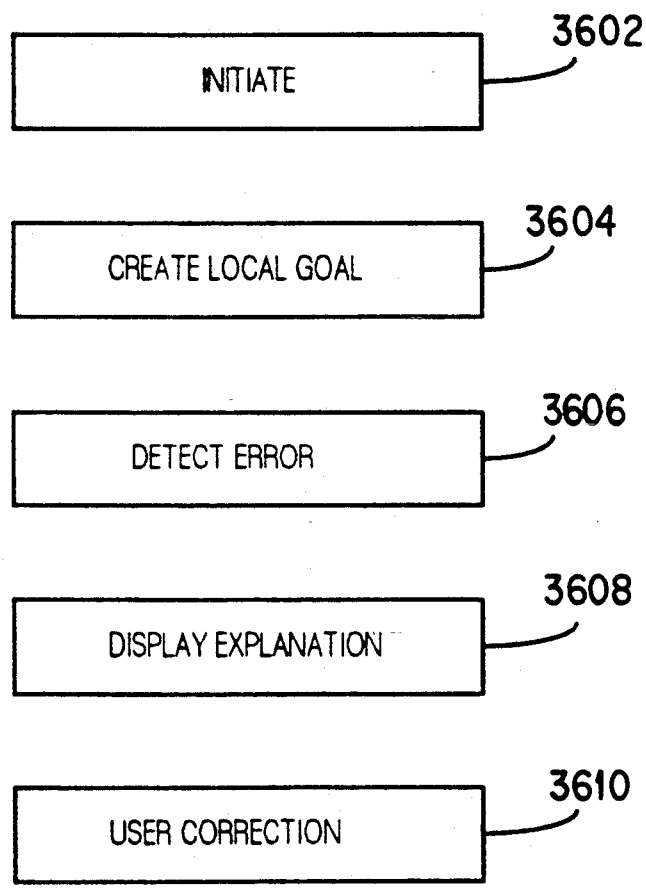
FIG. 36 is a block diagram illustrating the validation module 3504 decomposed into sub-modules.

When the system control goal states that validation is to be initiated, as shown in a block 3602 of FIG. 36 a set of local goals 3604 is created in a specific order. There is one local goal associated with each data base table; when this goal is created, the rules which detect errors 3606 in this table may fire. When a validation rule fires, the error and an explanation 3608 of the error is displayed to the human user 912 on the man/machine interface 910 with a menu of actions that the human user 912 may take to make an error correction 3610. This is done in a dynamic fashion based on the errors that are detected and corrected. The human user 912 is then invited to select a menu item in order to try to correct the error.

A validation rule in the validation module 3504 is constructed in the following way (format):

| | |
|---|---|
| Left hand side: | (local goal for the table in the requirements data base 916) |
| (Condition) | (matched patterns that detect the validation error) |
| Right hand side: | (a menu of possible actions is displayed) |
| (Action) | (the user is invited to select |

-continued

| one of the menu items, or to quit the validation module3504) |
| --- |

At any moment in time, the set of rules which successfully pattern match are placed into the conflict set discussed in the section entitled System Architecture, II.

When one of the rules from the conflict set is fired, the human user 912 can take appropriate action to correct as shown in block 3610 the validation error in accordance with the solution option (see the right hand side of the validation rule) which are generated (and which can be displayed) by the right hand side of the validation rule shown above.

A representative set of validation messages that may be displayed to the user on the terminal is shown below in the section entitled USER OPERATION IV.

b. Network Check Module

Figure 37:
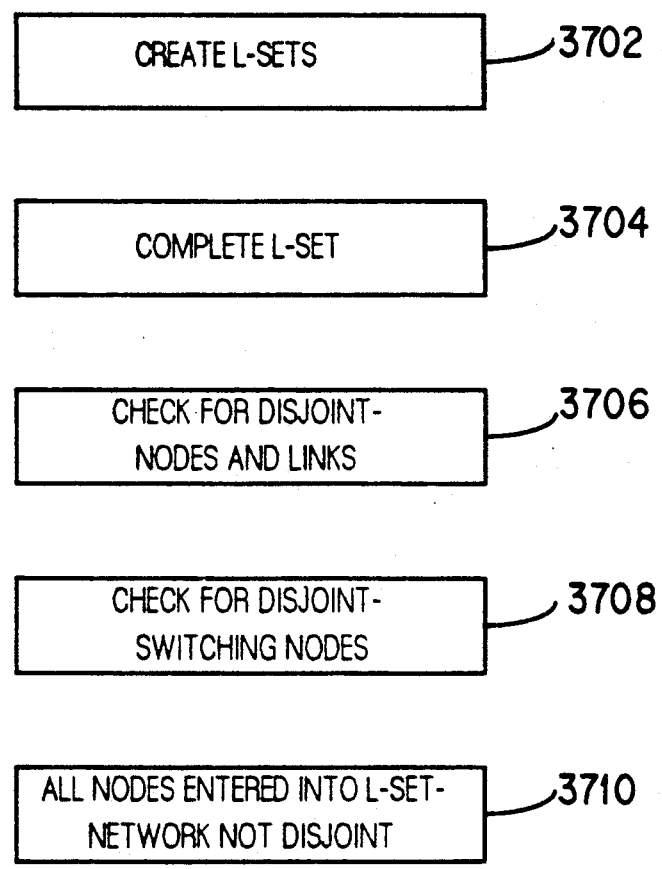
FIG. 37 is a block diagram illustrating the network check module 3506 decomposed into sub-modules.

The network check module 3506 checks that the communications network 500 formed by the interconnection of nodes 506 and links 504 is not disjoint as indicated by block 3706 shown in FIG. 37. A check is also performed to verify that the switching nodes subset of the network 500 is not disjoint as indicated by block 3708. A modified version of the routing map module 3522 is deployed.

The main feature of the modified routing is that the L-sets 3702 are created from any arbitary origin node and are allowed to complete as indicated by block 3704 when there are no more paths to follow. The destination of the route is unspecified. If there is a node 506 which has not been entered into the L-set, then the communications network 500 is disjunctive as indicated by block 3706. If all the nodes 506 of the communications network 500 have been entered into the L-set, then that shows that the communications network is not disjoint, as indicated by block 3710.

These are two principle goals in the network check module 3506:

(1) The pass goal initiates and terminates the network check module 3506; and (2) A local network goal controls the creation of the L-sets 3702 and the detection of the nodes 506 which have not been entered into the L-sets 3702.

c. The Pre-Configuration Module

The functionality of the pre-configuration module 3508 is divided into three categories. Each category represents a submodule within the pre-configuration module 3508. It should be understood that the order in which these submodules are described is not necessarily the order in which they are activated in the preconfiguration module 3508.

Figure 38:
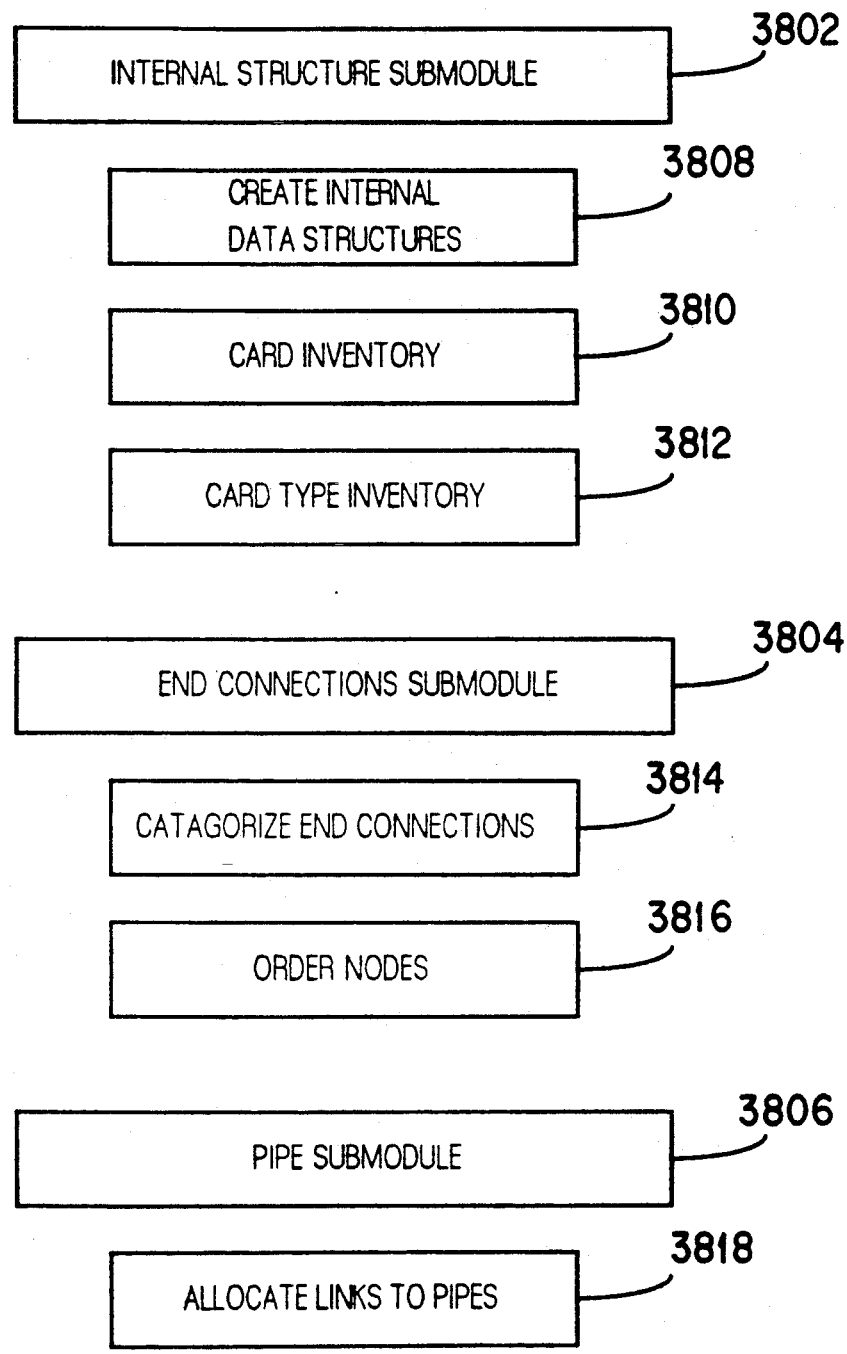
FIG. 38 is a block diagram illustrating the preconfiguration module 3508 decomposed into sub-modules.
Figure 39:
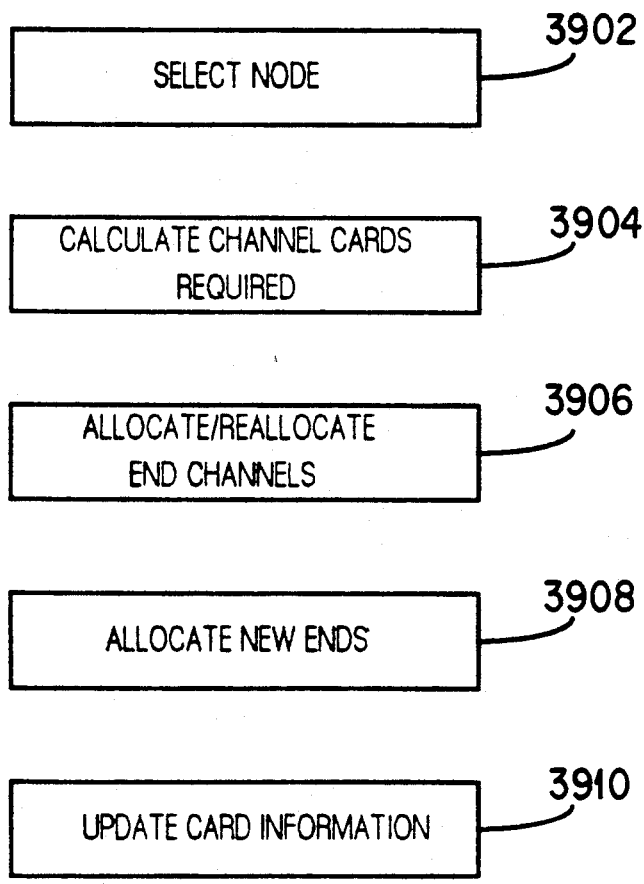
FIG. 39 is a block diagram illustrating the first logical end allocation module 3510 decomposed into sub-modules.

(1) The Internal-Structure Submodule 3802 shown in FIG. 38. This module creates a number of internal data structures 3808, which are needed in other modules for the network configuration. These data structures are invisible to the human user 912. The data structures created by the submodule 3802 are: inventory of card types 3812 required for the current configuration process, and the inventory of the cards 3810 themselves.

(2) The End Connections Submodule 3804. This module categorizes and summarizes the end-connections 3814 requirements for each node 506 in the communications network 500. The categorization and counting 3814 is done according to whether they represent HOST/COMPUTER ports or TERMINAL ends 502. The internal ordering of the nodes 3816 for configuration processing is performed by allocating low numbers to nodes 506 which have a high number of ends 502. If the network 500 to be configured is partially configured, the ends connections and inventory of cards 3810 are validated against the card layout provided in the physical configuration working memory element 906.

(3) The Pipe Submodule 3806. This module allocates links to pipes 3818 in the communications network 500 and the pipe working memory elements are produced.

Each of the above three submodules is considered to be a PASS since each submodule operates on the entire communications network 500 (that is, it goes for each node 506). A single subgoal called "pass-status-goal" is used to initiate and terminate the passes.

d. First Logical End Allocation Module

The first logical end allocation module 3510 performs the calculation of the number of cards (channel cards) 3904 required, and then the allocation/re-allocation of end channels 3906 to the relevant cards. These cards, at a later stage, will be inserted into the physical configuration portion of the working database 906.

This process is carried out for each node 506 in the communications network 500. If the human user 912 has requested partial configuration then the end channels will automatically be re-allocated as indicated by block 906 to the same cards and with the same channel numbers.

Functionally, the module 3510 performs the following five specific tasks (note that the order shown is the best mode, but other orders could be used in this module):

(1) It selects a node 3902 for first end allocation;

(2) It calculates the number of cards required 3904 for the requested configuration;

(3) It re-allocates ends 3906 depending upon a particular node 506 previously configured;

(4) It allocates new ends 3908 in the node 506; and (5) It updates cards information 3910 in the working database 806.

This process will finish the run (that is, a finished session 3528, which allows the human user 912 to go back to the start session stage 3502) of the expert system 918 if it discovers that too many cards are required to configure any node, or when re-allocating ends, it discovers that the configuration is not possible as specified due to the end allocation requirements.

e. Partial Configuration Module

Figure 40:
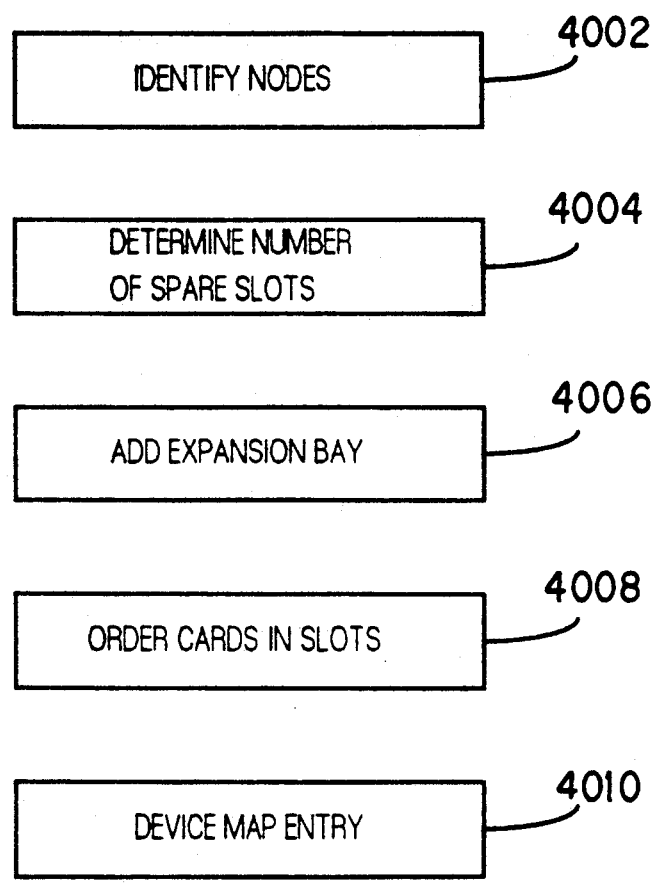
FIG. 40 is a block diagram illustrating the partial configuration module 3512 decomposed into sub-modules.

The partial configuration module 3512 as shown in FIG. 40 is invoked only if the mode of use of the present invention is "Partial Configuration" The partial configuration module 3512 identifies nodes 506 to be partially configured as indicated by block 4002 by their physical configuration being supplied in the working memory 906. This partial configuration module 3512 will add further channel cards to an existing physical configuration, as specified by the list of channel cards created by the first (logical) end allocation module 3510. Throughout this process, any existing cards in the physical configuration will be kept in the same slots 702. Additional cards will either be put in existing spare slots or in a new expansion bay as indicated by block 4006. The device map 4010 for the node 506 is generated by the partial configuration module 3512.

For each node 506, the following steps are performed in the order shown, but other orders could be used:

(1) The number of spare slots 4004 in the existing physical configuration available is determined;

(2) If there are not enough spare slots available, an attempt can be made by the human user 912 to add an expansion bay 4006 whereafter, step two is aborted;

(3) The insertion of ordered channel cards 4008 in the spare slots in the expansion is performed. If there are more cards, than slots in the expansion bays 804, then the spare slots in the master bay 802 are used; and (4) For each card in the physical configuration working database 906, an entry in the device map 4010 is performed.

f. Full Configuration Module

The functionality of module 3514 depends on the "mode of use" of the expert system 918. If the mode is "full configuration", then a set of possible physical configurations will be generated for each node 506 in the communications network 500. The alternative full configurations will vary according to the number of buffer cards and expansion bays and the like in the physical configuration. The human user 912 is asked to choose one of these full configurations for each node 506 in the communications network 500. However, the present invention also makes it possible to specify once for the whole communications network 500 that the minimum (least cost) full configuration is to be chosen for each node 506.

When a human user 912 selects the partial configuration module 3512, instead of the full configuration module 3514, the physical configuration alternatives are not generated by the knowledge base 904 for those nodes 506 for which a physical configuration already exists.

Figure 41:
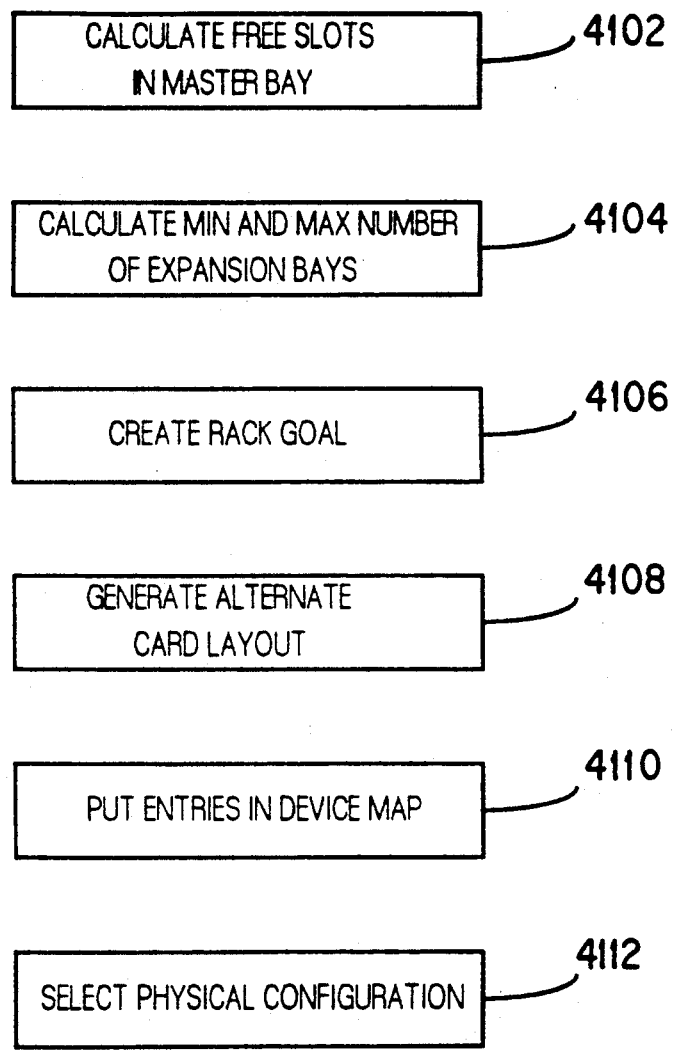
FIG. 41 is a block diagram illustrating the full configuration module 3514 decomposed into sub-modules.

Physical configuration of the communications network 500 is performed on a node-by-node basis in both the full configuration module 3514 and the partial configuration module 3512. Each node 506 is assigned a "process-goal" discussed in section III(B)(3), which controls generation of a physical configuration. Subgoals are used for individual tasks throughout the configuration process. For each node 506 in the communications network 500, the configuration process may be split up into the following ordered actions (tasks) as shown in FIG. 41:

(1) Calculate the number of free slots in the master bay 4102;

(2) Calculate the minimum and maximum number of expansion bays 4104 that would apply to the various alternative configurations for this node 506;

(3) Create an object called a "rack", which is itself a goal 4106. If the maximum number of bays is the same as the minimum number of bays, then one "rack goal" 4106 will be created; otherwise, there will be a rack goal 4106 created for each alternative number of bays; and (4) For each rack goal 4106, various alternative physical card layouts 4108 are generated. These layouts constitute the physical configuration alternatives. At this point, entries are put into the device map 4110 which represent the device cards.

The human user 912 must now select the physical configuration 4112 alternatives of the node 506. If, at the start of the full configuration module 3514 or partial configuration module 3512 (whichever is being used) the human user 912 has opted for a minimum configuration (least cost), then the physical configuration with the least number of bays and buffer cards is selected. Otherwise, each physical configuration 4112 alternative is displayed for the user selection.

g. Link Allocation Module

The link allocation module 3516 is passed control after the partial configuration module 3512 or full configuration module 3514 (which ever is used) has produced physical configurations for each node 506 in the communications network 500. It allocates links from the communications network 500 to link cards in the node's physical configuration.

Figure 42:
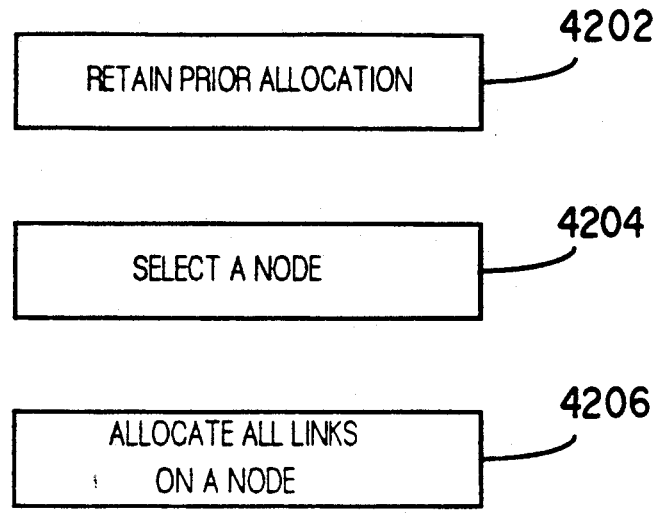
FIG. 42 is a block diagram illustrating the link allocation module 3516 decomposed into sub-modules.

Functionally, as shown in FIG. 42 the link allocation module 3516 performs the following specific tasks (submodules) (the order that is shown is the best mode, but other orders could be used):

(1) It retains prior allocation 4202 of existing links when performing partial configuration; and (2) It selects a node 4204 for allocating the remaining links and it allocates 4206 all links on the node 506.

h. Assign Channel Cards Numbers Module

Figure 43:
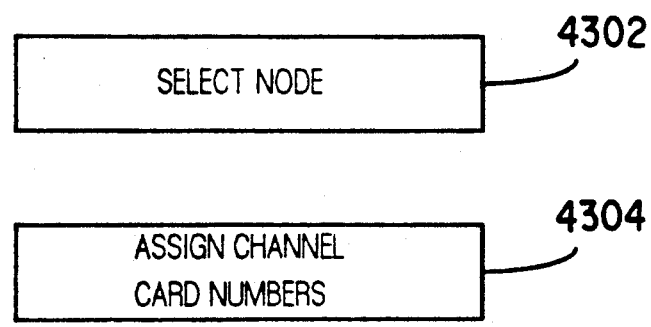
FIG. 43 is a block diagram illustrating the assign start LSC numbers modules 3518 decomposed into sub-modules.

The assign channel cards numbers module 3518 is responsible for taking the configurations produced by the preconfiguration module 3508 (there may be more than one for each node 506), and assigning physical channel numbers as indicated by the block 4304 of FIG. 43 to the channel cards where they have not been actually assigned as part of partial configuration module 3512.

Functionally, the assign channel cards numbers module 3518 performs the following specific task (submodule):

(1) It selects a node 4302 for which it performs numbering for channels of the channel cards 4304 in the configuration for each configuration available for this node 506.

i. Link Sizing - Device Map Module

Figure 44:
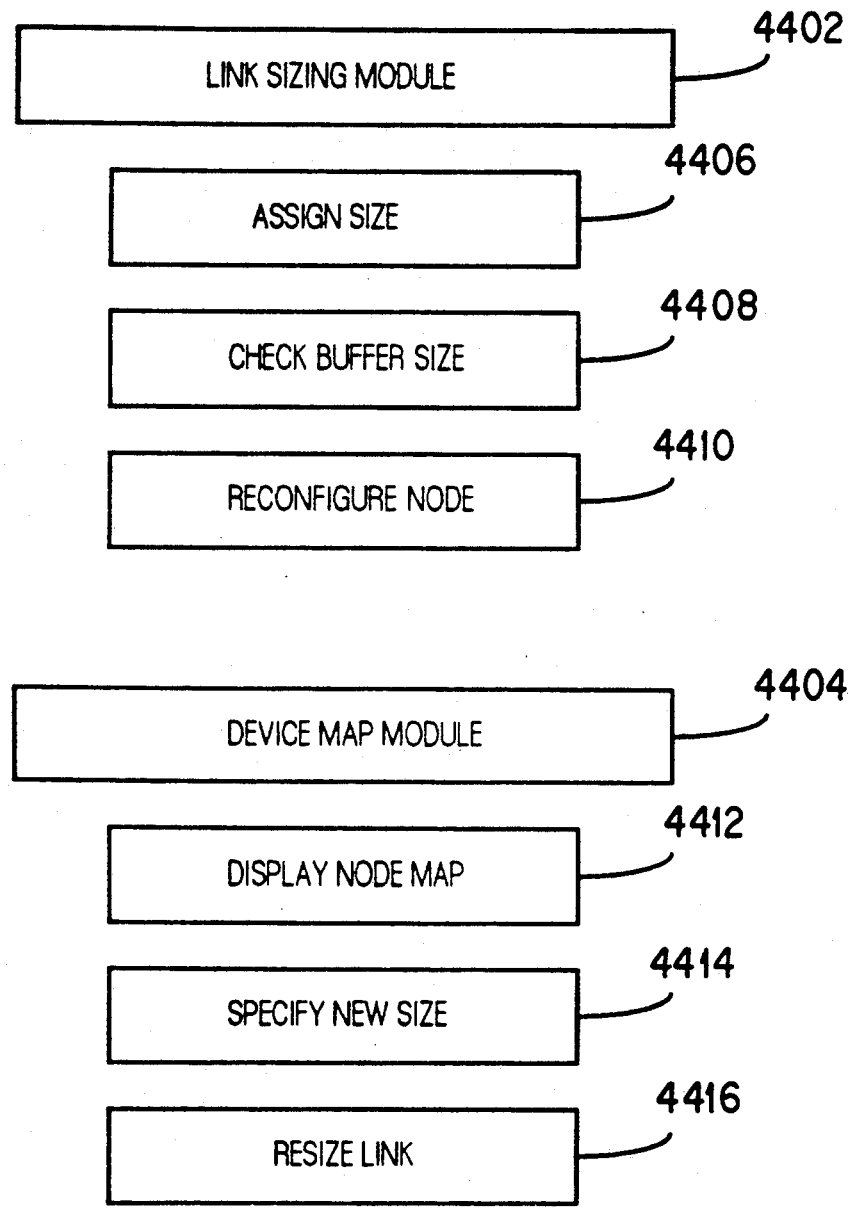
FIG. 44 is a block diagram illustrating the link sizing-device map module 3520 decomposed into sub-modules.

The link sizing 4402 device map 4404 module 3520 as shown in FIG. 44 assigns a size 4406 to each of the composite links 504 in the communications network 500. This module also completes the device map, and allows the human user 912 to override any of the generated link sizes. If there are not enough buffer cards to size the links 4408, then an alternative physical configuration 4410 of the node 506, with more buffer cards, is selected. The link sizing-device map module 3522 is divided into two submodules as follows:

The Links Sizing Submodule 4402

The links 504 in the communications network 500 are categorized as follows:

(1) Links to feeder multiplexers.

There can only be one composite link 504 to a feeder multiplexer 508; its size is the number of ends 502 attached to the feeder 508, rounded up to some fixed number.

(2) Links to remote nodes.

A remote node is a node which is linked to only one other node. The total size of all the links 504 in this single pipe is given by the number of ends 502 at the node and which are fixed mapped ends.

(3) Link to remote switched nodes.

The maximum size of all the links 504 in this single pipe is given by the number of ends 502 at this node.

(4) Links to non-remote nodes from non-remote nodes.

These consist of all the other links 504 in the communications network 500 that are not included in the above categories.

The links 504 in the categories (3), (4) described above do not attain a natural size. The sizing of links 504 is produced in the following way:

(a) Consider the node 506 with the largest number of ends 502. (Recall that the nodes have been ordered according to their number of end by the pre-configuration module 3508.)

(b) Calculate the number of free queue pointers supplied by the addressing buffer cards and distribute them around the unsized links 504. This gives them a size as indicated by a block 4406. This distribution depends upon the speeds of the links 504, with the link of a larger speed attaining a higher size. If, at this point, there are not enough queue pointers, then select an alternative physical configuration of the node 4410 with one more buffer card.

(c) After all the links 504 have been sized 4406 at this node 506, proceed to the next node 506, that is the node with the largest number of ends 502 not including the nodes which have already been visited. Continue with step (b) until all the links 504 have been given a size 4406.

The Device Map Submodule 4404

The device maps are generated as follows:

(1) Now all the links 504 in the communications network 500 have been sized. The device map for each node 506 is completed and displayed 4412 to the human user 912. The human user 912 may override any of the link sizes by specifying a new size 4414.

(2) After all the device maps have been displayed, the human user 912 may have altered the link sizes in such a way that some of the nodes 506 may require more or less buffer cards. If this is the case, the user's own link sizes are retained and the link sizing submodule 3702 is used again as indicated by a block 4416.

If during the channel mapping module 3526 a particular link 504 does not have enough size (or available channels), the link sizing-device map module 3520 may be re-visited and the links 504 may be re-sized 4416. There are two situations where this may happen:

(1) When the link sizing - device map module 3520 has not supplied enough queue pointers for a particular link. If this is the case, a particular node 506 is specified, a configuration with an extra buffer card is selected, and the link sizing - device map module 3520 is used again.

(2) The human user 912 has sized the link where there are not enough queue pointers to map the PMC End Connectors. If this is the case, the human user 912 is invited to re-size all the links 4416 that have been user-sized 4414 and where their entire size has been fully utilized and the device map submodule 3704 is used again.

j. Routing Map Module

Figure 45:
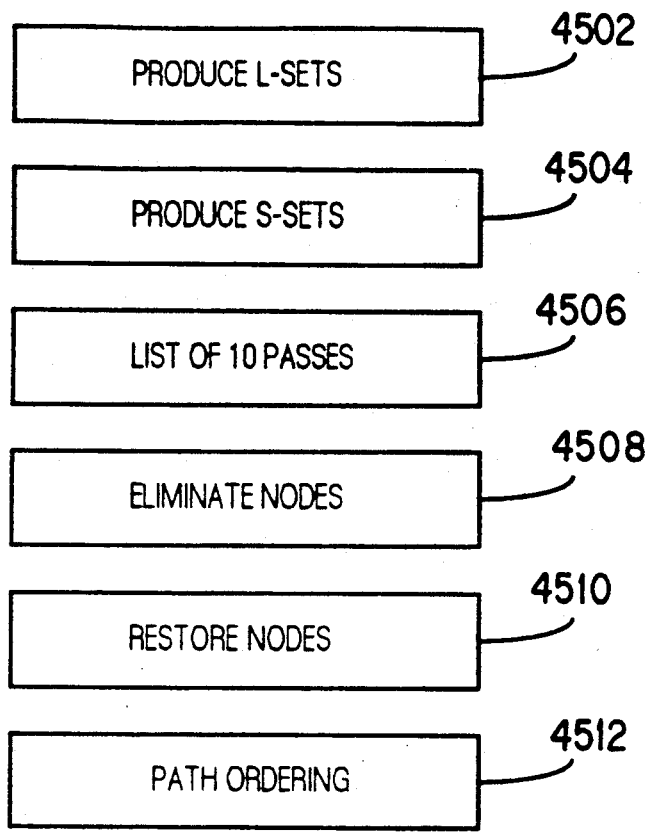
FIG. 45 is a block diagram illustrating the routing map module 3522 decomposed into sub-modules.

The routing map module 3522 produces the routing maps 1408 for each switching node 506 in the communications network 500. It also produces a list of up to 10 passes 4506 shown in FIG. 45 through the communications network 500 to choose from, for each group of permanently connected ends 502. This list is used in the channel map module 3528 for the production of channel maps 1406.

For any two nodes (origin and destination nodes) in the communications network 500, the routing map module 3522 produces the associated L-sets as indicated by block 4502. The L-sets are sets of nodes defined as follows:

L-set−1=set of nodes which are one hop away from origin;

L-set−2=set of nodes which are two-hops away from origin which are not in L-set−1; and so on.

The L-sets constitute a partitioning of the nodes 506 in the communications network 500 in such way that any node 506 in the network only belongs to one single L-set. The destination node belongs to one L-set which determines the shortest path length between the chosen origin and the destination node.

The L-sets construction is controlled by an L-set-goal. The L-set-goal is a working memory element.

As soon as the L-sets for a pair of nodes has been constructed, the S-sets 4504 of the chosen pair of nodes are constructed. The S-set constitutes a number of paths (a list of interlink pipes) between origin and destination nodes, with a different first pipe in the path.

This S-set is constructed as follows:

(1) starting with the destination node, one node is chosen from the previous L-set which is linked to the destination node;

(2) step (1) is repeated until the origin node is reached in a backwards way. At the end of the task, a path is created between the origin and destination nodes;

(3) steps (1) and (2) are repeated after removing the node 4508 from the communications network 500 which is one hop away from origin in the defined path. A new path is going to be built in this way. The process of building new paths is stopped as soon as all the nodes in the communications network 500 which are one hop away from the origin node are removed;

(4) the removed nodes are restored 4510.

The process of constructing the S-sets is controlled by the S-set-goal.

The resulting paths between two nodes are then ordered by (1) their lengths (number of hops in the path), (2) the capacity of the first pipe in the path (measured by the sum of the speeds of the links in the pipe), and then by (3) the number of links in the first pipe.

k. Second (Logical) End Allocation Module

This second (logical) end allocation module 3524 creates the end allocation records which are used by the channel map process, and eventually are written back to the configuration database 914.

When this module is run, a physical configuration for every node 506 in the network 500 has been selected, and a mapping of the logical view of the communications network 500 to the physical network is done by mapping end channels to actual physical devices and channels.

Figure 46:
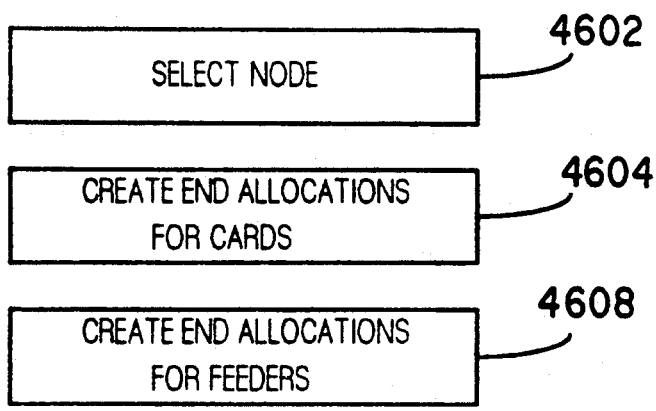
FIG. 46 is a block diagram illustrating the second logical end allocation module 3524 decomposed into submodules.

Functionally, the second (logical) end allocation module 3524 performs the following specific tasks (sub-modules). (The order in which the submodules are shown is the best mode, but other orders could be used.):

(1) It selects a node 4602 as shown in FIG. 46, from which it creates end allocations for special device cards and gateway cards 4604;

(2) It creates end allocations for ends on feeders which are connected to a node.

1. Channel Map Module

The channel map module 3526 assures that the input to a virtual channel at one point of the communications network 500 has a path through the communications network and arrives at the expected point in the communications network 500. The channel map module 3526 assures path integrity between ends 502 on a communications network 500.

The channel map module 3526 generates the channel maps 1406 of the configuration database 914 for every node 506 in the communications network 500. The channel map module 3526 generates the channel map for non-switched ends first, and then it generates the channel maps for switched ends. Note, however, that this order could be reversed.

The mapping of the non-switched ends requires information regarding routing and internal record of the link usage. Route selection depends upon the usage of the links. When a mapping is to be created (for each end channel which is permanently connected), all the available routes have to be traced, and a selection of the "best" one, and then an updating of the internal link usage records. While performing this task, a situation may arise which results in the channel map process not being able to continue.

There can be one of several reasons for the channel map process not being able to continue:

(1) One reason is if the mapping cannot be made without overloading some of the links. In such a case, human user response is required. One response is to overload the links. Another is to go back to the database and re-run the expert system 918.

(2) Another reason is if the mapping cannot be made because a link has run out of size, that is, the link size is not large enough. In such a situation, the human user 912 has to re-run the link sizing-device map module 3520 with new design information of the communications network 500.

(3) Another situation is where a node 506 requires too many channels. Such a situation means the expert system 918 cannot continue and has to stop.

In this way the expert system 918 of the present invention can assist in the design task of a communications network 500.

Once the channel map process has been successfully completed, the communications network 500 has been fully configured.

Figure 47:
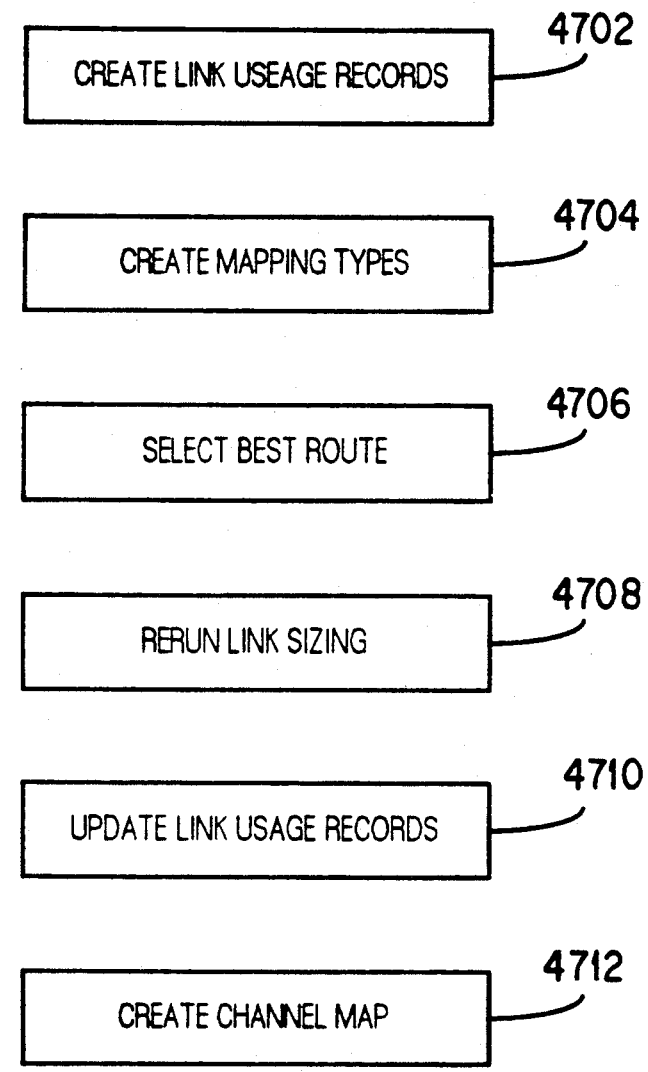
FIG. 47 is a block diagram illustrating the channel map module 3526 decomposed into sub-modules.

The following steps (submodules) comprise the channel map module 3526 (note that the order shown is the best mode, but that other orders could be used):

(1) It creates the internal link usage data type 4702, as shown in FIG. 47;

(2) It selects the next best node to perform permanent connected mappings 4706;

(3) It creates internal mapping types 4704 for each end channel to be mapped;

(4) It maps the end channel by creating a goal which will trace through all the routes that can be used, and then selects the best route; this is followed by an updating of the internal link usage types;

(5) It allows the human user to overload the links, or to go back to the requirements database 916 in order to update the links table 4710 and re-run the present invention;

(6) It re-runs the link size 4708 device map module 3520, if necessary. It ensures that all internal channel map types are removed, so that the channel mapping process can be re-run;

(7) It creates the channel map records 4712 for the user switched ports.

2. Inference Engine

The inference engine 902 of the present invention is a control mechanism of the firing of rules from the knowledge base 902 at any moment in time. The present invention has only one inference engine 902 which is applicable to the knowledge base 904.

Each rule of the knowledge base 904 has a conditional part and an action part. The condition part indicates the working database 906 state for which the rule is applicable. It comprises of an ordered set of patterns, each pattern is one working element from the working memory 906.

The action part indicates the changes to the working database 906 which are going to be implemented if the rule is fired. The typical changes which can occur to the working database 906 after the firing of a rule are deletion, addition or modification of one or more working elements. The firing of a rule, due to changes to the working memory 906 which are implemented, creates a new different state of the working memory 906. A inference engine 902 is a control mechanism by which it is ensured that for any state of the working memory 906 one and only one rule could be fired, or when there are no rules to be fired, the control of the run of the expert system 918 is passed to the human user 912 or to any other system foreign to the expert system 918.

The control mechanism of the present invention ensured that the rule which is the most specific to the working memory 906 state is fired—the most dominant rule.

The pair of a rule and the list of working memory elements that satisfy the conditional part of the rule is called an instantiation. The collection of all instantiations that exists at a given time during the execution of the production rules constitutes the conflict set. Every time the working memory 906 is changed through the execution of a rule, the conflict set is updated.

The definition of the criteria of selecting and firing of rules which define the control mechanism is given by the following:

(1) For any state of the working memory 906, a list of rules is selected from the rules of the knowledge base. The list contains rules which belong to instantiations whose first element in its list is youngest in the working memory 906.

(2) If the list of rules created at stage (1) contains only one rule, then it is fired.

(3) If the list of rules created at stage (1) contains more than one rule, then a short list of rules is selected from the list. The short list contains all the rules which have the largest number of conditional patterns of the conditional part of the rules. The short listed rules are the most specific rules to the particular state of the working memory 906 because they satisfy the largest number of working memory elements from the working memory.

(4) If the short list of rules contain only one rule, then it is fired. If the short list of rules created at stage (3) contains more than one rule, then the rule from the short list which was entered first in the conflict set is fired.

(5) If the working memory state is not covered by stages (1), (2), (3), (4), then a change of the working database 906 is requested from the human user 912.

The control mechanism of the present invention ensures that one rule—the most dominant rule relevant to the working memory—is fired at any moment in time.

The rules in each module of the knowledge base 906 of the present invention have as the first conditional pattern the control goal of the module. Due to the control mechanism of the present invention, a change in the value of a control goal ensures that the control is passed to another module.

3. Working Database

The working memory 906 is the local data store for the expert system 918. It is a global database of symbols representing all of the physical or logical representation of the communications network 500, such as nodes, or channel maps, and conceptual objects (the goals) which define the configuration problem-solving tactics. By using goals, the control is passed over between different stages of the configuration process, between the rules base modules, or within each rule module.

The list shown below of working elements is the definition of the working memory 906 of the present invention.

The working memory 906 is initialised by a program which reads in the relevant relational tables and creates its working memory equivalent. At the end of running the expert system 918 of the present invention the reverse happens.

LIST OF WORKING ELEMENTS AND LIST OF GOALS FOR WORKING MEMORY

| WORKING ELEMENTS | | GOALS |
|---|---|---|
| type node_type = element | | -- holds the description of a node |
| ( | | |
| node_name | : symbol; | -- the name of the node |
| node_site | : symbol; | -- the name of the site where the node is situated |
| node_country | : symbol; | -- the country in which the node is situated |
| node_sort | : symbol; | -- the type of node |
| node_number | : integer; | -- the user defined physical node number |
| node_notes | : symbol; | -- notes about the node entered by the user |
| node_int_nr | : integer; | -- the internal number of the node: this is an identification number created by the system and used only by the system |
| ); | | |
| type feeder_type = element | | -- holds the description of a feeder multiplexor |
| ); | | |
| fdr_name | : symbol; | -- the name of the feeder multiplexor |
| fdr_site | : symbol; | -- the name of the site where the feeder multiplexor is situated |
| fdr_sort | : symbol; | -- the type of feeder multiplexor |
| fdr_channels | : integer; | -- the number of channels on the composite link between the feeder multiplexor and its parent node. |
| fdr_rem_sup | : symbol; | -- whether the feeder multiplexor has remote supervision facility. |
| fdr_notes | : symbol; | -- notes entered by the user about the feeder multiplexor |
| fdr_parent | : symbol; | -- the node to which this feeder is linked<br>-- this field is not used |

-continued

LIST OF WORKING ELEMENTS AND LIST OF GOALS FOR WORKING MEMORY

| WORKING ELEMENTS | | GOALS |
|---|---|---|
| ); | | or seen in the data base |
| type link_type = element | | -- holds the description of a group of composite links between two nodes or of a composite link between a feeder multiplexor and its parent node.<br>-- note that all the links in a group must have the same speed |
| ( | | |
| link_origin | : symbol; | -- name of the node(s) where the link originates |
| link_dest | : symbol; | -- name of the destination node(s) or feeder multiplexor. |
| link_speed | : integer; | -- speed of the link(s) in bits/sec. |
| link_quantity | : integer; | -- number of links in the group (1 in the case of a single link) |
| link_user_size | : integer; | -- the maximum size on a link as specified by the user |
| link_notes | : symbol; | -- notes about the link(s) entered by the user. |
| ); | | |
| type card_type = record | | -- holds the name and version of a card |
| ( | | |
| name | : symbol; | -- the name of the card |
| version | : symbol; | -- the version of the card |
| ); | | |
| type card_count_type = element | | -- specifies how many of a particular type of card are present at a particular node. |
| ( | | |
| cc_node | : symbol; | -- the name of the node |
| cc_card | : card_type; | -- the card sort and version |
| cc_quantity | : integer; | -- how many of this version of this type of card are present at the node |
| ); | | |
| type end_type = element | | -- gives details of a group of ends: all ends in the group must have identical characteristics and must, if permanently mapped, be mapped to another group of ends. |
| ( | | |
| end_name | : symbol; | -- the name of the group of ends |
| end_mux_name | : symbol; | -- the name of the node or feeder multiplexor where the ends are attached to the network. |
| end_quantity | : integer; | -- number of ends in the group |
| end_new_ends | : integer; | -- number of new ends (if not running in partial config mode.<br>-- end_quantity) |
| end_port_sort | : symbol; | -- the type of port used by the end: can be IMP, AMP, UMP or PMC. |
| end_speed | : integer; | -- speed of the channel in bits/sec. |
| end_traffic | : symbol; | -- type of traffic of the end point (graphics, enq/resp, printer, file-trans, conv). |
| end_protocol | : symbol; | -- communications protocol. |
| end_po_host | : symbol; | -- YES if these ends are computer host ports.<br>-- NO if these ends are user ports. |
| end_card_sort | : card_type; | -- type of card required. |
| end_f_control | : symbol; | -- The flow control - |
| end_priority | : integer; | -- the priority of this end. Assigned at validation stage. |

-continued

LIST OF WORKING ELEMENTS AND LIST OF GOALS FOR WORKING MEMORY

| WORKING ELEMENTS | | GOALS |
|---|---|---|
| end_notes | : symbol; | -- notes about the group of ends entered by the user |
| end_state | : symbol; | -- the current state of this group of ends |
| ); | | |
| type fixed_map_type = element | | |
| | | -- defines a permanent mapping between two groups of ends or between a group of ends which is switched at a different node. |
| ( | | |
| fxmp_org_mux | : symbol; | -- name of the node or feeder multiplexor where the first group of ends is attached to the network |
| fxmp_org_end | : symbol; | -- name of the first group of ends |
| fxmp_dest_mux | : symbol; | -- name of the node or feeder multiplexor where the second group of ends is attached -- group of ends) |
| fxmp_dest_end | : symbol; | -- name of the second group of ends (not used for a switched group of ends) |
| fxmp_switch | : symbol; | -- name of the node where a switched end attached to the network at another multiplexor is switched (not used for a permanently mapped group of ends). |
| ); | | |
| type logical_device_type = element | | |
| | | -- Defines the association between a block of channels on a device and the ends which they serve. -- The ends must all belong to the same group. |
| ( | | |
| log_node | : symbol; | -- name of the node where the ends are attached |
| log_end_name | : symbol; | -- name of the group of ends |
| log_chan_nr | : integer; | -- channel number of the first end in this block |
| log_dev_name | : symbol; | -- the logical name of the device card to which these ends are connected |
| ); | | |
| type end_allocation_type = element | | |
| | | -- defines the association between a block of channels and the ends which they serve. -- the ends must all belong |
| tnode | : symbol; | -- name of the node where the ends are attached |
| ea_end_name | : symbol; | -- name of the group of ends |
| ea_dev_nr | : integer; | -- device number of the device where the ends are attached |
| ea_chan_nr | : integer; | -- channel number of the first end |
| ea_quantity | : integer; | -- number of ends to be as consecutive channels starting with ea_chan_nr |
| eaf_control | : symbol; | -- The flow control |
| ea_number | : integer; | -- number of ends to be allocated (for _allo-allocatio_type = element -- defines the association between a composite link and an ARQ on which that link is terminated |
| ( | | |
| la_node | : symbol; | -- name of the node where the ARQ card is |
| la_dest | : symbol; | -- name of the node or feeder multiplexor at the other end of the link served by the ARQ card |
| la_speed | : integer; | -- speed of the link |
| la_dev_nr | : integer; | -- device number of the ARQ card |
| la_state | : symbol; | -- the current of this element, used in link |
| ); | | |
| type device_entry_type = record | | |
| | | -- one row entry of the device map |
| ( | | |
| name | : symbol; | -- the name of the card which represents this device |
| base | : integer; | -- buffer queue starting number |
| size | : integer; | -- number of channels |
| id | : integer; | -- field used for identification |
| allocation | : symbol; | -- if the device is an ARQ card the field -- contains the links destination, or if the device is a device card, it contains the users logical name for the device |
| reserved | : integer; | -- amount of channels reserved for switched node traffic. |
| notes | : symbol; | -- notes about this device entered by the user |
| ); | | |
| type master_bay_type = element | | |
| | | -- holds the physical configuration of a master bay together with the corresponding device map |
| ( | | |
| mb_node | : symbol; | -- name of the node |
| mb_rack | : symbol; | -- type of rack used |
| mb_exp_bays | : integer; | -- number of expansion bays |
| mb_slot | : array(SLOTS_PER_BAY : card_type); | -- the name and version of the card in each slot |
| mb_lsc_index | : array(SLOTS_PER_BAY : integer); | -- index of the node_lsc_type if this is a lsc card |
| mb_map | : array(DEV MAP SIZE : device_entry_type); | -- the device map for up to (DEV_MAP_SIZE - 1) devices plus device 0 (LSCs) whose entry is held in mb_map (DEVICE_ZERO) which is always the last entry |
| mb_option | : integer; | -- the option identifier, i.e. which configuration of the master bay |
| ); | | |
| type expansion_bay_type = element | | |
| | | -- holds configuration information about a expansion bay |
| ( | | |
| eb_node_name | : symbol; | -- name of the node |
| eb_bay_nr | : integer; | -- number of expansion bay, 1 to 4 |
| eb_slot | : array(SLOTS_PER_BAY : card_type); | -- the name and version of the card in each slot |
| eb_lsc_index | : array(SLOTS PER BAY : integer); | -- index of the node_lsc_type if this is a lsc card |
| eb_option | : integer; | -- the option identifier, i.e. which configuration of the master bay that this expansion bay belongs to |
| ); | | |
| type pc_option = element | | |
| | | -- holds the option which identifies the current physical configuration |
| ( | | |

LIST OF WORKING ELEMENTS AND LIST OF GOALS FOR WORKING MEMORY

| WORKING ELEMENTS | | GOALS |
|---|---|---|
| pc_node | : symbol; | -- node name |
| pc_option | : integer; | -- option identifier |
| ); | | |
| type rm_type = element | | -- contains the four routes from an origin to a destination node. |
| ( | | |
| rm_origin | : symbol; | -- name of the origin node |
| rm_dest | : symbol; | -- name of the destination node |
| rm_pipe1 | : integer; | -- pipe leading from the origin along the first route |
| rm_pipe2 | : integer; | -- pipe leading from the origin along the second route |
| rm_pipe3 | : integer; | -- pipe leading from the origin along the third route |
| rm_pipe4 | : integer; | -- pipe leading from the origin along the fourth route |
| ); | | |
| type device_type = element | | -- one row entry of the device map |
| | | -- used only when the device map is read from the data base, the information being immediately transferred to the appropriate master_bay_type element after which the device_type element is deleted |
| ( | | |
| dev_node | : symbol; | -- the name of the node whose device map it is |
| dev_nr | : integer; | -- device number |
| dev_base | : integer; | -- buffer queue starting number |
| dev_size | : integer; | -- number of channels |
| dev_notes | : symbol; | -- notes on this device map entry, written by the user |
| ); | | |
| type channel_entry_type = record | | -- a channel map entry - specifies a mapping between one channel on one device and another channel on another device |
| ( | | |
| dev1 | : integer; | -- device number of first device |
| ch1 | : integer; | -- number of channel on first device |
| mux | : symbol; | -- name of the node or feeder multiplexor where this connection across the network originates |
| end | : symbol; | -- name of the group of ends containing the end point at which this connection across the network originates |
| dev2 | : integer; | -- device number of second device |
| ch2 | : integer; | -- number of channel on second device which is mapped to channel ch1_nr on device dev1_nr |
| ); | | |
| type chan_map_type = element | | -- contains the channel map for a node |
| ( | | |
| cm_node | : symbol; | -- name of the node of whose channel this is |
| cm_nr_chans | : integer; | -- the number of channel map entries at this node |
| cm_int_nr | : integer; | -- The nodes internal number; |
| ); | | |
| type cm_entry_type = element | | -- contains a single entry of a channel map |
| | | -- used only when the data is read from the data base, the information immediately being transferred to the appropriate chan_map_type element after which the cm_entry_type element is deleted |
| ( | | |
| cme_int_nr | : integer; | -- the nodes internal number |
| cme_entry | : channel_entry_type; | -- the channel entry |
| cme_quantity | : integer; | -- The number of consecutive entries of this type |
| ); | | |
| type control_goal = element | | |
| ( | | |
| cg_state | : symbol; | -- the overall state of the configuration process: can take values start, validation, start_phys, cards_table, phys_con, end_alloc, link_alloc, next_pc_node, routing, ch_map_1, dev_map, ct_add_buf, pc_add_buf, ea_add_buf, la_add_buf, cm1_add_buf, dm_buf_added, ch_map_2, done |
| cg_node | : symbol; | -- name of the node currently being processed not used during start, validation, start_phys, routing, ch_map_1, dev_map or done states. |
| cg_new_bay | : logical; | -- true (1b) iff a new bay |
| cg_nr_of_nodes | : integer; | -- the number of nodes in the network |
| cg_routing_done | : symbol; | -- fudge field, used to ensure that routing will be done once after link_sizing, but if link sizing is subsequently fired, then it will not be done. |
| ); | | |
| type end_ratios = element | | |
| ( | | |
| host_users | : integer; | -- percentage ratio of user ports to computer host ports |
| PMC_ports | : integer; | -- percentage of end channels that are PMCs |
| ); | | |
| type stop_goal = element | | -- this goal is to stop the current process and make it possible for the user to re-start or terminate the process |
| ( | | |
| stop_state | : symbol; | |
| ); | | |
| type version_descriptor = record | | -- this is used to store the knowledge about the cards. |
| ( | | |
| version | : symbol; | -- card version |
| nr-protocols | : integer; | -- number of protocols for this version. |
| protocol | : array(MAX_NR_PROTOCOLS :symbol); | -- the list of protocols that this version of the card can support |
| nr_f_control | : integer; | -- the number of flow control entries for this version. |
| f_control | : array(MAX_NR_F CONTROLS :symbol); | -- the list of flow controls available for this version. |
| agg_speed | : integer; | -- the aggregate maximum speed of the channels of this speed |
| max_chans | : integer; | -- the maximun number of channels in card |
| max_speed | : integer; | -- the maximum speed of any one channel |
| ); | | |
| type card_knowledge_type = element | | -- This element contains the knowledge about cards. There |

-continued
LIST OF WORKING ELEMENTS AND LIST OF GOALS FOR WORKING MEMORY

| WORKING ELEMENTS | | GOALS |
|---|---|---|
| | | is one of these elements for each card name. |
| ( | | |
| kwg_name | : symbol; | -- the name of the card |
| kwg_nr_vers | : integer; | -- the number of versions for this card. |
| kwg_use | : array(MAX_NR_VERSIONS :version_descriptor); | |
| | | -- the list of available versions |
| kwg_max_cards | : integer; | -- the maximum number of cards of this type |
| | | -- that may be used in any one node |
| kwg_max_size | : integer; | -- the maximum size of this type of device |
| kwg_device | : logical; | -- TRUE if the card constitutes a device |
| kwg_end_con | : logical; | -- TRUE if this device can be used for end connections. |
| kwg_unique_dev | : logical; | -- TRUE if the device number of this card is always fixed. |
| kwg_dev_nr | : integer; | -- the device number of the card, if the device number cannot be obtained from the slot |
| kwg_default | : symbol; | -- the default version of the card, use this version if the user has not supplied one |
| kwg_set | : symbol; | -- to indicate that this card has been entered into a set array |
| ); | | |
| type device_card_type = element | | |
| | | -- holds details of a specific device card |
| ( | | |
| dev_node | : symbol; | -- node to which the device belongs |
| dev_name | : symbol; | -- logical name of the device |
| dev_card | : card type; | -- the card that this device represents |
| dev_size | : integer; | -- the size of the device, as entered in the device map |
| dev_state | : symbol; | -- used for control |
| ); | | |
| type real_link_type = element | | |
| | | -- holds the description of a link for a node |
| ( | | |
| rlt_node | : symbol; | -- name of the node where the link originates |
| rlt_dest | : symbol; | -- name of the nodes destination site |
| rlt_speed | : integer; | -- speed of the links in bits/sec. |
| rlt_index | : integer; | -- distinct number for each link in the network |
| rlt_size | : integer; | -- size of the link |
| rlt_minimum | : integer; | -- min size of the link |
| rlt_maximum | : integer; | -- max size of the link |
| rlt_reserved | : integer; | -- size reserved traffic |
| rlt_status | : symbol; | -- process control of the link |
| ); | | |
| type pipe_type = element | | |
| ( | | |
| pipe_origin | : integer; | -- node number of the pipe origin |
| pipe_dest | : integer; | -- node number of the pipe destination |
| pipe_speed | : integer; | -- aggregate speed of pipe |
| pipe_nr_links | : integer; | -- number of links in the pipe |
| pipe_o_sort | : symbol; | -- sort of node at the pipes origin |
| pipe_d_sort | : symbol; | -- sort of node at the pipes destination |
| ); | | |
| type p_link_type = element | | |
| | | -- Represents the data to written back to the pipe link |

-continued
LIST OF WORKING ELEMENTS AND LIST OF GOALS FOR WORKING MEMORY

| WORKING ELEMENTS | | GOALS |
|---|---|---|
| | | table in the database |
| ( | | |
| pipe_name | : symbol; | -- The node name |
| pipe_nr | : integer; | -- The pipe number (in nconf this is the number of the destination node.) |
| pipe_index | : integer; | -- The number type at_type = array(10:integer); |
| type results_net_type = element | | |
| | | -- holds a set of route priority lists for a node for Chnannel Map |
| ( | | |
| res_net_origin | : integer; | -- origin node number |
| res_net_dest | : integer; | -- destination node number |
| res_net_spl | : at_type; | -- ten shortest path lengths |
| res_net_set | : array(10 :array(30 :integer) ); | |
| | | -- four different shortest paths |
| res_net_best | : at_type; | -- order of indexes for the above array, is the order of path priority |
| ); | | |
| type lsc_type = record | | |

This record holds the information required to perform the end allocation process. This will be filled in two steps:
i) Virtual end allocation: This will responsible for the allocation of end channels to LSC cards of particular versions.
ii) End allocation: This will be responsible to add the information of actual channel channels numbers of the physical configurations produced using the channel cards information provided by end allocation.

The remaining fields are used during the virtual end allocation process.

| | | |
|---|---|---|
| index | : integer; | -- Filled in with array index of the array in the node_lsc element. This will be useful in the future when we create/ make this type an element to save space. |
| version | : symbol; | -- The LSC version pertaining to this record. |
| r_capacity | : integer; | -- The remaining capacity. Initially this will be the aggregate speed as given in the LSC kwowledge base. |
| max_speed | : integer; | -- Max speed of an channel on the card. |
| max_chans | : integer; | -- Max number of channels. |
| r_nr_chan | : integer; | -- Number of remaining channels. |
| number | : integer; | -- Number to be allocated. |
| status | : symbol; | -- OLD if card was already present, NEW if card is new. |
| Speed | : array(4 : integer); | |
| | | -- The speed of the channels allocated |
| f_control | : array(4 : symbol); | |
| | | -- The flow control used on each channel |
| end_names | : array(4 : symbol); | |
| | | -- The ends for each of the channels on the LSC card. For sync cards there will be only two end names. |
| start_chan | : array(11: integer); | |
| | | -- The actual channel number. Filled in after physical configuration, for each possible physical configuration. |

```
                                -- ASSUMES MAX = 11 CHECK/
                                    CORRECT
);
type node_lsc_type = element
There will be one of these for every node in the system.
It will be created by the virtual end allocation process.
In the future it is hoped to make this local to end
allocation process, and to create just the lsc_type
records that are required.
(
node              : symbol;       -- The node name.
nr_lsc_used       : integer;      -- The number of LSC cards.
lsc               : array(60 : lsc_type);
                                  -- Holds the lsc card information
                                    for the node.
);
type create_routing_coal = element();
type total_card_type = element
                                  -- Holds configuration details
                                    for a node. This element is
                                    made in the pre_configuration
                                    process and used in the
                                    physical configuration
                                    process.
(
tch_node          : symbol;       -- Node name.
tch_ARQ_sup-      : integer;      -- The number of ARQ cards that
plied
                                    will be inserted into the
                                    master bay.
tch_devices_supplied
                  : integer;      -- The number of device cards
                                    that will be inserted into the
                                    master bay.
tch_LSCs_sup-     : integer;      -- The number of LSC cards that
plied
                                    will be inserted into the
                                    physical configuration
tch_ARQ           : integer;      -- The number of links which may
                                    be assigned to any ARQ cards.
tch_MSNA          : integer;      -- The number of free slots in
                                    the master bay after the ARQ
                                    and device cards have been
                                    inserted.
tch_min_ex_bay    : integer;      -- Minimum number of expansion
                                    bays required.
tch_max_ex_bay    : integer;      -- Maximum number of expansion
                                    bays allowed for this config-
                                    uration.
tch_utilisation   : integer;      -- The total utilisation on all
                                    the links from this node to
                                    other nodes.
tch_BUF_version   : symbol;       -- The version of the buffer card
                                    that must be used in this
                                    node.
);
type total_end_type = element
                                  -- hold the total number of ends
                                    in their catagories for each
                                    node
(
tet_node          : symbol;       -- name of the mux to which the
                                    ends are connected
tet_index         : integer;      -- this is the same as the
                                    internal node number
tet_ports         : integer;      -- number of ports used at this
                                    node
tet_ends          : integer;      -- total end usage of buffer
                                    space
tet_X             : integer;      -- all ends with end_node same as
                                    dest_node
tet_Y             : integer;      -- all ends with end_node
                                    different to dest_node
tet_sw_ports      : integer;      -- the number of ports connected
                                    to other nodes (or feeders not
                                    connected to this node), but
                                    switched by the node.
tet_synchs        : integer;      -- nr of synch LSC channels at a
                                    node this field is not used
tet_asynchs       : integer;      -- nr of asynch LSC channels at a
                                    node this field is not used
);

type user_size_link = element
                                  -- This element is created in the
                                    channel map for links which
                                    have user specified sizes,
                                    whose PMC allocation has been
                                    totally used up. It should be
                                    used by link sizing to ask the
                                    user if he wishes to
                                    re-specify the size, and then
                                    this element should be
                                    REMOVED.
(
usl_rlt_id        : integer;      -- One of the real link type ids
                                    for this link.
usl_node          : symbol;       -- The source node.
usl_dest          : symbol;       -- The destination of the link
usl_speed         : integer;      -- The speed of the link.
);
type mode_descriptor = record
                                  -- A list of data base volutntary
                                    and results tables that will
                                    be read from the data base.
                                    TRUE means that the table will
                                    be read.
( on bay records
md_end_alloc      : logical;      -- end allocation table
md_link_alloc     : logical;      -- link allocation table
md_routing        : logical;      -- routing results records
md_chan_map       : logical;      -- the channel map
md_dev_map        : logical;      -- the device map
);
type write_data_goal = element
(
state             : symbol;
remove            : logical;
);
type set_of_cards = record        -- this is a set of card names
(
list              : array(30: symbol);
                                  -- array of card names
nr                : integer;      -- number in the array
);
```

C. The Man-Machine Interface

Expert systems act as an intelligent assistance to human experts, as well as assisting users who otherwise might not have access to expertise. Although both expert systems and "data base" programs feature the retrieval of stored information, the two types of programs differ greatly. Data base programs typically contain knowledge about their particular work.

Since a data base program can not draw conclusions by reasoning about the facts or the domain, users of a data base program are expected to draw their own conclusions. In contrast, expert systems contain expertise, consisting of both the declarative and procedural knowledge, which allows them to emulate the reasoning process of human experts.

An expert system is worthless if the intended user can not communicate with it. The component of an expert system that communicates with the user is known as the user interface.

The communication performed by a user interface is bi-directional. At the simplest level, the user must be able to describe the problems of the expert system, and the system must be able to respond with its recommendations.

In a man/machine interface, many conventional implementations concerning the creation of a useful framework for a man machine interface currently exist. These include such conventional approaches as those based on the task being undertaken, the type of software used, the form of functions, and others. Each conventional approach has its virtues, but each tends to omit certain factors involved in the software human factors aspects of the interface.

The present invention overcomes this by first defining the end user interface as consisting of three elements;
1. the user model of the system
2. the operations that may be performed, and
3. the media used between the user and operation.

1. User Model

Concerning the user model, sociological based research has given rise to the useful concept of user modeling. Such works suggest that users maintain their own conceptual model of the computer system in use, with both internal and external boundaries. The degree to which the system coincides with the model is to the degree which it is viewed as "user-friendly."

2. Operations/Media

The computer component of the man/machine interface 910 of the present invention can be divided into computation media and operations. The media used forms an envelope around the system operations, and serve only to effect a transfer from an internal representation of data to some external one. The media types are, in effect, the form in which data is passed between a user and the systems operations. Examples of media which could be used are: command languages such as UNIX or MS-DOS, foreign based input and output, menus architecture such as Wang, table driven media such as spreadsheets, ICON driven media such as Xerox or Apple MacIntosh, and window driven media such as GEM.

The preferred embodiment of the present invention utilize menus architecture implemented to enable a human user 912 to interface with the expert system 918 in such a way as to maximize the user friendliness inherent in the design of the expert system 918 of the present invention. However, it should be appreciated that the present invention could be implemented having graphical interfaces to a human user 912.

3. Menu structures of the Present Invention

Figure 34:
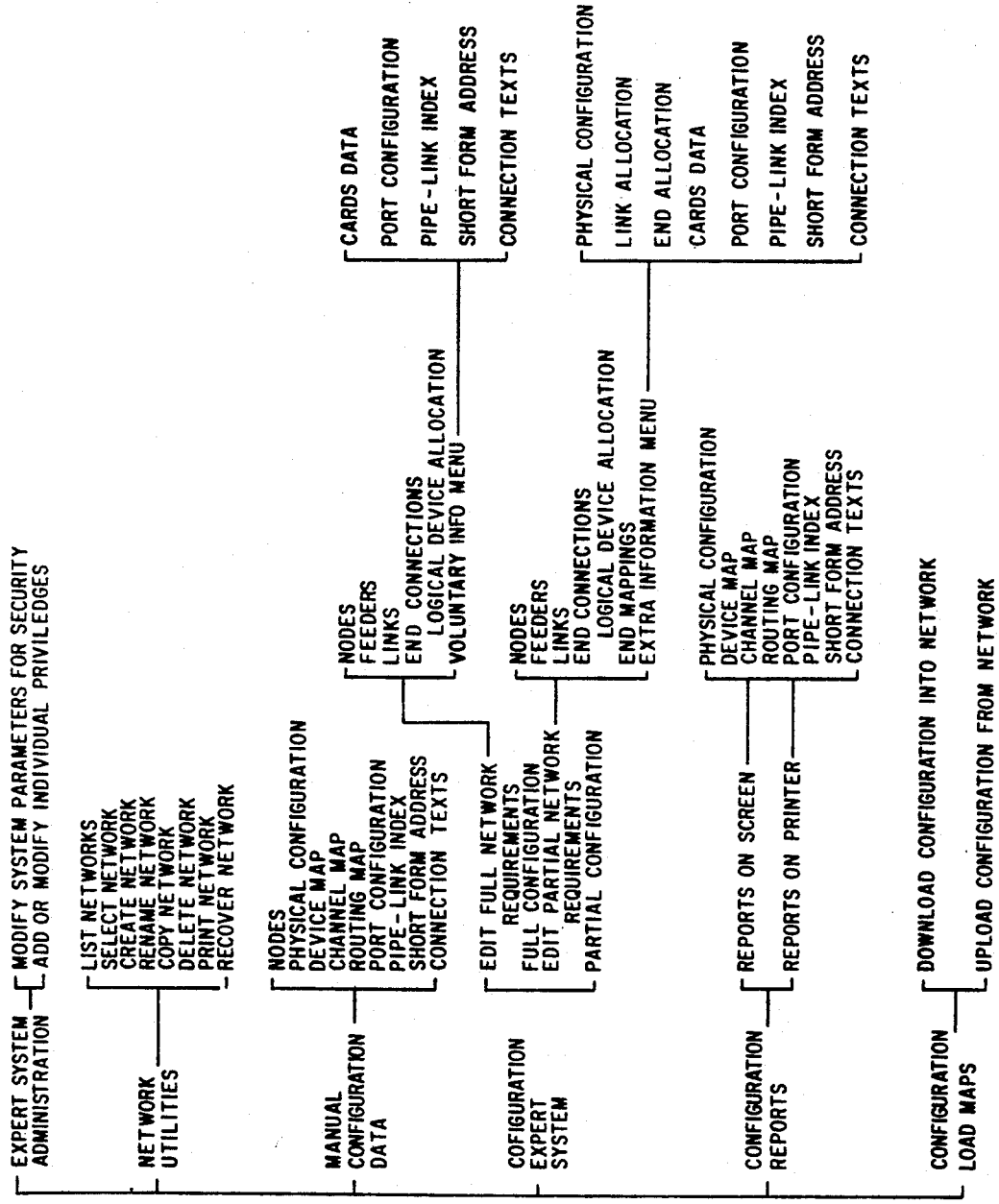
FIG. 34 illustrates a screen of a typical menu structure of the present invention.

The menu structures of the present invention is shown in FIG. 34.

Once the human user 912 has accessed the present invention and performed system startup, the main menu of the present invention, shown in FIG. 15, will appear.

Menu selections from any menu of the present invention can be made by either:

By selecting a number followed by RET (RETURN or ENTER), or,

Pressing RET, which selects the currently highlighted option; the cursor keys are used to move up/down the menu options.

The main menu options are as follows, which reference to FIG. 15:

Expert System Administration

Expert system administration (FIGS. 16 and 17) allows the superuser to modify the passwords for himself and to allocate different passwords to normal users.

Network Utilities

Network utilities (FIG. 18) allows the human user 912 to select from an existing list of previously defined communications networks 500, add a new network name, or delete an old network. If deleting (confirmation is required), the present invention will delete all data related to the chosen network. In addition, the human user may rename existing networks, obtain a complete network printout, copy an existing network information to another network, or recover the last version of the network information base before the last complete run of the expert system 918.

Manual Configuration Information Base

This function lets the human user input and maintain a complete configuration data set for a communications network (physical configuration device map, channel map, routing map, port configuration, short form address, pipe-link index), and it is aimed to be used in relation with the configuration load maps function. Only simple validation is performed on the data entry, and the responsibility for the quality of the configuration is with the human user.

Configuration Expert System

This function lets the human user define and maintain the requirements for the communications network and then produces an expert/optimum configuration for the communications network (the results are: physical configuration, device maps, channel maps, routing maps)

Full Configuration of Network

This function lets the human user define and maintain the requirements for the use of the communications network, and then validates the corresponding network requirements, and provides alternative configuration of the full network. Every time the human user changes (modifies) the requirements of the use of the communications network, a new complete configuration is produced for the whole network.

Partial Configuration of Network

This function lets the human user define extra requirements or small modification to the requirements, and then to generate a new configuration, which is the old (previous) configuration with very minimal changes.

Configuration Reports

This option is used for displaying or printing out the results produced by the expert system 918 of the present invention.

Configuration Map Load

This function creates load maps which can be downloaded into the nodes 505 of the communications network 500.

The data entry forms within a menu also provide help information, which is accessible by pressing the tab key. Help text is available on all menus containing a ? in the command key line at the bottom of the screen. A list of topics on which help text is available is displayed by typing "help topics". Help information on particular topics can be displayed by typing "help [a topic]".

The following list contains the menu command keys:

4. Menu Command Keys

| NAME | KEY(S) USED | ACTION |
| --- | --- | --- |
| Select | [RET] | Select the highlighted option |
| Up | | Move the menu pointer up |

-continued

| NAME | KEY(S) USED | ACTION |
| --- | --- | --- |
| Down | | Move the menu pointer down |
| Home | [CTRL] G | display your home menu |
| Previous* | [CTRL] L | Display the previous menu |
| Clear | [CTRL] Z | Clear the selection line |
| Exit | [CTRL] D | Exit (quit) |
| Help | ? | Display help text |
| More | / | Display more command keys on the command key line |
| Info | [TAB] | Display information about the currently highlighted option |
| Redraw | [CTRL] R | Redraw the screen |
| Toggle | [CTRL] T | Toggle the command key line on or off |

A menu Help text is available in any menu which contains [?-help] in the command key line.

The form command keys are implemented as follows:

5. Form Command Keys

| Name | Key (s) | Used Action |
| --- | --- | --- |
| Up | [CTRL] U | Move the pointer up |
| Down | CR | Move the pointer down |
| Inquire | I or i | Display network data from the database |
| Add | A or a | Add network data |
| Modify | M or m | Modify network data |
| Delete | D or d | Delete network data |
| Begin search | [CTRL] E | Search for details for all entries |
| Clear field | [CTRL] Z | Clear entry field |
| Exit | [CTRL] X | Exit from the form |
| Next | N or n | Displays data for next page |
| Previous | P or p | Displays data for previous page |
| Stop | S or s | Halt search function |
| Previous Screen | [CTRL] U | Backup to previous stage. Move the pointer to the top of the screen prior to using this command. |

IV. USER OPERATION

A typical network 500 consisting of switched and non-switched multiplexers, and perhaps smaller feeder multiplexers, must not only be physically installed properly, but it must be configured properly as well. Configuration is normally done after the communications network 500 has been designed and before or during the period in which it is being installed. Configuration may also be required after installation if the network is being changed or if network traffic patterns change over time.

Prior to the invention of the present invention, it was necessary for a human operator, such as a communications network expert, to spend a considerable amount of time planning, writing, debugging and optimizing the various configuration tables before the communications network 500 was installed. The physical inventory of the network had to be defined manual before the network could be sold in order to price the network.

The rest of the configuration maps had to be done prior to installation because such mapping took so many man hours that to wait until installation time to configure would delay the installation of the network significantly.

For example, a 20 node network with an average complement of feeders and links may take approximately a week for a human expert to initially, configure manually. Any additional nodes, feeders or channels which were included as afterthoughts then had to be factored in and would impact the tables for any or all of the nodes, thus increasing the configuration time even more.

A. Supplying Network Data

The configuration maps for that same 20 node network, which took up to a week to do by hand can be done by the present invention in a fraction of the previously required time. The operator (human user) will enter the network data requirements 916, such as node types, end connections, link speeds and feeders. Once this is done, the expert system 918 analyzes that data and generates the configuration tables for every node 506 in the network 500. Once done, they can be updated in the event of network changes by simply entering the changes into the network data requirements 916 and running the expert system 918 again.

The present invention is very accurate, yet it is only a tool for the human operator to use to perform a task. The operator must accurately provide it with the information it needs to do its job. That information, and how it is provided by the user, is detailed as follows.

Initially, the user accesses the present invention from the menu system by selecting configuration expert from the configuration and administration menu 1502, at FIG. 15. The startup menu 1602, is presented, requiring the user to log in with a user login and a password.

Two types of users are supported by the present invention. The Superuser has access permission to all 6 functions of the present invention; the normal user has access only to Network Utilities, Manual Configuration Database, Configuration Reports and Configuration Load Maps.

When the present invention is accessed for the first time, the logins and passwords are set as follows:
Superuser login=alex; password=alex
User login=user; password=pass)

1 Creating and Selecting the Network

To create a new network the Network Utilities menu 1802, is selected from the main menu 1502, and the Create Network function is selected. The human user 912 is next prompted for a network name. When this name is entered a blank communication network database is created and is ready for human user 912 input. To select an existing network, the Select Network function is selected from the Network Utilities menu 1802. The human user 912 is then shown a list of the current communications networks and is prompted to choose from it. When a name is entered, the communications network of that name is selected. In either operation, Create Network or Select Network, the currently selected communications network is the network whose name has been entered by the human user 912. At this point the human user 912 can proceed to enter or update network data to create an working memory (working database 906).

Working database 906, consists of network requirements information and network configuration information. A human user 912 supplies certain basic network parameters, and the expert system 918, creates the rest. The information base is shared between the expert system 918 and the human user 912. The user supplies the network requirements information (A) and may supply (partly or completely) the communications network configuration information (B).

The input and output tables for the configuration task are defined in FIG. 14.

The following items comprise the network requirements:
1. A name and type of each node.
2. A name and type of feeder multiplexer.
3. A name and parameters of each composite link.
4. Descriptions of the network's end connection points. The end points may be described individually or in groups.
5. Description of devices used for the end connection points.
6. Permanent connections between end points.

Voluntary items which can be supplied by the user are:
7. The short form address table for each node.
8. The port configuration table for each node.
9. A list of all the cards at each node.

Figure 11:
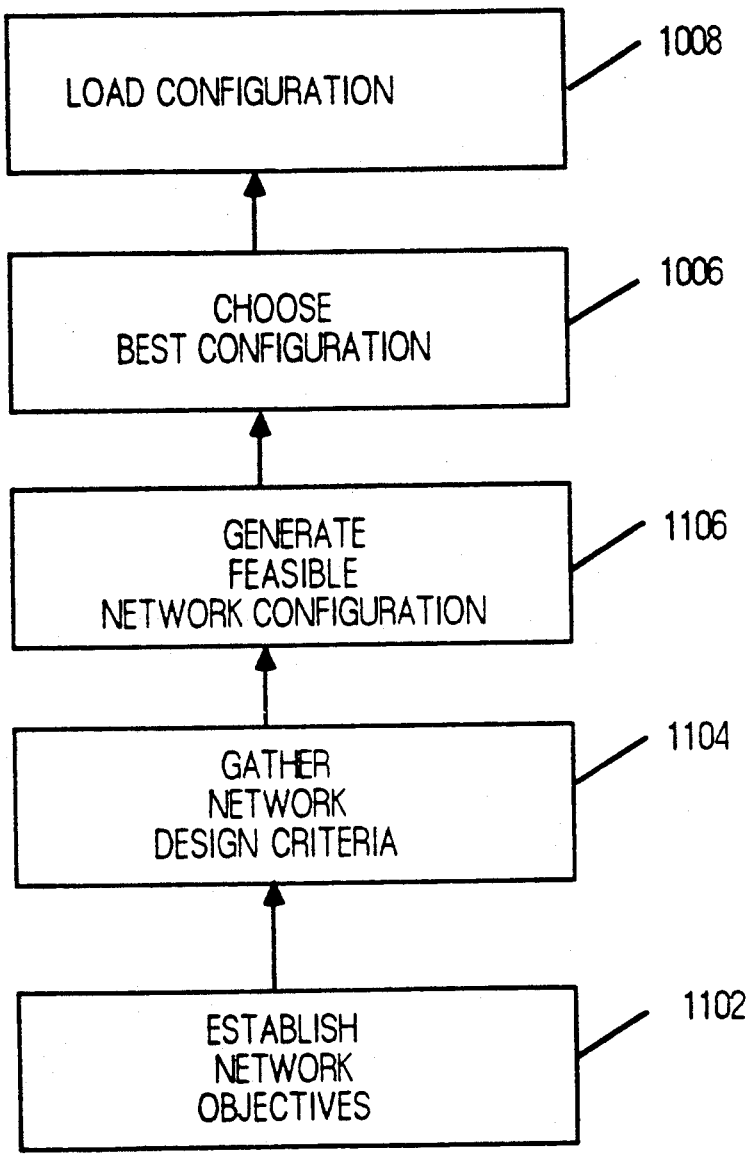
FIG. 11 is a block diagram of the subtasks (and their sequence of operation) of the initial configuration of the communications network.
Figure 12:
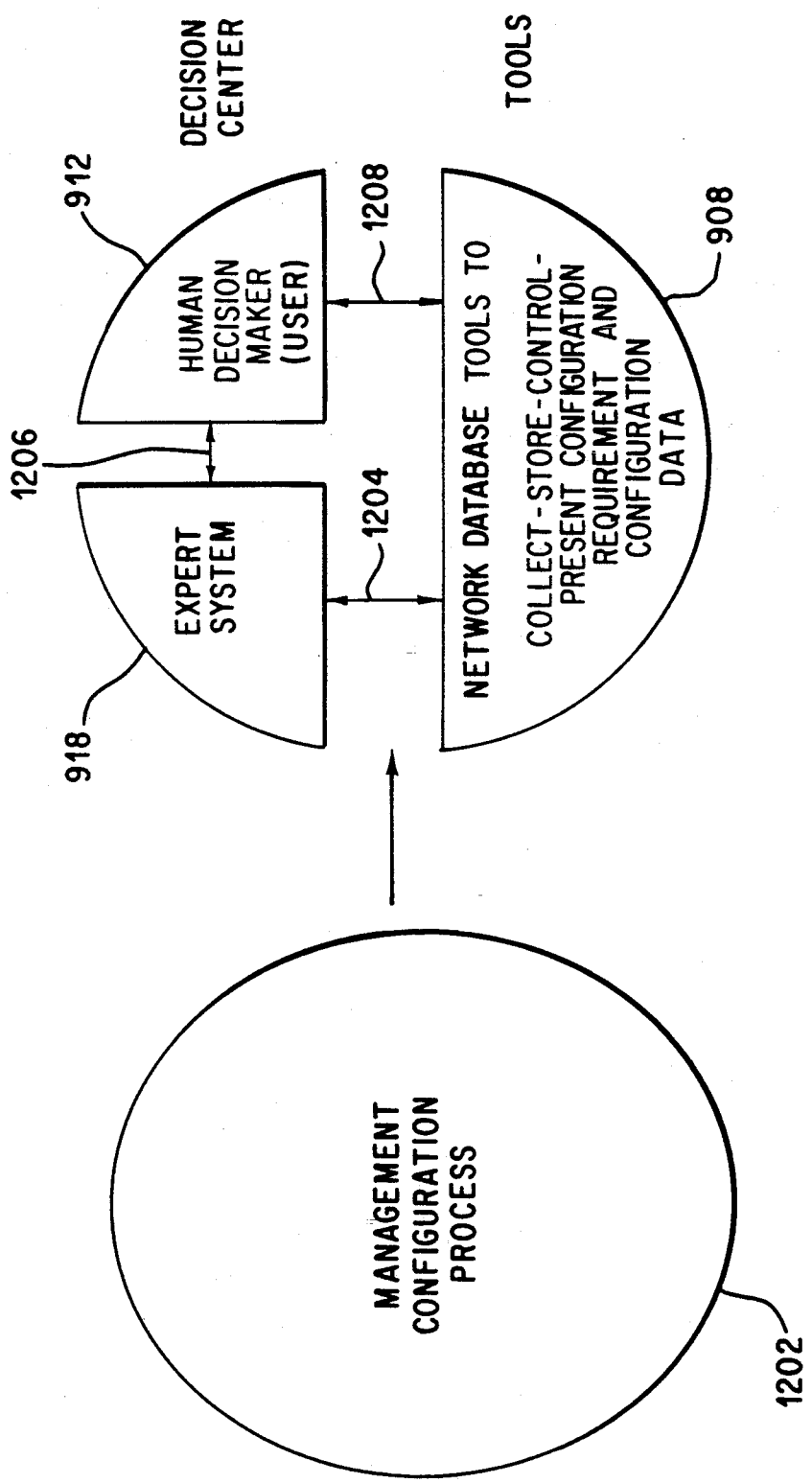
FIG. 12 is a graphic representation of the configuration management process decomposed into three constituent parts.

An additional advantage of the present invention is that an initial configuration can be produced for a new network in accordance with the user's requirements as shown in FIG. 11. The present invention, as an expert system, cooperates with the user in the configuration process rather than presenting him with a "take it or leave it" solution typically supplied by conventional network configuration techniques.

The present invention can create the complete configuration on its own, if this is what the user wants. It will also allow the user to define the configuration so as to specify that certain elements of an existing network configuration are to be left unchanged.

As best shown in FIG. 34, the present invention achieves these goals by sharing a description of the network and its current configuration with both the user and the expert system. Examples of these menus and typical formats can be seen in FIGS. 15 through 20.

The network description is held in working data base 906 which provides information about the communications network topology and how the communications network will be utilized. Information which must be provided to the present invention prior to configuration consists of a description of the communications network in a format specified in the following sections. This information is maintained in tables and consists of the following elements:
Nodes
Feeders
Links
End groups
Permanent (non-switched) connections
Special gateways and utility cards The expert system 918 uses this information to create a description of the communications network configuration.

Alternatively, the human user 912 provides some of the configuration information, and the expert system 918 will create the rest.

Figure 10:
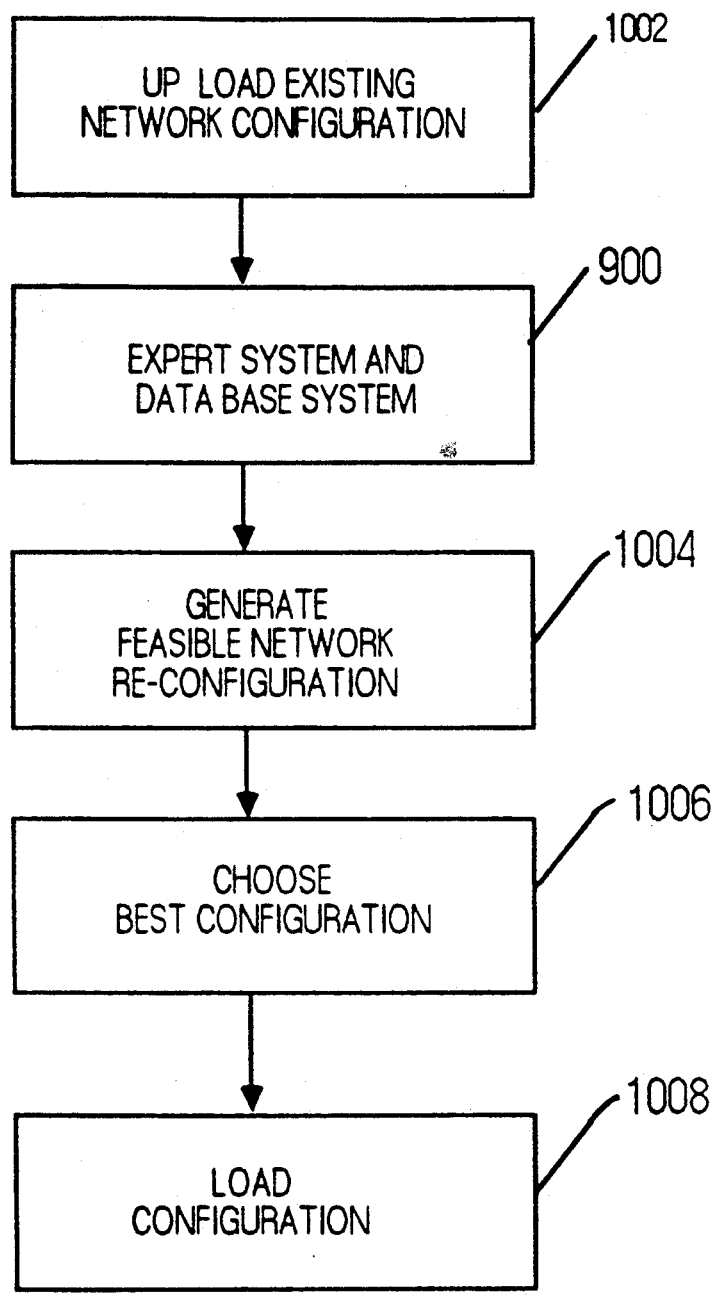
FIG. 10 is a block diagram of the subtasks (and their sequence of operation) involved in the configuration of the communications network.

Referring now to FIG. 10, it is shown that once a description of the communications network configuration has been created by the present invention, it can be used as a starting point for new configurations to be created. The human user 912 can mark the components that he does not want changed, and the expert system will add the necessary components and create a new complete communications network configuration.

Some components of this communications network configuration information are dependent on other components. The expert system 918 of the present invention will validate information provided by the human user 912 and advise him any of inconsistencies. The expert system 918 can thus handle a number of different descriptions of a network so that the user can experiment with different configurations.

As shown in FIGS. 20 through 25, and 30 through 33, the expert system 918 supplies typical configurations to the human user 912 for each major aspect of the communications network configuration process.

The present invention contains the means to load the desired configuration tables into the communications network for operation. Referring again to FIGS. 10 and 11, the human user 912 can therefore hold the configuration information in the present invention, use the expert system 918 to produce the configuration tables whenever a change is made, and then have it load those tables into the communications network for use at any time desired.

The following information comprises the network configuration:
1. The node names
2. The physical configuration of each node (card layout). The switched 506 node and non-switched node 506 card frames, or bays, must have a certain complement of cards installed in them in order to provide the links between multiplexors, the channels which connect to the user terminals and computer ports, buffer space for storing data while it is passing through the nodes, gateways to other types of networks (such as IBM and X.25) and a number of other utility and diagnostic facilities. The cards in the bays must not only be the correct cards, but they must also be inserted in a specific pattern within the bays and relative to each other. This pattern is unique to each bay in a given communications network and is known as the Physical Configuration of a bay.
3. A definition of which end connection points 502 are served by which ports in each node 506.
4. A definition of which composite links 504 are served by which ARQ cards in each node 506.
5. The device map for each node. In order for the control processes within a switched or non-switched node 506 to know where each card is located within the bay, and to provide storage via buffer cards for data passing through those cards, the human user 912 must program into it a table known as the Device Map shown in FIG. 31. The Device Map contains the Size of each card (amount of buffer allocated) as well as its Device Number (the actual address within the buffer card where the allocated space begins). The Device Map, then, provides the information needed to move cards around within the bay itself.
6. The channel map for each node. In order for two ends 502, such as a host computer port and a user's terminal, to transfer data between each other the nodes 506 must have knowledge of which cards and connections these ports are connected to. When the communications network is set up a relationship between these ports must be programmed into the multiplexors describing which ports are to be communicating with which other ports. This relationship is called the Channel Map, shown as FIG. 32 and must be programmed into each node 506 which has ports connected to it.
7. The routing map for each node. In complex communications networks there may be several paths, or routes, between any two nodes. In the event that one pipe in a path fails due to a faulty line or other problem, switched nodes 506 can reroute data via a new route, thus providing maximum fault tolerance and user data integrity. However, in order to accomplish this the nodes 506 must first be programmed with the knowledge of which alternate routes are available. The list of main (or primary) routes and alternate (or secondary) routes is known as the Routing Map 5302, and is programmed into the nodes 506 at the time of installation of the communications network.

8. The pipe-link index table for each node. A Pipe is defined as one or more links that are duplicate paths between two nodes 506. A route may comprise one or more Pipes. Each switched node 506 must have a route specified to every other node 506 in the communications network; this is programmed into the Routing Map 3302. When a communications network user wishes to make a switched connection to another node 506, the switched node 506 examines the first (or only) Pipe defined in the Routing Map 3302 for that node 506 and attempts to make the connection along that pipe. If the connection fails, it tries the next Pipe in the Routing Map 3302. This process continues until either there are no more specified Pipes or the connection is made. The Pipe-Link Index must be supplied in order for the Routing Map 3302 to be valid; thus it is necessary in order for the communications network to do automatic rerouting.

9. The port configuration table for each node.

10. Short form Addresses.

User-supplied information is explained in FIGS. 13.1 13.7 and summarized in the illustration at FIG. 14.

The following is an explanation for each user entry in network information base tables 13.1 to 13.7.

Nodes

The human user 912 must first provide the present invention with a list of all of the nodes 506 in the network, their node numbers, types-switched or non-switched, and sites at which they are located. This information is entered in the Node Data screen [shown in FIG. 20], and is stored for later analysis by the expert system 918.

Node Name—unique name for node 506 (up to 16 alphanumeric Characters).

Node number—number assigned to node 506 (Zero for non switched nodes 506.)

Site—name of site where node 506 is located (optional)

Type—node 506 type-switched or non-switched.

Country—country where site is located (optional)

Notes—user's notes.

Feeders

Feeders 508 are smaller multiplexers which are used to concentrate data from remote sites which can then be transported over a pipe to a node 506. The human user 912 must enter the list of feeders 908, along with their types, the number of channels they are to concentrate, and the sites at which they are located, in the Feeder Data screen [shown in FIG. 21].

Feeder Name—unique name for feeder 508 (up to 16 alphanumeric characters).

Site—name of site where feeder 508 is located (optional)

Type—such as Case Communications PLC.,—812, 815, 825, 833, 836, 817, 842.

Number of channels—highest channel number used on the link 504 from this feeder 508.

Notes—user's notes.

Links

The links 504 between nodes 506, as well as the links 504 between nodes 506 and feeders 508, must be entered in the Link Data screen [shown in FIG. 22]. The information to be provided to the expert system 918 concerns the origin and destination multiplexers, the number of links 504 between them, the speed of the links 504, and, optionally, the size of the links 504. The size refers to the number of channels of data which are to be carried over the link 504, and will be computed by the expert system 918 if not entered at this point.

Origin Node—a node 506 name which has already been entered into the nodes 506 table.

Destination Node/Feeder—a node 506 or feeder 508 name which has already been entered into the nodes or feeder table.

Link speed—data communications speeds—1200, 1800, 2400, 3600, 4800, 7200, 9600, 14400, 16000, 19200, 48000, 56000, 64000 baud.

Number of Links—usually 1. If heavy communications traffic necessitates the use of parallel links 504, enter the number of links 504 from the origin node 506 with the same characteristics.

Link Size (Optional)—the human user 912 specified size. If zero is specified (default value) then the expert system 918 will suggests optimum values for the size of the link 504.

End Connections

The End Data screen [shown in FIG. 23] accepts input from the user specifying the groups of terminals and computer ports which are to be connected to the communications network 500. Ends 502 may also be connections to special device cards and utility cards, or to ports on a feeder 508.

Ends 502 may be of four types.

Permanently Mapped Connection (PMC). Also referred to as a non-switched connection. The human 912 user whose terminal is connected to it has no choice but to communicate to a host port somewhere in the communications network which has been defined at configuration time. (This is in contrast to a switched connection whereby the human user 912 may connect to the communication network and select a host port of his own choosing somewhere in the communications network.) Alternatively, connections on special device cards may use PMC to be permanently connected to other devices in the communications network.

User-Mapped Port (UMP). This type of port is connected to or disconnected from any other unoccupied UMP at the human user's 912 request.

Automatically Mapped Port (AMP). An AMP is a port or group of ports associated at configuration time with one or more UMP's. A human user connected to one of those UMP's is automatically connected to the first available port in the AMP group. Typically a group of ports on a single host is configured as an AMP so that users need not specify which port to connect to, just the name of the AMP group.

Internally Mapped Port (IMP). This type of port can be connected to or disconnected from another IMP only by the system supervisor. The destination is not specified at communications network configuration time like the PMC; however, the human user still does not have the choice of where in the network to be routed to.

A number of additional communications network parameters are required from the human user 912 of the present invention when entering the end connections information:

Ends name—a name for this group of end connections 502 (up to 16 alphanumeric characters). A group may consist of one or more ends 502. No more than one group in a node 506 can be assigned the same name. (e.g. an end is a host computer port or a terminal channel).

Multiplexer name—node 506 or feeder 508 name to which this end 502 group is physically connected (this name has already been entered into the nodes/feeder tables).

Number of ends—number of end connections 502 in this group.

Are these ends computer ports? (Y/N) Y=yes; N=No

Port type—UMP, AMP, IMP, or PMC.

Speed—data communications speeds 50, 150, 200, 300 600, 1200, 1800, 2400, 3600, 4800, 7200, 9600 baud.

Type of traffic—type of data traffic expected to/from this group of ends 502, as follows:

| | |
|---|---|
| CONV: | conversational |
| GRAPHICS: | graphics |
| ENQ/RESP: | enquiry/response |
| PRINTER: | line printer |
| FILE-TRANS: | file transfer |

Protocol—the default is ASYNCH. What communications protocol does this group of ends 502 use? (applicable only to the LSC cards). Protocol values in the preferred embodiment of the present invention include:

| |
|---|
| 9-BIT |
| HP3000 |
| TANDEM |
| WANG |
| BAUDOT |
| SYNCH |
| 3270 (IBM 3270) |
| 2780 (IBM 2780) |
| 3780 (IBM 3780) |
| CO1 (ICL CO1) |
| C02 (ICL C02) |
| C03 (ICL C03) |
| VIP (HONEYWELL) |
| UT200 (CDC) |

Flow control permissible entries are:

| |
|---|
| DC1/DC3, TFC |
| DC1/DC2, TFC |
| DC1/DC2, BOP |
| DC1/DC3, TFC |
| DC1/DC3, BOP |
| CTS, BOP |
| DTR, TFC |
| NONE |

Card type—requires a card type which allows ends 502 to be connected to the communications network. Card types concern the type of network interface required for disparate communications network entities such as IBM mainframe computers and devices able to utilize CCITT X.25 interface protocols to communicate with each other. Examples are as follows:

| | |
|---|---|
| XGT | (XGATE) (X.25) |
| BLK | (BLUELINK) (IBM) |
| SLK | (SLINK) |
| IGT | (INFOGATE) |
| MON | (MONITOR) |
| BGT | (BLUEGATE) (IBM) |
| BCH | (BATCHLINK) |
| DLK | (DLINK) |
| NCM | (NCAM) |
| LSC | (Low Speed Channel Card) |

Enter N/A for ends 502 physically connected to feeders 508. Card version - for above card.

Flow Control (LSC)—a flow control for LSC cards. N/A for other cards.

NOTE: user's notes

Fixed Mappings

This form specifies permanent (PMC) connections [or non permanent connections (IMP, UMP, AMP) which are switched at another switched node 506.

A fixed mapping is a permanent (non-switched) connection between two end channels or end groups. In use, this connection takes one of two forms. The human user 912 whose terminal is connected to it may have no choice but to communicate to a host port somewhere in the communications network which has been defined at configuration time. (This is in contrast to a switched connection whereby the human user 912 may connect to the communications network and select a host port of his own choosing somewhere in the communications network.) Alternatively, the human user 912 whose terminal is connected to this channel may be able to switch to a destination, but the switching occurs at a node 506 other than the one the human user 912 is directly connected to. In the first case, the end channel, the human user 912 is connected to is known as a PMC. In the second case, it is an UMP, IMP or AMP. The parameters required are entered in the Fixed Mappings screen [shown in FIG. 24] as follows:

Origin End—The origin end 502 group name of the PMC mapping, which should have already been entered in End Connections Table.

Origin Multiplexor—The origin end's 502 multiplexor, which should already have been entered in the Node Table.

Destination End—This should be either an end 502 which has already been entered in the End Connections table as PMC, or N/A if the origin ends 502 are to be switched at another node 506.

Destination Multiplexor—This should be either the destination end's 502 multiplexor, or N/A if the origin ends 502 are to be switched at another node.

Switching Node—This must be either a previously entered switched node 506 for non-PMC ports switched at a different node 506, or N/A for a PMC mapping.

Logical Device Allocation

In order for the expert system 918 to know which devices are associated with which ends 502, the human user 912 must specify a name for the device card and associate it with an end 502 group which has already been entered. This is required only for non-LSC cards such as gateways, and special system-oriented utility cards. The parameters required are entered in the Logical Device Allocation screen [shown in FIG. 25], and are as follows:

Node Name—the node 506 to which the device ends 502 are connected (already entered into the Nodes table).

End Name—name of device ends 502 (group of ends already entered into Ends Connection table).

Logical Name for Device—human user 912-defined name for the device card to which these ends 502 are to be connected (up to 16 alphanumeric characters).

Start Channel Number—the channel number on the device to which the first end channel will be connected. The ends 502 are allocated sequentially from this first channel number.

Start Channel Number—the channel number on the device to which the first end channel be connected. The ends 502 are allocated sequentially from this first channel number.

Voluntary Information—The purpose of the Voluntary (Extra) Information Menu shown in FIG. 19 is to allow human user 512 an opportunity to supply additional information for the full or partial configuration task. Information for the Link Allocation table, End Allocation table should be supplied only for partial configuration.

The voluntary information can be supplied by the use of the following tables:

Cards Data

Special gateway cards and special system utility cards are entered. Although a communications network requiring gateways to IBM, X.25, etc. cannot function without gateways, they are not necessary for basic communications network operation. Any card type can be entered by human user 912 from this screen as below:

Node name—the node 506 in which the card is to be placed.

Card type—the type of device card being specified for the node 506.

Card version—the version level of the card.

Quantity—the number of cards of this type to be placed in the node 506.

Link Allocation

In order for data to be passed into or out of a link 504, each link 504 to a destination node 506 must have a device number assigned to it in the Device Map. Normally the expert system 918 will decide which devices are associated with links 504 to particular destination nodes 506. However, if so desired the human user 912 can fix this number during the entry of communications network data requirements. The information required is a follows:

Node name—the node 506 where the link 504 originates.

Link device number—the device number of the link 504 in the origin node 506.

Link destination node—the destination node 506 at the other end of the link 504.

Link speed—the speed of the link 504 in bits per second (baud).

End Allocation

In order for data to be passed to a particular end group 502 in the network, the nodes 506 must know which end groups 502 are associated with which channels. Therefore each end group 502 must be associated with a specific device and set of channel numbers in the node 506. Normally the expert system 918 computes this based on the total number of users connected directly to a node 506 and the number of channels required for other device cards. However, as with *Link Allocation*, the human user 912 can fix this information during the entry of communications network requirements. The information required is as follows:

Node name—Name of the node 506 where the ends 502 will be allocated.

Device number—Device number of the card to which the ends 502 are allocated.

Start channel—The beginning channel number (usually 1).

Ends name—The end group 502 name containing the channels to be allocated (from the End Connections Table).

Number of ends allocation—Number of end channels 502 from this group to be allocated.

Port Configuration

This information is required only for switched nodes 506. It contains information about groups of IMP's, AMP's and UMP's which are used only in switched nodes 506. It will not be generated by the expert system 918 but must be entered by the human user 912.

Pipe-Link Index

The Pipe-Link Index will be generated by the expert system 918, but may also be fixed by the human user 912 if desired.

Short Form Address table

This information applies only to switched nodes 506. The human user 912 may associate a series of names and addresses with specific nodes 506 and ports on the communications network. The communications network user connecting to the communications network can then select a destination to be connected to by specifying a name rather than a node 506 and port number. For example, the following entry into the short form address table:

| | |
|---|---|
| Node name: | WASHINGTON |
| Short form address: | 001 |
| Short form name: | IBM |
| 1: | 1.2 |
| 2: | 1.5–15 | provides the communications network user with the ability to access the host whose ports are connected to Node 1 Port 1 and Node 1 Ports 5 through 15 by simply typing the mnemonic "VAX." The user is then switched to the first unused port in that series of ports at node 1.

This table greatly reduces the amount of information the human user 912 needs to remember when connecting to different resources. The Short Form Address (or SFA) table must be entered by the user; it is not generated by the expert system 918.

Duplicate Short Form Address

This allows the human user 912 to duplicate the same SFA for several or all nodes 506 in the communications network, thereby allowing all human users 912 on the communications network to access the same resources by using the same mnemonic.

Connection Texts

This information applies only to switched nodes 506. These user-defined texts are sent to switched-connection users when certain events happen during connections. For example, if the connection cannot occur because the destination port the human user 912 has selected is occupied, the human user 912 may wish the to inform the user of the situation by displaying "DESTINATION OCCUPIED," or some other descriptive banner.

This information is not generated by the expert system 918; it must be human user 912 supplied.

B. Operation

1. Accessing the Present Invention

Once the communications network requirements data has been entered by the human user 912 the configuration task can be initiated. At the main menu 1502, shown in FIG. 15, the human user 912 selects Configuration Expert System, then Full Configuration in the case of a new communications network, or Partial Configuration in the case of an existing communications network which is being updated with new information. The expert system 918 portion of the present invention then analyzes the communications network data and performs these functions:

a. Validate communications network data
b. Configure communications network
c. Store communications network data and configuration results These tasks are described in more detail as follows:

a. Validate Network Data

In this task the network data entered by the human user 912 is validated. If any errors or inconsistencies exist in the input data, or if it is incomplete, the human user 912 is informed by the present invention and corrective measures are suggested.

b. Configure Network

This is the task process whereby the tables described in FIGS. 13A thru 13G are utilized by the expert system 918.

End channels 502 are automatically allocated to LSC cards, and then the present invention queries the user—

"Do you desire minimum expansion capability at each node?"

If the human user 912 response is Y (yes), the present invention automatically configures each node 506 to leave minimum room for future expansion.

If the human user 912 response is N (no), the present invention displays a variety of possible communications network configurations to choose from. Physical configuration alternatives are displayed for each node 506 in turn. The first physical configuration displayed or an alternative configuration may be selected.

The physical configuration generated by the present invention at this stage is not final. Extra buffer cards or expansion bays may be added during later phases of the configuration process.

Network links are then automatically allocated to ARQ cards and sized.

The present invention will then query the human user 912 —"Would you like to see device maps for each node?"

If the human user 912 response is Y (yes), the device maps are displayed in turn. The human user 912 then has the opportunity to change the sizes of the devices in each node 506.

If the human user 912 response is N (no), the present invention assumes that its computations of the device maps are correct and continues on to the next configuration function of the communications network.

The present invention will then query the user—"Would you like an automatic generation of the switched node sub routing maps?"

If the human user 912 is Y (yes), the switched Routing Maps are automatically generated. The routing maps are not displayed here; they may be viewed from Reports on Screen, shown at FIG. 29.

If the human user 912 response is N (no), the human user 912 is requested to input the origin and destination node 506 names.

The expert system 918 computes up to 14 routes and selects the best four. Screen graphics illustrate the shortest routes. The routing order is determined by path length, by the speed of the first pipe in the route and by the number of links in the first pipe in the route. Routing information is displayed after this computation is completed. Eventually the human user 912 must use automatic routing generation to compute the remainder of the Routing Maps.

All Channel Maps are then generated by the present invention and may be viewed by the human user 912 from Reports on Screen 2902, at FIG. 29.

c. Store Network Data and Configuration Results

The configuration of the communications network is now complete. The human user 912 can store corrections made to the Network Requirements data, as well as the newly generated Configuration Results. If store is selected, the old network database is backed up and stored for future reference and the new information is stored in the currently selected network database. If store is not selected, the results of the Validation and Configuration processes are lost.

2. Network Configuration

Once the validation and configuration tasks are completed and the human user 912 has saved the results, the data is stored in the form of record tables and can be accessed when desired by the human user. The communications network requirements data can be updated as the communications network changes and the communications network can be configured again according to the present invention.

At this point in the expert system 918 the information is readable by the human user 912. The maps and tables can be called up by node 506 and reviewed by the human user 912. The communications network configuration information can be printed if so desired.

However, it should be appreciated that at this point the communications network requirements information is still in the database, not in the actual nodes 506 it is intended for. The configuration maps must be transferred into the nodes 506 in order to complete the task of configuring the communications network.

There are two ways to perform this transfer to the nodes 506. The human user 912 may print out all of the results using the reports function and send them to a field installer (not shown) to be entered into the nodes 506 manually. This manual entry is a viable transfer method although it typically means physically visiting each network node 506 site in turn to enter the information. This process of entering the information manually takes a great deal of time and involves a great deal of manual labor.

A much easier way for the human user 912 to get the maps into the nodes 506 is to use the Configuration Download Map function that is a feature of the present invention. Configuration Download Map converts the configuration maps to data. The configuration maps can then be downloaded to the communications network in a fraction of the time it would take to load them in by hand by a human user 912.

a. Download Configuration Maps into Network

When this option, shown at FIG. 15, of main menu 1502 is chosen by the user the following sequence of operations takes place.

The following typical message is displayed on the screen by the present invention.

"Reading Node Table 2 phases"

At this stage, a sequence of internal commands are executed in order to extract information from the node table in the database. When the node table has been successfully extracted, it will be displayed in the following format on the screen by the present invention:

| DOWNLOAD CONFIGURATION MAPS INTO NETWORK | | |
|---|---|---|
| Node name | Node number | Type |
| LONDON | 23 | Non-switched |
| NEW YORK | 10 | Non-switched |
| PARIS | 63 | Non-switched |

The human user 912 is prompted to choose a node 506, type RET for more display, or type 'Q' to quit. A node 506 is chosen by typing in the Node name as shown. If the node 506 chosen is an switched node 506, the human user 912 will have ability to download both the STC and USO configuration. On the other hand, for an switched node 506, only the STC configuration is available for download by human user 912 by the present invention:

Once a node 506 is chosen, the following is a typical message to be displayed on the screen:

"Reading network configuration for the chosen node ... 12 phases"

At this stage, the STC and USO (if a switched node 506) configurations are being extracted from the database. Having extracted the configuration for the node 506 the human user 912 will then be invited by the present invention to give a filename for the STC and USO configuration maps respectively. The filename must be alphanumeric and can be up to 12 characters. Once the filenames have been specified, the new STC and USO configuration maps will be installed into the database.

The maps can then be downloaded to the communications network for operation.

b. Upload Configuration Maps from Network

As a human user 912 alternative to entering all of the communications network data into the Network Requirements database, the Upload function of the present invention allows the human user 912 to "disassemble" a map, which has been uploaded from an existing node 506 into a form which can be stored. Changes can then be made to the data and the map can be reassembled using the Download function of the present invention.

Upload configuration maps shown at FIG. 15, begins with displaying the node table and asking the human user 912 to select a node 506 from the communications network in exactly the same way as the download process. Once a node 506 has been chosen, the existing STC configuration dumps table will then be extracted from the database. This is indicated by the message on screen:

"Reading database for STC maps ... 2 phases"

When the STC maps have been extracted, they will be displayed as shown in the following table by the present invention:

| UPLOAD CONFIGURATION MAPS | | | |
|---|---|---|---|
| ITEM | FILENAME | DATE | TIME |
| 1 | HEADSTC | 86/04/14 | 09:30 |
| 2 | NODE45STC | 86/04/15 | 10:21 |
| 3 | TEST1 | 86/01/05 | 16:34 |

The human user 912 is prompted by the present invention to enter an item number to choose a map, type RET for more display, or type "Q" to quit. Once an existing STC configuration dump is chosen from the NMC database, the device map and channel map will be inserted into the device and channel map tables in the database for the chosen node 506.

After the upload of the STC configuration, the next stage is the upload of the USO configuration if the chosen node 506 is switched. The USO upload begins with the extraction of the existing USO configuration dumps from the database. This is indicated by the message on screen:

"Reading database for USO maps ... 2 phases"

After the USO maps have been successfully extracted from the database, they will be displayed in the following table:

| UPLOAD CONFIGURATION MAPS | | | |
|---|---|---|---|
| ITEM | FILENAME | DATE | TIME |
| 1 | HEADUSO | 86/04/14 | 09:30 |
| 2 | NODE45USO | 86/04/15 | 10:21 |
| 3 | TEST1 | 86/01/05 | 16:34 |
| 4 | USODEMO | 86/10/13 | 17:00 |

The human user 912 is prompted by the present invention to enter an item number to choose a map, type RET for more display, or type "Q" to quit. Once a USO map has been chosen, the USO upload will proceed by first reading the contents from the chosen USO map and then storing them.

c. User Reports

As shown in FIG. 29, a variety of reports are available to the human user 912 via either the screen or printer. The following information may be displayed for each node 506:
Physical Configuration
Device Map
Channel Map
Routing Map
Pipe-Link Index
Short Form Addresses
Connection Texts Also available for review are the Network Requirements which have been entered by the human user 912 and validated by the expert system 918. A Print Network function prints a listing of the entire Information Base for the currently selected network.

E. List of Validation Messages

The list of validation messages supplied by the present invention are as follows:

Validation title messages
DATABASE INCONSISTENCY
WARNING MESSAGE
INVALID END POINT MAPPING
FIELD VALUE ERROR
VIOLATION OF NETWORK RULES
INVALID CARD LAYOUT ~ indicator that a string value will be inserted in this place.

Network consistency validation messages
This is an invalid ~ record.
~ is not a node origin for the link(s) to destination ~.
~ is not a recognized destination multiplexor for the ~ link(s) of origin ~.
There exists both a node and a feeder named ~.
The multiplexor given as ~ is not a recognized node or feeder.
There are no nodes in the network ~.
A network must consist of at least one node.
This network contains ~ nodes. The expert system allows a maximum of ~ nodes in the network.
Please reduce the number of nodes. Aborting.

2. Network consistency and some End Allocation validation messages
Unrecognized '~' record.
The ~ ends at ~ cannot be identified as an 'ends' record.
There is not a ~ bps link to allocate at node ~ to destination ~.
A valid node, of type 850, must be supplied for this mapping.
At the moment there is a '~' version '~' card in slot ~.
At the moment slot ~ is free.
Device number ~ does not correspond to an ARQ card in slot ~ of the master bay layout.
Device number ~ does not correspond to a card in slot ~ of the master bay layout.
Device number ~ does not correspond to an ARQ version '~' card in slot ~ of the master bay layout.
Device number ~ does not correspond to a card to which ends may be allocated, in slot ~ of the master bay layout.
A ~ card, corresponding to device number ~, cannot be found in the master bay layout of node ~.
A ~ version '~' card should be inserted into the slot.
The ~ ends at feeder ~ must be allocated to an ARQ card in the corresponding slot number to device ~ of the parent node.
There is not an ARQ card in slot ~ of node ~.
The ~ ends at ~ must be allocated to LSC version ~ cards.
Slot ~ does not contain an LSC version ~ card.
~ bps is an invalid speed for the ~ ends at ~.
There is a total number of ~ USO ports required at node ~.
The maximum number of USO ports available at any node is ~.

3. Nodes validation messages
The type of node ~ given as ~ is invalid.
~ and ~ have the been given the same node number.
A DCX 840 node must have a node number of zero.

A DCX 850 node must not have a node number of zero.

4. Feeders validation messages
The type of feeder ~ given as ~ is invalid.
There are zero channels for the feeder ~.
The number of channels to node ~ from feeder ~ is ~, which is out of the permitted range.
A link to an 812 feeder should be given a size of 4 or 8, or with a supervisor channel a size of 5 or 9.
A link to an 815 feeder should be given a size of 4 or 8.
There are no links to the feeder ~.
Give a node from which to create a link to ~.
Inconsistent size on the link to feeder ~ from ~.
There are ~ end channels at feeder ~, which exceeds the maximum number of channels for the link given as ~.
There are ~ end channels at feeder ~, which is under the specified limit of ~.
If not then there will be ~ unused channels on this link.
Would you like to re-specify the limit on the number of channels on the link from ~ to ~?
There are ~ end connections at the feeder ~.
The maximum number of channels available for an ~ is ~.
Please return to the data base and re-specify the number of end connections at ~.

5. Links validation messages
~ bps is an invalid speed for the link(s) between ~ and ~.
There can only be 1 link to ~ from node ~.
There is a ~ bps link to feeder ~ from node ~, and also a ~ bps link from node ~.
Remove the ~ bps link from node ~.
The size specified for this link must be in the range zero to 128.
A size should not be specified for a link to a feeder multiplexor.
The speed of the link from the feeder ~ (of type ~) is given as ~ bps.
The maximum speed of a link from a type ~ feeder is ~ bps.
The aggregate speed of the ~ composite links at node ~ exceeds the maximum permitted, which is ~ bps.
Please decrease the speeds of some of these links.

6. Ends validation messages
~ is an invalid port type for the ~ ends at node ~.
~ is an invalid traffic type for the ~ ends at ~.
There is not a version ~ of the ~ card.
An ~ card cannot be used for end connections.
There is not a fixed map supplied for the ~ ends of type PMC, at ~.
The ~ ends, at feeder ~, cannot be switched at the 840 node (~) to which their feeder is linked.
The ~ ends, of type ~, cannot be switched at the 840 node to which they are connected.
Ends situated at a feeder (~) may not be connected to a ~ card.
The card should be not applicable (N/A) for feeders.
There are only ~ ends in the ~ ends group, and so it is not possible to allocate ~ of them.
'~' is an invalid flow control for the LSC version '~' card.
The version of the ~ card has not been specified.
The protocol given as ~ can be used with a limited number of LSC versions.

'∼' is an invalid protocol for the ends on the LSC version ∼ card.

The version of LSC card has not been specified for these ends.

The speed of these rd name is not recognized for the ∼ ends at node ∼.

A card must be specified for ends physically connected to nodes.

These '∼' ends have not been specified to be either host or user ports.

Consider them as host ports if they are on a host service or computer.

Fixed maps validpe ∼, a valid switching 850 node must be supplied.

For the ∼ endsing should not be supplied.

For the ∼ ends of type ∼, the destination for the mapping is not fully supplied.

A switching node should not be supplied for the ∼ ends, of type ∼, at ∼.

The ∼ ends at ∼ given as a destination of a fixed mapping, must be of type PMC.

The ∼ ends at ∼ are used in two separate fixed mappings.

Non equal end quantities for a PMC mapping.

The ∼∼ ends at ∼ cannot be mapped to the ∼∼ ends at ∼.

It is not necessary to provide a 'fixed map' record for these ∼ ends, as they are connected to a feeder link to an 850 node.

7. Cards validation messages

There are no links from node ∼, and also no TAC card.

Node ∼ is of type 840, and hence must not be supplied with a USO card.

Too many ∼ cards.

The maximum number of ∼ cards at any one node is ∼.

There is an insufficient number of ∼ version ∼ cards.

The logical device allocation records imply that at least ∼ of these ∼ cards must be supplied.

There are no ∼ version ∼ cards at node ∼.

There are no ARQ1 cards and no TAC card supplied at node ∼.

The quantity of these cards, specified as ∼, is an incorrect number.

8. End allocation validation messages

The feeder ∼ may not be assigned end connections using an end allocation record.

The end allocation record is applicable only to nodes.

Allocate these feeder ends across the ARQ link to node ∼.

The ∼ ends are neither at node ∼, or any feeder linked to it.

Over lapping end groups allocated to device ∼ of node ∼.

There should not be a group of ∼ ends allocated from channel ∼, and also a group of ∼ ends allocated from channel ∼.

Correct this quantity of ∼ ends to be allocated.

The LSC channels ∼ to ∼ may not be used, as other cards must occupy their slots in the configuration.

The ∼ ends are allocated to two different devices at node ∼.

9. Logical device validation messages

The ∼ ends, for the ∼ card, have not been associated with a logical device record.

These ∼ ends cannot be allocated to this ∼ device starting at channel ∼.

The maximum size of the ∼ device is ∼.

These ends are not connected to a single device card and hence a logical device allocation record must not be supplied.

Over lapping end groups for device ∼ of node ∼.

There should not exist a group of ∼ ends starting at channel ∼, and also a group of ∼ ends starting at channel ∼.

10. Master bay validation messages

At node ∼ there are LSC cards in the master bay, and so there must be a buffer card in slot 1.

Node ∼: unrecognized card in slot ∼.

There is not a version '∼' of the ∼ card.

Inconsistent card count at node ∼.

Your physical configuration contains ∼∼ version '∼' card(s), which does not match the number declared in the cards table.

Your physical configuration contains ∼∼ version '∼' card(s), but none of these cards have been declared in the cards table.

Add these card(s) to the cards table.

The cards table for this node contains ∼∼ version '∼' card(s).

Attempt to add ∼ of these cards to the configuration master bay.

Node ∼, expansion bay ∼: unrecognized card in slot ∼.

At node ∼, slot 16 must contain a TAC or an ARQ version '1' card.

Node ∼: the USO version '∼' card, at slot ∼, must use up two slots.

The physical configuration at node ∼ should consist of ∼ bays (or a master bay and ∼ expansion bays).

Expansion bay ∼ is missing from the data base.

11. Buffer card validation messages

Node ∼: wrong buffer cards in the master bay.

Certain device cards require version 3 addressing buffers. All the buffer cards in this bay must be of version 3.

Node ∼, expansion bay ∼: wrong addressing buffer card.

Certain device cards require version 3 addressing buffers. The addressing buffer in this bay must be of version 3.

12. Channel mapping messages

Synchronous LSC PMC's may only cross 1 ARQ link.

No route with more than ∼ of hops was tried.

Route with too low a hop count rejected

Can't use link out of node ∼.

The expert system cannot continue to map the end channels due to link speeds being to small.

Would you link the expert system to ignore remaining capacity when mapping PMCs between ∼ and ∼?

Re-allocating ends to LSC cards may cause overloading of the card.

Could not allocate the supplied end allocations for end ∼ on mux ∼.

Please check the end allocation records. The Expert system is now aborting.

Too many LSC cards required to allocate ends on node ∼. Aborting.

Device card required for logical device ∼, not found in the master bay of node ∼. Aborting.

Link from node ∼ to feeder ∼ not found in the master bay. Aborting.

Found a link allocation type for node ∼, but could not re-allocate it. Going to remove it.

Could not allocate a link from node ~ to ~. ARQ card not found in the master bay. Going to abort.

Creating a mapping between end ~ and end ~.

Continuing to create a mapping between end ~ and end ~.

The Expert System will attempt to map the remaining channels.

The Expert System could not reallocate the ends as specified by the end allocations for node ~.

Check the end allocations. Aborting.

Creating a mapping for end ~ at node ~ which are to be switched at node ~.

Creating a mapping for end ~ at feeder ~ which are to be switched at node ~.

Next step is to self map Switchable ends.

Self mapping ends for node ~.

The expert system cannot continue to map the end channels due to links speeds being too small.

Continuing to create a mapping for end ~, which is to be switched at node ~.

13. Link sizing messages

Your configuration for node ~ requires an additional buffer card.

In this case, the addition of a buffer card in the master bay will not disturb your end allocation records.

You have specified a size of ~ for the link between ~ and ~.

You have specified a size of ~ for each of these links between ~ and ~.

The following links have been sized by the user, and all their channels have been used up so far by PMC mappings: Would you like to specify a higher size for each link in this group?

Would you like to specify a higher size for this link?

The queue pointers provided by the 4 buffer cards at this node have been used up.

It is not possible to continue sizing the links from this node.

The configuration of the network cannot be completed. Please re-specify smaller sizes for the links, or modify the network design. Aborting.

An extra buffer card is required at this node.

There are no spare slots in the master bay to add more buffers.

14. Physical configuration messages

Which configurations would you like for node ~?

Sorry, too many link or gate cards for the master bay at ~.

Would you like to have a configuration with minimum expansion capability at each node?

The minimum configuration for node ~ is with ~ expansion bays and ~ buffers.

15. Routing messages

Sorry, DCX 850 node names not recognized.

Do you want to try again?

16. General system messages

Do you want to write the modified data and configuration results back to the data base?

The modified data and the configuration results will be lost.

The data base has been updated. Do you wish the Expert System to continue without asking questions?

What is claimed is:

1. An expert computer system for use with a communication network, which comprises:

means for storing a requirement database comprising desired usage data relating to the desired usage of the communications network;

means for storing a configuration database comprising relationship data relating to the relationship between the physical and logical networks of communications network; and expert means, connected to said requirement database and to said configuration database, for producing said relationship data from said desired usage data.

2. An expert system for operation on desired usage data and relationship data of a land-based communications network, which expert system comprises:

means for producing said relationship data from said desired usage data to assist in the configuration of the communication network, said means comprising:

a working memory;

a knowledge base having at least one chunk of knowledge relating to the configuration of the communication network and one module means for storing said chunk of knowledge according to logical constraints, said module means including means for partial configuration of the communications network; and inference engine means, connected to said working memory and said knowledge base, for firing said chunk of knowledge in response to said desired usage data to produce said relationship data.

3. An expert system for operation on desired usage data and relationship data of a land-based communications network, which expert system comprises:

means for producing said relationship data from said desired usage data to assist in the configuration of the communications network, said means comprising:

a working memory;

a knowledge base having at least one chunk of knowledge relating to the configuration of the communications network and one module means for storing said chunk of knowledge according to logical constraints, said module means including means for assigning channel cards numbers; and inference engine means, connected to said working memory and said knowledge base, for firing said chunk of knowledge in response to said desired usage data to produce said relationship data.

4. An expert system for operation on desired usage data and relationship data of a land-based communications network, which expert system comprises:

means for producing said relationship data from said desired usage data to assist in the configuration of the communications network, said means comprising:

a working memory;

a knowledge base having at least one chunk of knowledge relating to the configuration of the communications network and one module means for storing said chunk of knowledge according to logical constraints, said module means including means for producing a link sizing device map; and inference engine means, connected to said working memory and said knowledge base, for firing said chunk of knowledge in response to said desired usage data to produce said relationship data.

5. An expert system for operation on desired usage data and relationship data of a land-based communications network, which expert system comprises:

means for producing said relationship data from said desired usage data to assist in the configuration of the communications network, said means comprising:
- a working memory;
- a knowledge base having at least one chunk of knowledge relating to the configuration of the communications network and one module means for storing said chunk of knowledge according to logical constraints, said module means including means for creating and allocation records; and
- inference engine means, connected to said working memory and said knowledge base, for firing said chunk of knowledge in response to said desired usage data to produce said relationship data.

6. An expert and database system architecture for use with a multiplexer communications network, which system architecture comprises:
(1) requirement means for providing desired usage data based on human user input;
(2) an expert system connected to said requirement means which comprises:
   (a) a working memory;
   (b) a knowledge base having at least a chunk of knowledge relating to the configuration of the multiplexer communications network; and
   (c) inference engine means, connected to said working memory and to said knowledge base, for firing said chunk of configuration knowledge in response to said desired usage data to produce relationship data; and
(3) configuration means for storing said relationship data from said expert system, said relationship data used to configure the multiplexer communications network.

7. The system architecture of claim 6, wherein the configuration means comprises reconfiguration means used to reconfigure the multiplexer communications network.

8. The system architecture of claim 6, wherein the configuration means comprises partial configuration means used to partially configure the multiplexer communications network.

9. The system architecture of claim 6, wherein said multiplexer communications network is based on the statistical multiplexing technique.

10. The system architecture of claim 6, wherein said multiplexer communications network is substantially based on a CASE Communications PLC type multiplexer communications network.

11. The system architecture of claim 6, wherein said multiplexer communications network is substantially based on a T1, T2, T3 or T4 type of time division multiplex communications network.

12. The system architecture of claim 6, wherein said requirements means utilizes an UNIFY TM type of relational database management approach.

13. The system architecture of claim 6, wherein said requirements means utilizes a relational database management system.

14. The system architecture of claim 6, wherein said configuration means utilizes an UNIFY TM type of relational database management approach.

15. The system architecture of claim 6, wherein said configuration means utilizes a relational database management system.

16. The system architecture of claim 6, wherein said expert system uses an OPS-83 expert system.

17. The system architecture of claim 6, wherein said expert system uses a production rule base system development tool.

18. The system architecture of claim 6, further comprises man-machine interface means for allowing communication between a human operator and said working memory.

19. The system architecture of claim 18, further comprises means for connecting said man-machine interface means to said requirements means.

20. The system architecture of claim 18, further comprises means for connecting said man-machine interface means to said configuration means.

21. The system architecture of claim 18, further comprises means for connecting said man-machine interface means to said expert system.

22. A human user controlled expert system operational method and an expert and database system architecture for use with a multiplexer communications network, which comprises:
- requirements means for producing desired usage of the multiplexer communications network adapted to allow the human user to maintain said desired usage;
- expert system means connected to said requirements means for allowing the human user to control and maintain the operation of said expert system means for configuring of the multiplexer communications network to produce relationship data from said desired usage data; and
- configuration means for storing said relationship data from the expert system means and adapted to allow the human user to maintain said relationship data.

23. The system architecture and operational method of claim 22, wherein said requirements means comprises a relational database containing said desired usage.

24. The system architecture and operational method of claim 22, wherein said expert system comprises means for allowing the human user to control and/or fine tune said relationship data.

25. The system architecture and operational method of claim 22, wherein said expert system means utilizes a the rule base system architecture based on the configuration knowledge of the multiplexer communications network.

26. The system architecture and operational method of claim 22, wherein said relationship data means comprises a relational database containing said relationship data.

27. The system architecture and operational method of claim 26, wherein said relational database can be defined, modified, updated, or maintained by the human user.

28. The system architecture and operational method of claim 22, wherein said expert systems means includes man-machine interface means for allowing the human user to control said requirement means or said configuration means.

29. The system architecture and operational method of claim 28, wherein said man-machine interface means is operated by the human user using a menu-driven strategy.

30. The system architecture and operational method of claim 28, wherein said man-machine interface means is operated by the human user using graphical interface.

31. The system architecture and operational method of claim 28, wherein said man-machine interface means is operated by the human user using an icon-based interface.

32. The system architecture and operational method of claim 28, wherein said man-machine interface means is operated by the human user using a window-driven interface.

* * * * *